(12) United States Patent
McKenzie et al.

(10) Patent No.: US 10,013,412 B2
(45) Date of Patent: Jul. 3, 2018

(54) PEER TO PEER SPREADSHEET PROCESSING

(71) Applicant: Purple Robot Software, Inc., Ciudad de Panama (PA)

(72) Inventors: Stuart C. McKenzie, Brisbane (AU); Peter A. Amelunxen, Santiago (CL); Christopher R. Butner, Brisbane (AU)

(73) Assignee: Purple Robot Software, Inc., Panama (PA)

( * ) Notice: Subject to any disclaimer, the term of this patent is extended or adjusted under 35 U.S.C. 154(b) by 239 days.

(21) Appl. No.: 14/834,300

(22) Filed: Aug. 24, 2015

(65) Prior Publication Data

US 2016/0055140 A1  Feb. 25, 2016

Related U.S. Application Data

(60) Provisional application No. 62/041,637, filed on Aug. 25, 2014.

(51) Int. Cl.
*G06F 17/24* (2006.01)
*G06F 21/12* (2013.01)
*G06F 21/62* (2013.01)

(52) U.S. Cl.
CPC .......... *G06F 17/246* (2013.01); *G06F 17/248* (2013.01); *G06F 21/128* (2013.01); *G06F 21/629* (2013.01); *G06F 21/6209* (2013.01)

(58) Field of Classification Search
None
See application file for complete search history.

(56) References Cited

U.S. PATENT DOCUMENTS

| | | | |
|---|---|---|---|
| 5,437,006 A | 7/1995 | Turski | |
| 5,471,612 A | 11/1995 | Schlafly | |
| 5,633,998 A | 5/1997 | Schlafly | |
| 6,157,935 A | 12/2000 | Tran et al. | |
| 6,341,292 B1 | 1/2002 | Cho et al. | |
| 6,701,485 B1 | 3/2004 | Igra et al. | |
| 7,415,664 B2 | 8/2008 | Aureglia et al. | |
| 8,082,489 B2 | 12/2011 | Jiang | |
| 8,447,886 B2 | 5/2013 | Rochelle et al. | |
| 8,626,477 B2 | 1/2014 | Oh | |
| 2002/0065846 A1 | 5/2002 | Ogawa et al. | |
| 2003/0226105 A1 | 12/2003 | Waldau | |

(Continued)

OTHER PUBLICATIONS

Spreadsheet Converter, Home Page (http://www.spreadsheetconverter.com) (downloaded Dec. 2, 2015) 6 pp.

(Continued)

*Primary Examiner* — Asher Kells
(74) *Attorney, Agent, or Firm* — Loza & Loza, LLP; Michael Fedrick; Daniel Castro

(57) ABSTRACT

A distributed system and process for sharing a spreadsheet model. A spreadsheet to be shared is configured by defining input fields, processing parameters for the input fields, and output fields, and a template including the input and output fields is created. The template is shared with a remote user, who enters data into the input fields of the template. The input data is transferred for processing, after which results are provided to the remote user in the defined output fields of the template.

20 Claims, 40 Drawing Sheets

(56) References Cited

U.S. PATENT DOCUMENTS

| | | |
|---|---|---|
| 2004/0103365 A1 | 5/2004 | Cox |
| 2005/0193379 A1 | 9/2005 | Tanenbaum |
| 2006/0129809 A1* | 6/2006 | Battagin ............. G06F 21/6209 |
| | | 713/166 |
| 2007/0185935 A1 | 8/2007 | Olivieri et al. |
| 2012/0151378 A1* | 6/2012 | Parish ............... G06F 17/30876 |
| | | 715/751 |
| 2013/0013993 A1 | 1/2013 | Oh |
| 2013/0117651 A1* | 5/2013 | Waldman ............. G06F 17/246 |
| | | 715/220 |
| 2013/0179764 A1 | 7/2013 | Battagin et al. |

OTHER PUBLICATIONS

Doneex, Home of Excel Compiler (http://doneex.com) (downloaded Dec. 2, 2015) 3 pp.

\* cited by examiner

PEER TO PEER SPREADSHEET PROCESSING

CROSS-REFERENCE TO RELATED APPLICATIONS

This application claims the benefit of U.S. Provisional Patent Application Ser. No. 62/041,637, filed Aug. 25, 2014, which is titled "PEER TO PEER SPREADSHEET PROCESSING" and its entire contents of which are incorporated herein by reference.

TECHNICAL FIELD

The subject disclosure generally relates to spreadsheet processing, and more specifically to securely sharing spreadsheet processing models within a peer to peer architecture.

BACKGROUND

Spreadsheets are a common tool for experts in a variety of fields to model scenarios in order to better understand them and optimize them based on performance indicators. Spreadsheet programs such as MICROSOFT EXCEL have thus become essential tools for some of these experts, who have developed complex models over time with these programs. Such models may include proprietary formulae and data developed by the experts.

The creators of spreadsheet models may use them in a workplace or in a consulting practice, and for a variety of reasons others may need access to these files. Sharing spreadsheet models, however, may provide access to sensitive data and/or formulae contained in the spreadsheets, without any practical way to control or limit access to those files once they are copied.

In other scenarios, spreadsheet creators might want to share their spreadsheets with clients, but such spreadsheets may be too complex for the client to use, or may require specific programs or applications not available to the client. In such situations, experts may simply solicit the data from their clients and manually copy that data into their spreadsheet in order to run a model. This, however, may involve processing many batches of input data, which can be time-consuming and tedious.

One solution to the problem of protecting proprietary portions of spreadsheets is to hide them and secure access to them with a password. This functionality is built-in to the MICROSOFT EXCEL® program, for example. Sheets, data sets, and macros processing in the background can be protected this way. Such password mechanisms, however, generally do not provide strong protection and are easily hacked. This mechanism also does not allow experts to control which clients are allowed access to their services, as those files are still easily copied.

Another existing solution is to compile an expert's workbook into an executable file to hide sensitive processes, such as by using the XCell COMPILER™ program, available from DoneEX™. Although this removes visibility to the formulae used in a spreadsheet, the spreadsheet's functions remain available to anyone who obtains a copy of the file, especially if the file's code is decompiled or otherwise reverse engineered. In addition, converting a spreadsheet into a compiled executable file may result in a loss of functionality in the spreadsheet and/or introduce errors.

Another approach which has been used is to convert a spreadsheet into a web page with corresponding input/output reporting mechanisms and have sensitive calculations run on a backend web server, such as by using an application such as the SPREADSHEETCONVERTER™ program (available from Framtidsforum I&M AB, Sweden). A problem with this however is that the application must convert each function provided by the original spreadsheet application into a JavaScript or backend equivalent function, making it difficult to cover the conversion of all possible functions in a program like MICROSOFT EXCEL®. This approach is thus limited to functionalities that can be provided by JavaScript code, or requires custom programming of backend web server code. In addition, the JavaScript or other client-side code may itself be visible by simply viewing the web page source code, which may reveal sensitive information. In addition, this approach also requires the web application to be hosted on a server, which involves hosting costs, expertise, maintenance, and other burdens.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with sharing a spreadsheet model with remote users. In one such aspect, a method is provided, which includes receiving an end user request associated with a spreadsheet model that facilitates a processing of data. The method further includes identifying an expert spreadsheet template in accordance with the end user request, and identifying a client spreadsheet template corresponding to the expert spreadsheet template. Within such embodiment, the expert spreadsheet template includes embedded instructions on how to execute the spreadsheet model, whereas the client spreadsheet template is configured to interface the end user with the spreadsheet model in accordance with a restricted level of access that makes aspects of the spreadsheet model inaccessible to the end user. The method also facilitates a communication between the client spreadsheet template and the expert spreadsheet template in which the communication initiates an execution of the embedded instructions on the expert spreadsheet template in response to an end user input received via the client spreadsheet template.

In another aspect, a computer-readable storage medium is provided, which includes a memory component configured to store computer-readable instructions. The computer-readable instructions include instructions for performing various acts including receiving parameters of a spreadsheet model that facilitates a processing of data, and generating an expert spreadsheet template that includes embedded instructions on how to execute the spreadsheet model in accordance with the parameters. Instructions are also provided for determining a restricted level of access to the spreadsheet model that identifies aspects of the spreadsheet model to make inaccessible to an end user, as well as instructions for generating a client spreadsheet template. For this embodiment, the client spreadsheet template is configured to interface the end user with the spreadsheet model in accordance with the restricted level of access, and further configured to facilitate an execution of the embedded instructions on the expert spreadsheet template.

In a further aspect, another computer-readable storage medium is provided, which also includes a memory component configured to store computer-readable instructions. The computer-readable instructions include instructions for performing various acts including transmitting an end user request corresponding to a spreadsheet model. Within such embodiment, the spreadsheet model is associated with at least one expert spreadsheet template that includes embedded instructions on how to execute the spreadsheet model. Instructions are also provided for interfacing with a client spreadsheet template associated with the at least one expert spreadsheet template. Here, the client spreadsheet template is configured to provide the end user with a restricted level of access to the spreadsheet model, which makes aspects of the spreadsheet model inaccessible to the end user. Further instructions are also included for initiating an execution of the embedded instructions on the at least one expert spreadsheet template in which the execution is initiated in response to an end user input received via the client spreadsheet template.

Other embodiments and various non-limiting examples, scenarios and implementations are described in more detail below.

BRIEF DESCRIPTION OF THE DRAWINGS

Various non-limiting embodiments are further described with reference to the accompanying drawings in which:

FIG. 28 is an exemplary screen shot illustrating a log in window of a client template generated from an expert model configuration process according to an embodiment;

FIG. 32 is an exemplary screen shot illustrating a queue of jobs in a Data Inbox according to an embodiment;

FIG. 35 is an exemplary screen shot illustrating a webpage interface that facilitates editing an expert model according to an embodiment;

DETAILED DESCRIPTION

Definitions

Figure 1:
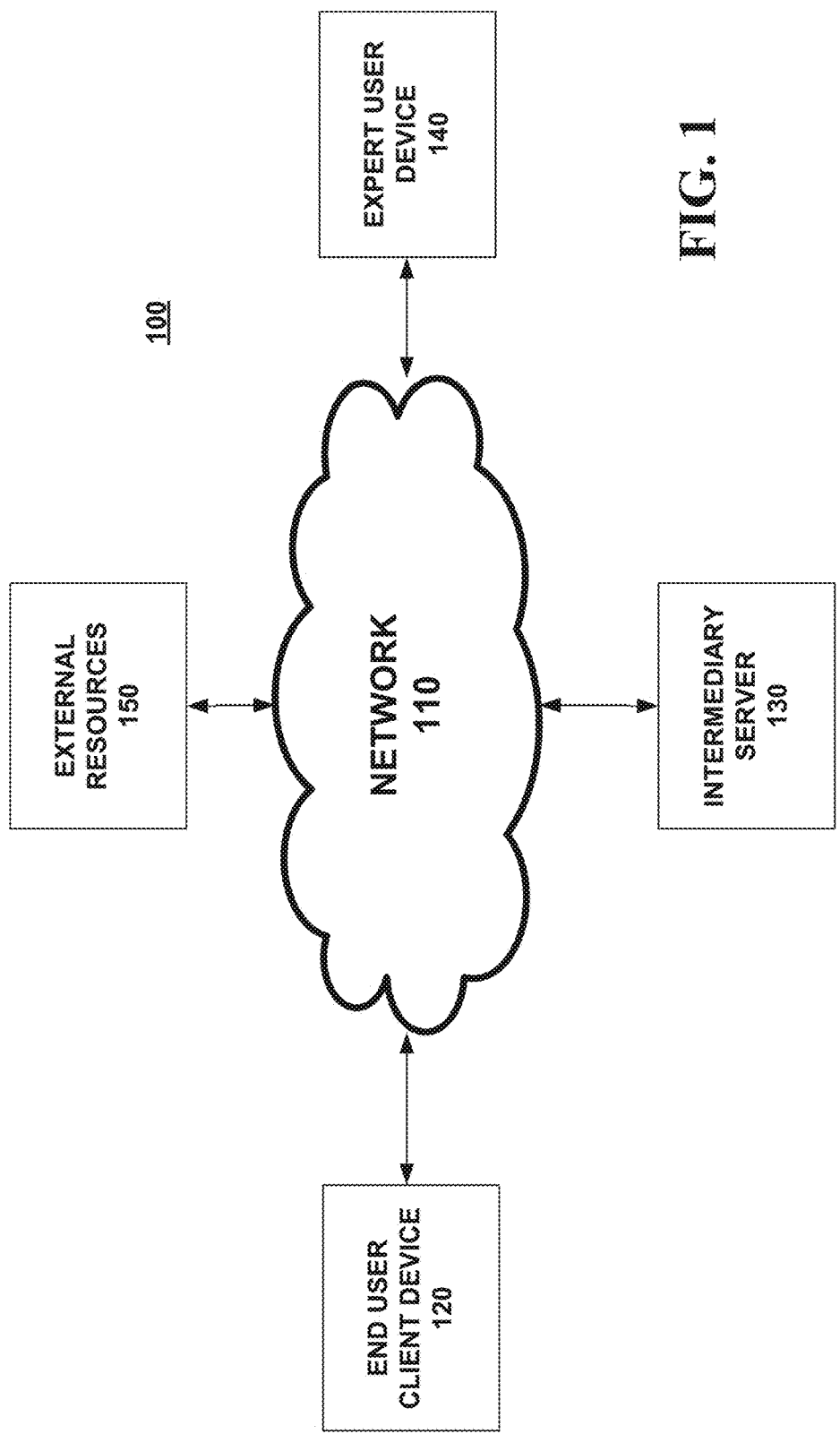
FIG. 1 illustrates an exemplary environment that facilitates sharing spreadsheet processing models in accordance with an aspect of the subject specification.

As used herein, the following terms and variations thereof have the meanings given below, unless a different meaning is clearly intended by the context in which such term is used.

"Client" refers to an end user of a model in the present system and may also refer to a device utilized by an end user to access a model.

"Data Inbox" refers to a software application that communicates directly with a data processing application such as a spreadsheet and which functions to hold a queue of prioritized work items for use in the present system. A Data Inbox can be a stand-alone application, or can be a plugin, such as a plugin operable with a spreadsheet. Preferably, the Data Inbox operates to launch files as specified in a model's local metadata, for example launching a file using the EXCEL® program, in which case the Data Inbox application preferably connects to a plugin running in EXCEL® which allows the metadata embedded in the spreadsheet to be read and the input data for the work item to be injected into the file to the location defined in the metadata. A Data Inbox application is also preferably operable to run macros, extract output data, and publish results it receives. Data Inbox applications may have different functionalities for use by experts and clients in the present system, respectively. For instance, as described herein, an end user's client history pane may be deemed a Data Inbox. Model chaining aspects are also described herein, wherein Data Inbox may be configured to facilitate a combination of client and expert functionality.

"Expert" refers to a creator of an application, wherein the application may be a model or manner of processing data in the present system. Generally, such creators are thus program developers having knowledge or expertise concerning the phenomenon being modeled. An expert may also refer to a device utilized to create an application.

"Formula" refers to a mathematical relationship, method or rule, such as an equation, expressed in numbers and/or other symbols. Formulas may be implemented in programming code.

"Input" (when used as a noun) refers to information (data and/or formulae) entered into a data structure, such as the cell of a spreadsheet, which is used in a model. In verb form, input refers to the act of providing such information.

"Intellectual Property" and "IP" refer to data, formulae, and/or processing steps which may be contained in a spreadsheet or other data structure.

"Macro" refers to a set of instructions that may be executed by a computer via a single program statement. Macros in the present system may, for example, comprise formulae created by an expert which specifies how a certain input should be processed to prepare a particular output sequence, wherein the macro may be deemed the expert's intellectual property.

"Model" refers to a set of data and/or formulae arranged in a data structure which can be used by an end user to generate a data result. A spreadsheet may serve as a model, for example, with data organized in the cells of the spreadsheet. Models generally use mathematical formulae and relationships among data to represent a situation or other phenomenon, such as a projected sequence of events, including various factors which may influence the phenomenon. Models generally are structured with a predetermined input interface, data processing tools and options, and output interface. As used herein, a model generally refers to a spreadsheet model that associates an expert spreadsheet template with an end user client spreadsheet template, wherein data processing is remotely performed by the expert spreadsheet template in response to an end user input received via the client spreadsheet template.

"Plugin" (or plug-in, extension, or add-on) refers to a software component that adds a specific feature and/or functionality to an existing software application (a host application). The host application generally runs independently of a plugin.

"Output" (when used as a noun) refers to data generated by a model, which may be provided in a cell of a spreadsheet. In verb form, output refers to the act of providing such data.

"Results" refer to data generated by a model.

"Spreadsheet" refers to an electronic file created and/or readable by a spreadsheet program which comprises a set of cells arranged into rows and columns, where each cell can correspond to inputted data and/or formulae. A spreadsheet may also have a set of macros or code associated with it that can operate on the data cells.

"Spreadsheet program" refers to software for the organization and analysis of data represented in tabular form, i.e. as a spreadsheet.

"Template" refers to an electronic file which has a predetermined format and structure. For example, a spreadsheet prefilled with predefined headings and other content and metadata can be a template. Templates in the present system also include metadata to identify inputs and outputs, as well as to identify the model corresponding to a particular template.

"Workbook" refers to a set of spreadsheets in a spreadsheet program.

System Overview

There remains a need for a system that provides subject matter experts the flexibility and freedom to share spreadsheet programs with full functionality but also with protection for their intellectual property. The present invention meets this need by providing a solution that allows a client access to the functionalities of an expert's spreadsheet without obtaining a copy of it. The present system and process also eliminates the need for manual copying and emailing of spreadsheet files, thereby simplifying file and historic data management.

Turning now to FIG. 1, an exemplary environment that facilitates sharing spreadsheet processing models is provided according to an embodiment. As illustrated, environment 100 includes an end user client device 120, which is coupled to an intermediary server 130, an expert user device 140, and external resources 150 via network 110 (e.g., the Internet). Within such embodiment, it is contemplated that an expert user utilizes an expert user device 140 to configure a spreadsheet model for distributed processing by identifying input fields, identifying how inputs are to be processed, and identifying the resulting outputs. In an aspect of the disclosure, an end user receives a template corresponding to the configured spreadsheet model via the end user client device 120, wherein the template received by the end user lacks formulae and other content which the expert user wishes to maintain in confidence. In another aspect of the disclosure, the end user client device 120 is configured to dynamically create client templates by combining any of various expert models accessible via the intermediary server 130. The end user inputs data via the end user client device 120, elects to process that data remotely on the expert user device 140, and then receives the resulting processed data either automatically or after electing to receive it. The intermediary server 130 is preferably used to manage user authentication and user data. For instance, end users may submit their data to the intermediary server 130, which in a preferred embodiment delivers the data to the expert user device 140 for processing. Batches of data can be processed automatically, and the results can also be published back to the intermediary server 130 automatically.

In an aspect of the disclosure, it should be appreciated that external resources 150 may represent any of various resources. For instance, within a distributed computing architecture, it is contemplated that external resources 150 may comprise any of a plurality of computers that the expert user device 140 may leverage to process data. For instance, external resources 150 may comprise computers configured to execute particular programs not residing on the expert user device 140 (e.g., MATLAB, Python, etc.). External resources 150 may also represent any of a plurality of external databases relied upon by particular models executed by the expert user device 140.

In a further aspect of the disclosure, the present system is implemented on the end user client device 120 and/or the expert user device 140 using plugins which may operate in conjunction with a host application, such as a spreadsheet program, in order to provide functionality unique to the present system. The host application provides services which the plug-in can use, including a way for the plugin to register with the host application and a protocol for the exchange of data between the plugin and the host application. Such plugins and host applications, in combination with the intermediary server 130, can add a user interface and/or application menu options and the necessary functionality to accomplish specialized functions of the present system described herein, including creating and saving templates, exporting input data from the end user client device 120, importing input data from the end user client device 120 and/or from the intermediary server 130, exporting output data from the expert user device 140, and importing output data into the end user client device 120 from the expert user device 140 and/or the intermediary server 130.

Figure 2:
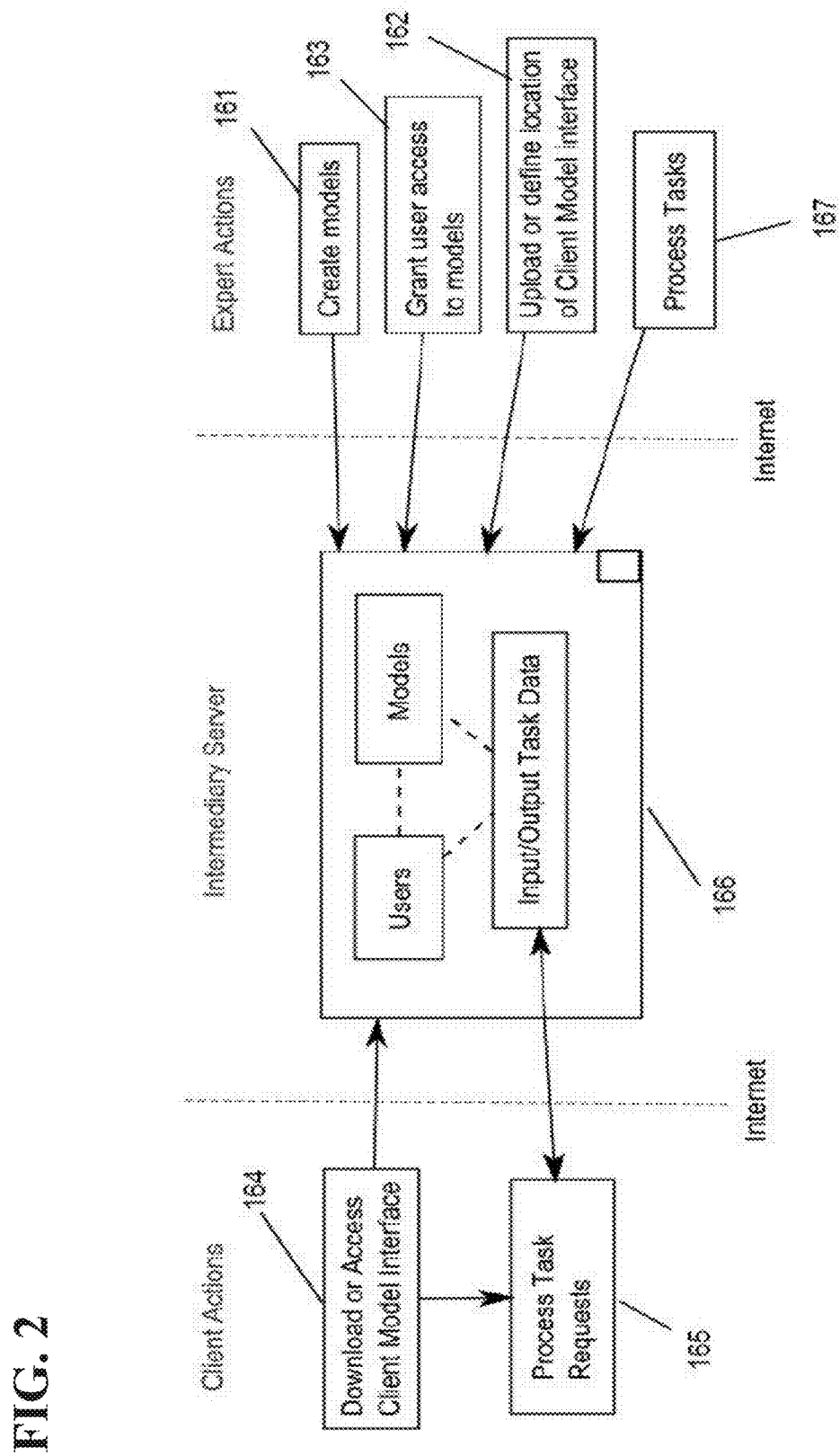
FIG. 2 is a diagram illustrating a first exemplary task flow that facilitates sharing spreadsheet processing models in accordance with an aspect of the subject specification.

Referring next to FIG. 2, a diagram is provided illustrating an exemplary task flow that facilitates sharing spreadsheet processing models in accordance with an aspect of the subject specification. As described above, an expert user (creator) can begin the process by creating a model, such as one implemented in a spreadsheet, which includes intellectual property. The expert user then generates both an expert template corresponding to the model and a lightweight client template with intellectual property removed, both corresponding to the expert's spreadsheet model at act 161. The client template is then uploaded to the intermediary server at act 162.

Client end-users are then provided access to the client template at act 163, where they may subsequently input their specific data into the lightweight client template at act 164. End users can then elect to process the input data, at act 165, using the expert's model as described herein (e.g., through the use of a plugin). The client's input data is then delivered with corresponding metadata from the client template to an intermediary hosting server at act 166 (e.g., via HTTPS), where it is stored as a work item with an associated ID, to be processed by the expert user.

In the embodiment of FIG. 2, the expert user's computer, running a data processing application configured for the present system, is connected to the server, and receives all work items associated with his model. Work items may be configured to process automatically, in which case they are launched into an application specified by the expert template configuration metadata, processed accordingly, and the specified results are extracted and published back to the server at act 167. Expert users can also elect to manually process a work item and/or manually publish the results. Alternatively, client templates and/or expert templates may be hosted and/or processed on an intermediary server, wherein the processing at act 167 is performed by the intermediary server. Once processed, either via the expert user's computer or the intermediary server, client end-users can receive their results, by polling or with a network protocol that pushes the data to the client using the client template plugin application, for example.

Figure 3:
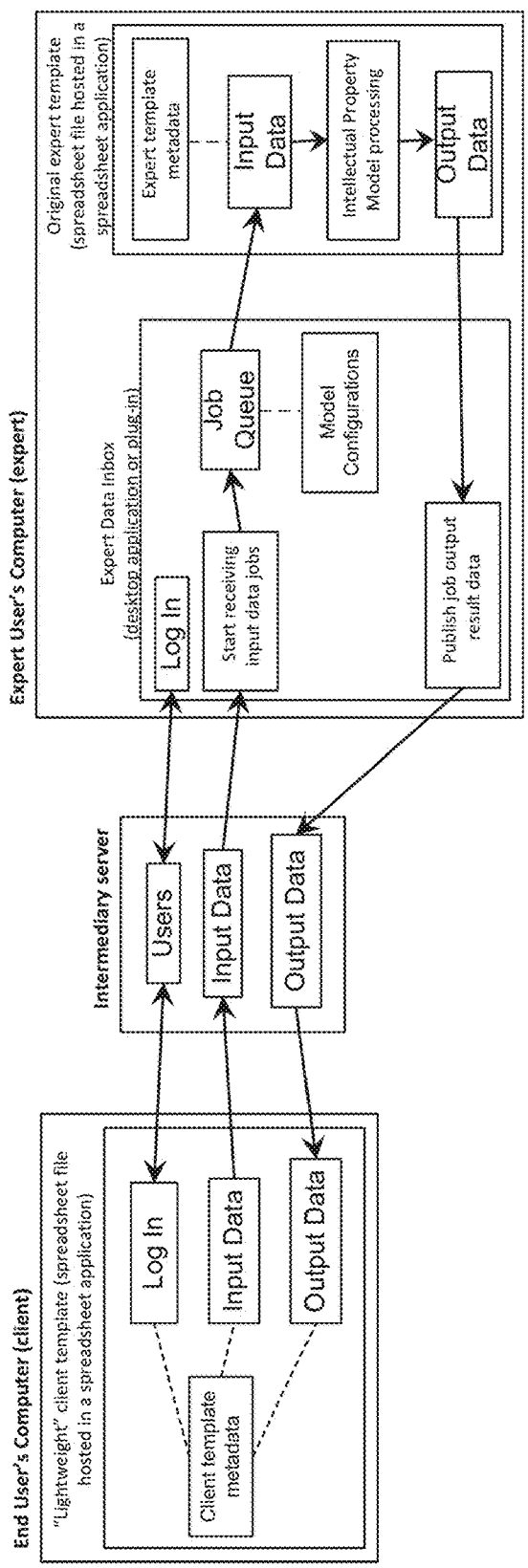
FIG. 3 is a diagram illustrating a second exemplary task flow that facilitates sharing spreadsheet processing models in accordance with an aspect of the subject specification.

Referring next to FIG. 3, a diagram illustrating another exemplary task flow that facilitates sharing spreadsheet processing models is provided. Here, a client user is first provided with a template, such as a "lightweight" client template, into which the client enters input data, wherein such template may be a spreadsheet file hosted in a spreadsheet application. Data input via the client template is then forwarded to an intermediary server, such as by a plugin installed on the client computer. The server then sends the input data to the expert user's computer, for example when the expert is connected to a network allowing such data transfer.

The expert's computer operates a data processing program, such as a "Data Inbox" and a spreadsheet application, as well as a plug-in for that program in this embodiment. The expert computer data processing program can be configured either to process the input data immediately, or otherwise can be configured to place the data in a queue for processing according to predetermined instructions, for example at a predetermined time or upon the taking of a predetermined action by the expert user. The data processing program provides the input data to, for example, a spreadsheet model running on the expert user's computer, and once this data is processed the resulting output data is provided to the Data Inbox to be sent back to the client, or is sent directly by the data processing application. In either event the output data is published to the intermediary server either immediately or according to other predetermined instructions. The intermediary server then provides the output data to the client user, preferably displaying the output data in the template provided to the client user.

In a particular aspect of the disclosure, it is contemplated that an expert can share a model where the client template is using a spreadsheet for simplicity of data entry and user distribution, but where the expert template is implemented using an external program (e.g., MATLAB). For such embodiments, the Data Inbox desktop application could be configured to launch the MATLAB application (either locally or on an external computer) and pass the input data similarly to a spreadsheet application. Accordingly, it should be appreciated that the aspects disclosed herein are not limited to spreadsheet processing.

In another aspect of the disclosure, it is contemplated that an expert spreadsheet will include intellectual property missing from the client spreadsheet. For instance, such intellectual property may include formulas, macros, and any of various other sensitive items an expert user would not want to share. The expert metadata may also include an expert global unique identifier (GUID), which can be used to facilitate matching expert templates with corresponding client templates.

Figure 4:
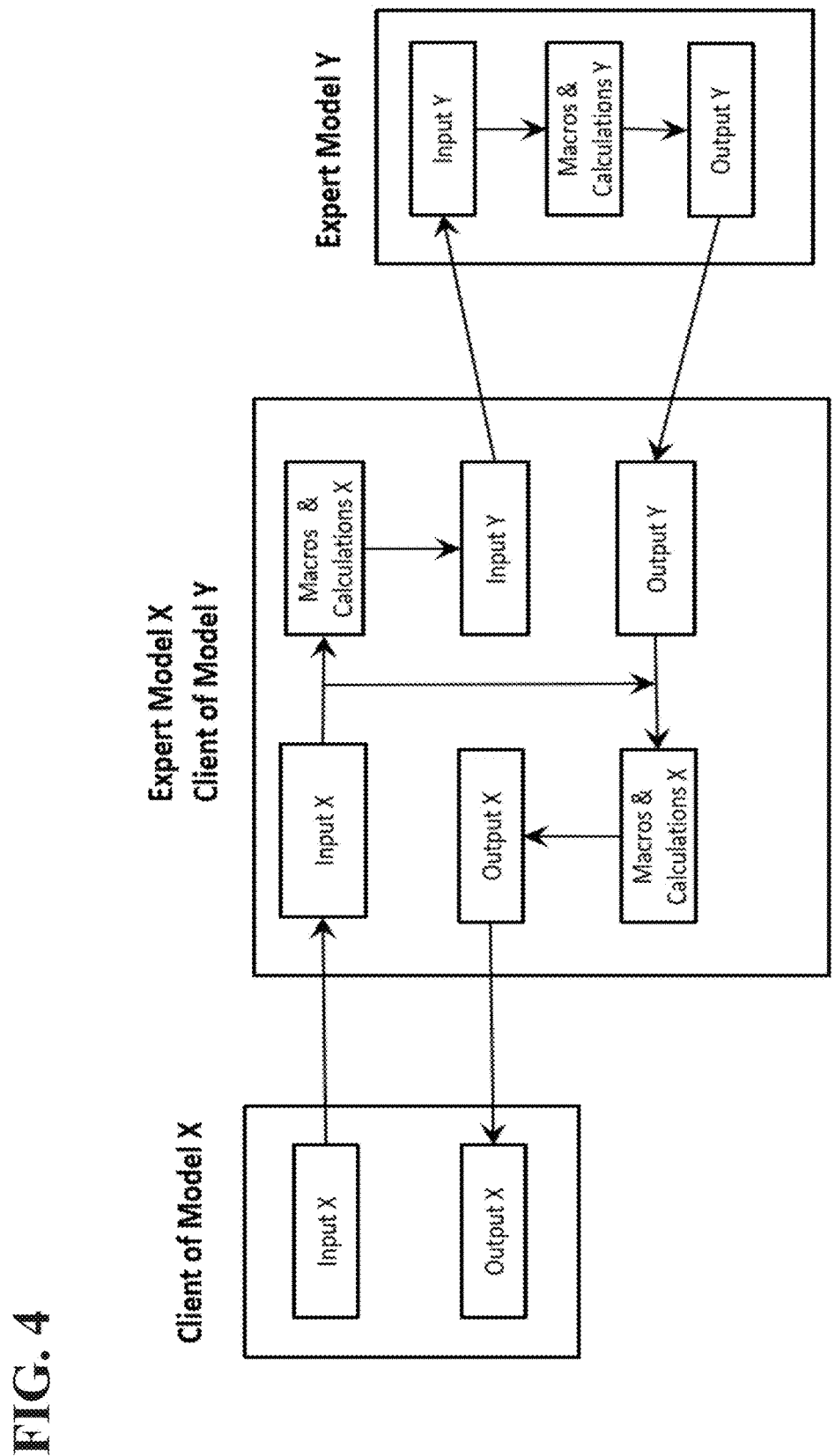
FIG. 4 is a block diagram illustrating how an expert model can be a client to another expert model according to an embodiment.
Figure 5:
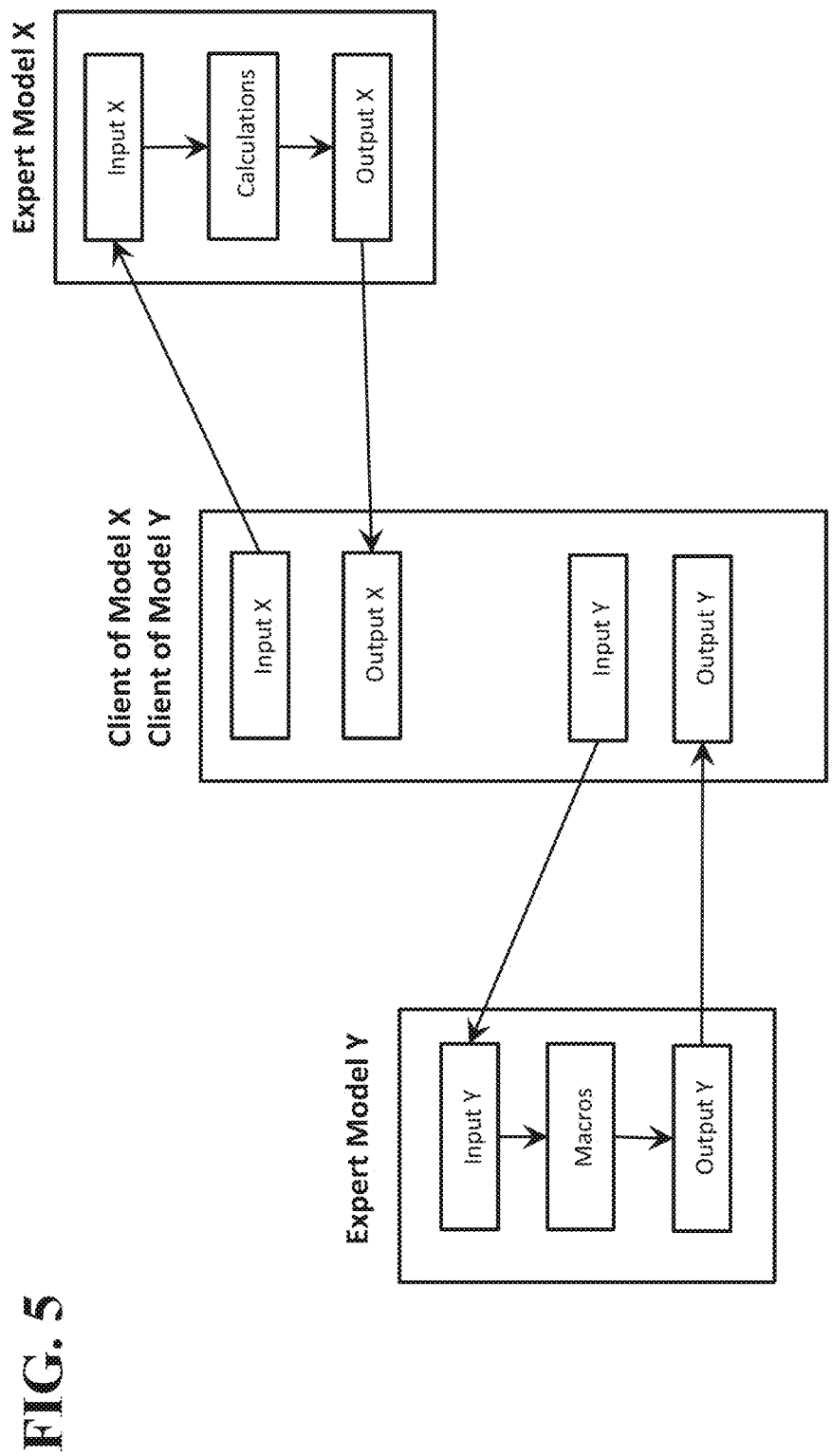
FIG. 5 is a block diagram illustrating how a client can aggregate functionality from multiple expert models according to an embodiment.

In a further aspect of the disclosure, it is contemplated that an expert template can be a client template to other expert templates. FIG. 4, for example, is a block diagram illustrating how an expert model can be a client to another expert model according to an embodiment. Alternatively, as illustrated in FIG. 5, it is contemplated that a client template can have the metadata embedded for multiple expert models. Moreover, within such embodiment, an end user may thus aggregate functionality from multiple expert models in a single spreadsheet application.

Figure 6:
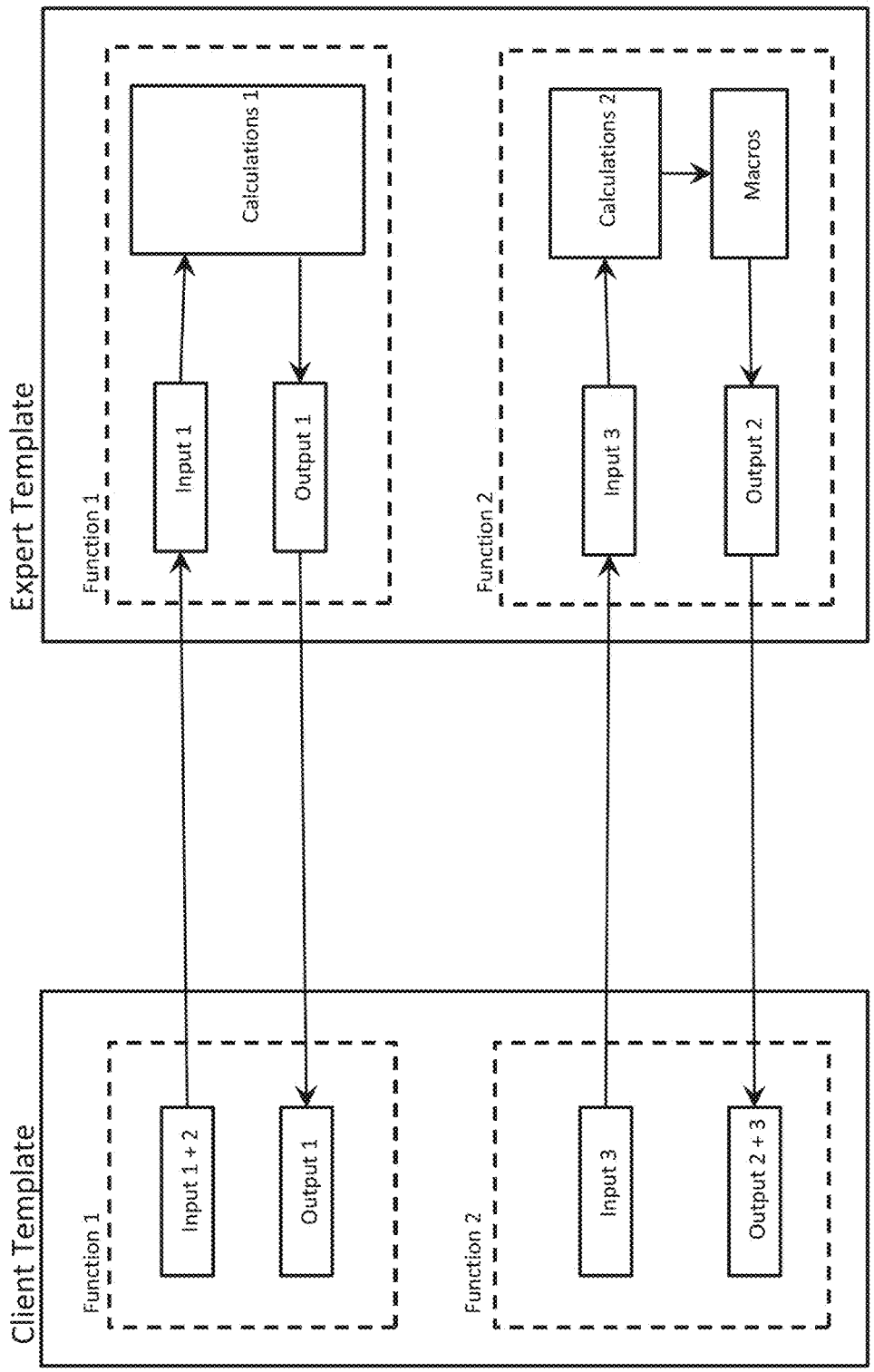
FIG. 6 is a block diagram illustrating how multiple functions may be incorporated into a single client template according to an embodiment.

Referring next to FIG. 6, a block diagram illustrating how multiple functions may be incorporated into a single client template is provided. As illustrated, different sets of inputs may be sent for processing, wherein an end user may have each set handled by different calculations and macros, as desired. Indeed, within such embodiment, end users can create functions with no inputs or outputs and combine them with other functions to make custom web applications.

Figure 7:
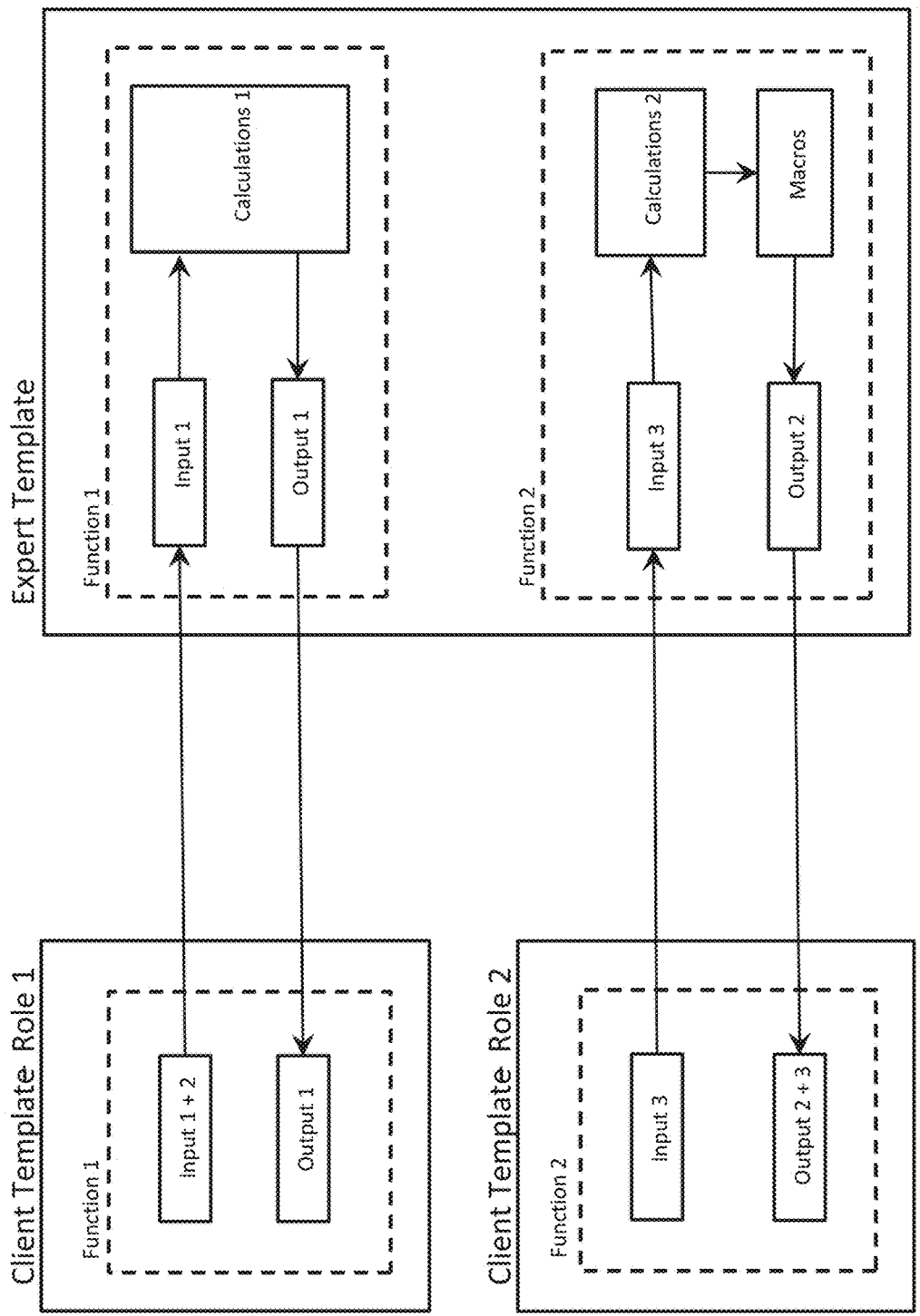
FIG. 7 is a block diagram illustrating how multiple functions may be incorporated into an expert model to facilitate various user roles according to an embodiment.

In another aspect of the disclosure incorporating multiple functions into an expert model is also contemplated, as illustrated in the block diagram provided in FIG. 7. Namely, FIG. 7 illustrates how an expert model can be generated to include multiple functions, wherein those functions can be made accessible via different user roles. For instance, one role might have permissions to use a first function, whereas another role might have permissions to use a different function. An expert can thus create a separate client template for each user role, so that each user role has their own custom interface for their functionality.

Figure 8:
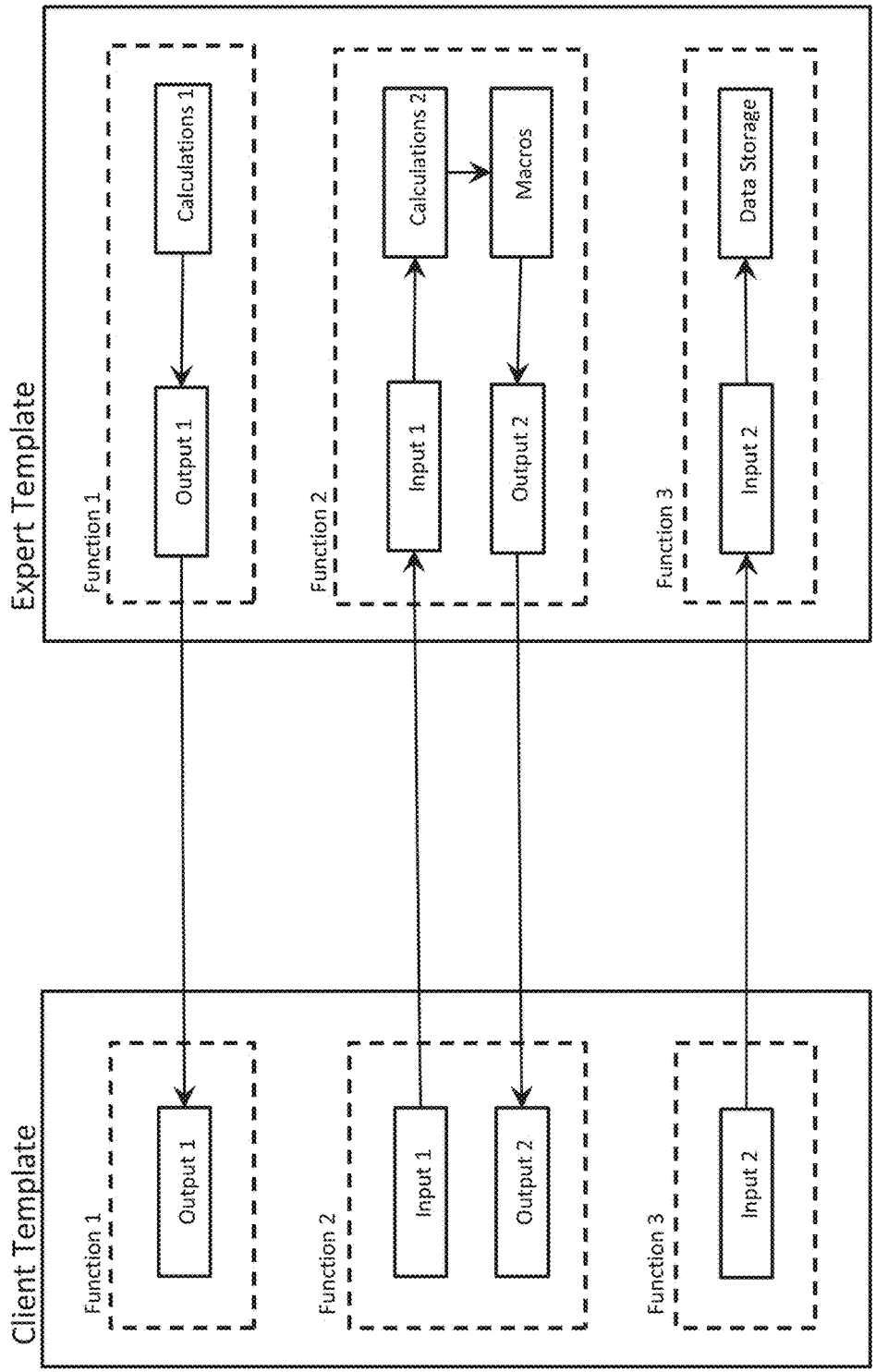
FIG. 8 is a block diagram illustrating an exemplary implementation of various function types according to an embodiment.

Referring next to FIG. 8, a block diagram is provided illustrating an exemplary implementation of various function types according to an embodiment. For this particular embodiment, the first illustrated function is configured as a "broadcasting" type, where the expert at any time can choose to publish new output data. With this function, the client would have output tables configured in their template and could either click to receive, or automatically receive the outputs when the expert publishes a new set. In a particular embodiment, an expert may thus use such function to host a model that does not require any input batch to trigger the processing and publishing of results. Instead, the expert may configure the model to only have output information, wherein the contents of that information are published as desired. The output data can be stored on the intermediary server, without association to a data ticket ID or receipt, where it may remain as the latest published data for that given model, and wherein the expert may grant end users access to the model in the same manner as in other embodiments described herein. If a client is authorized to access the model then they may automatically or manually elect to receive the latest data published for the model, which may be received into their client template, without having to submit a batch of input data. A steel company may, for example, use such a model to publish their pricing catalog, wherein prices for various steel products may vary on a daily basis. Engineers might then aggregate data from such a model into their pricing calculators to automatically keep their calculators up-to-date.

The second function illustrated in FIG. 8 is a generic function having both input and output functionality. Namely, the second function corresponds to a function where an end user submits inputs and receives back a set of outputs as results.

The third function illustrated in FIG. 8 demonstrates a scenario where the client does not receive any results for their data submission. Indeed, because an expert may choose to configure a model that does not require the publishing of any results, but rather simply defines a set of inputs, implementing such functionality may be particularly desirable. Within such embodiment, an end user may input data in a similar manner as other embodiments (e.g., via a web plugin, data processing application client plugin, etc.), and elect to submit that data to be processed by the expert. Here, an end user may simply receive a data ticket ID receipt for confirmation of their submission, but may not receive any further results for that ticket. An expert may thus use such configuration to solicit end user inputs for any of various reasons, such as inputs aggregated for a survey.

In another aspect of the disclosure, it is contemplated that a client template spreadsheet may be converted or replaced with a web version. Within such embodiment, the previously mentioned problems with converting spreadsheets to web pages may not apply because macros and other functionalities in an expert model may be removed from the client template. In this manner, a web page representing a client template may be converted from a simple visual and interactive spreadsheet for display and use on a website. The web application may provide input and output fields on a webpage to reflect the same functionality of such a client template. Once the input data is processed by the expert user, the website application may allow the expert to authenticate with the server and post results to the client template hosted on the server.

The intermediary server may also host a webpage directly for the expert user. Such a webpage may be configured to provide all the same functionality as a spreadsheet plugin running from a client computer, without requiring a client to run a spreadsheet application or install a Data Inbox application.

Such embodiment, like other embodiments, has the advantage of processing data using models and their formulae in a native environment, without conversion of such formulae into another programming language such as JavaScript or a backend server code.

Exemplary Configuration of Templates

In order to allow peer to peer processing of a model according to the present invention, templates for use by the client and the expert, respectively, are first configured.

Within a given model an expert might define various functions. For a function, an expert preferably first defines the required inputs for the model. The system may have a set of events that may occur at various times throughout the data flow process. The system may call various actions by various macros or other functions on the occurrence of these events. The expert may define macros or other functions to be called on these events, such as what macro functions to run to process the input data that has been received for a given batch of work.

In a client template spreadsheet, for instance, an expert may include particular macros that are called during a pre-submission event, such as when the end user clicks on a button to process data. Macros called during such pre-submission event may include a validation macro that determines whether the system should actually submit the data or not. A validation macro may, for example, include code that verifies whether the end user inputs are valid, wherein a "true" or "false" is returned by the macro. If the inputs are indeed valid (i.e., the macro returns "true"), the client template may be configured to continue submitting the input data. Otherwise, if the inputs are not valid (i.e., the macro returns "false"), the client template may be configured to abort submission of the input data and display a message requesting that the end user correct the inputs.

An expert may also configure the client template spreadsheet to include macros triggered by post-submission events. An expert may define such a post-submission event to be when input data is actually sent to the intermediary server and/or expert device. A macro triggered at this point may thus include code configuring the client template to perform any of various post-submission related tasks desired by the expert. For instance, upon detecting that the post-submission event has occurred, the client template may be configured to execute a notification macro that sends the end user a message confirming their data submission.

Post-download event macros on the client template are also contemplated. Execution of such macros may be triggered once the end user receives output results for their input submission. Experts may thus configure the client template to perform particular tasks upon receiving output results by encoding these macros accordingly. Such tasks may, for example, include displaying a notification message to the end user, changing the formatting of various cells according to the data type of the received results, etc.

Expert templates may also include event-triggered macros. An expert template may, for example, include macros triggered by the processing of an end user's input data. In a particular embodiment, such a macro may be called once the expert spreadsheet has been launched and the input data for a work item has been injected into the spreadsheet. An expert may thus add macro code to specify how to process input data for any given work item including, for example, performing complex simulation calculations. After the processing macro has been run, the expert template may be configured to extract the results which are then sent back to the end user.

Post-publishing macros for an expert template are also contemplated. Such macros may be triggered after an end user's input data has been processed, and the results have been extracted for publishing. An expert may encode a post-publishing macro to perform any of various tasks on the expert template such as saving the expert spreadsheet.

It should also be noted that each "function" defined in a model may have its own unique macros that get triggered by particular events. Moreover, each model may have multiple functions, wherein each function has a corresponding set of inputs, outputs, and a navigational sheet to go to once the outputs are received. A first function of a model may thus have a particular set of inputs, set of outputs, result sheet to navigate to, and macros, whereas a second function may have a completely different set of inputs, set of outputs, result sheet, and macros. As previously mentioned, model "chaining" is also contemplated in which workbooks have multiple models configured inside of it, wherein an expert template is the client template to another expert's model. Within such embodiment, a client can thus receive services from a first expert template, wherein the model of first expert template uses subsidiary services provided by a second expert template.

When configuring a model, an expert may begin by defining the required inputs for the model, which may include specifying how the inputs are to be processed (e.g., with a macro or other function). Output fields are also defined, wherein the defined information is used to generate the templates used by the present system. The input and output data may, for example, be embedded as configuration metadata in a spreadsheet file, or in a separate configuration file associated with an I/O (input/output) interface. It is also contemplated that the disclosed system may be configured to allow for an embedding of the Universal Resource Locator (URL) of a centralized intermediary server in the configuration metadata, which allows the client and expert templates to deliver the input/output data without the need for any servers running on the users' computers, and to allow private servers to support the network infrastructure in a distributed manner.

It should be noted that the client and expert templates can be in the form of two spreadsheet files, wherein each spreadsheet file comprises a corresponding pair of input/output interfaces, and wherein a particular template can comprise a plurality of functions having their respective inputs/outputs. The expert template (interface) corresponds to an original model created by an expert, while the client template comprises a "lightweight" version of at least one expert model, wherein such lightweight version excludes predetermined data and/or formulae included in the expert template (e.g., the intellectual property of the expert user). Model chaining is supported by the disclosed system, such as when a single spreadsheet includes multiple client templates respectively corresponding to multiple expert client templates. For instance, an end user's spreadsheet may include two different client templates, wherein the first client template corresponds to a first expert model hosted by a particular expert template, and wherein the second client template corresponds to a second expert model hosted by a different expert template. Furthermore, an expert model hosted by a first expert template, might itself be a client in another expert model hosted by a different expert template.

In an aspect of the disclosure, each template version is assigned a unique identifier to facilitate pairing each client/expert template with a matching expert/client template to ensure that the appropriate inputs and outputs are transferred between files. Such pairing may be performed by the intermediary server, for example, wherein pairs of templates are matched according to their identifiers so as to ensure that their versions are compatible and that the data is properly processed. In a particular embodiment, a GUID is assigned to each expert model, wherein each of the client and expert templates within a particular expert model also have a corresponding GUID. It should therefore by noted that spreadsheet templates, as disclosed herein, might have multiple model GUIDs and associated metadata.

In a further aspect of the disclosure, the client template is configured to receive input data from a client, which can then be forwarded from a client computer to an intermediary server and then to the expert's computer. The expert template, which may be present on the expert's computer, receives the input data entered into the client template and processes the data, and generates results. The results are then delivered back to the client (e.g., via the intermediary server) where the results are received by the client template and displayed through its output mechanism.

In one embodiment of the disclosed system, the client template and expert template files can be files stored on the expert's computer. In an alternative embodiment the client template and/or the expert template may be stored on an intermediary server, to allow for seamless distribution of client templates to client users, and to provide experts a way to readily back up their expert templates. Utilizing an intermediary server also facilitates a seamless deployment of clone servers for automatic scalability of processing.

In a further aspect, rather than having an end user interface with an expert model via a client template, a website interface with custom inputs/outputs is contemplated. In a particular embodiment, the expert maintains sole access to the original expert model/spreadsheet in order to maintain it in confidence. Templates stored on the intermediary server are then configured to include metadata associated with the model which correspond to the templates, in order to facilitate the transfer of information between the expert and end user.

Figure 9:
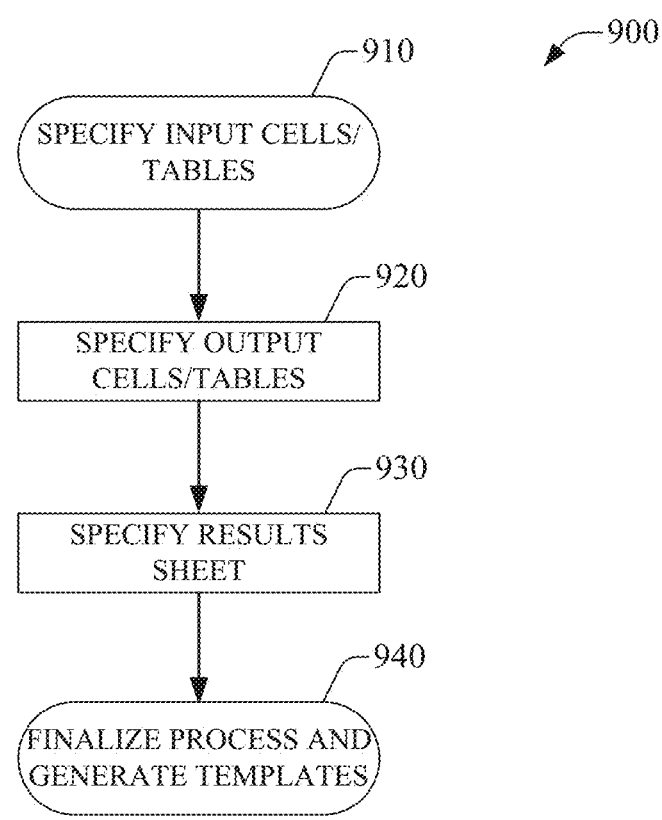
FIG. 9 is a flowchart illustrating exemplary steps for configuring an expert model and a client template according to an embodiment.

Referring next to FIG. 9, a flowchart is provided illustrating exemplary steps for configuring an expert model and a client template according to an embodiment. As illustrated, process 900 begins at act 910 with the expert specifying cells or other spreadsheet objects into which a client user is allowed to input data. In one embodiment, input cells can be highlighted using a mouse or other input device for the computer, after which application software on the expert computer (such as a plug-in) is used to identify and save the selected cell locations, for example using an "Add to Inputs" button of the interface (see e.g., FIG. 24). Alternatively, cells in a single column may be selected, wherein such cells are subsequently added as a table.

Figure 25:
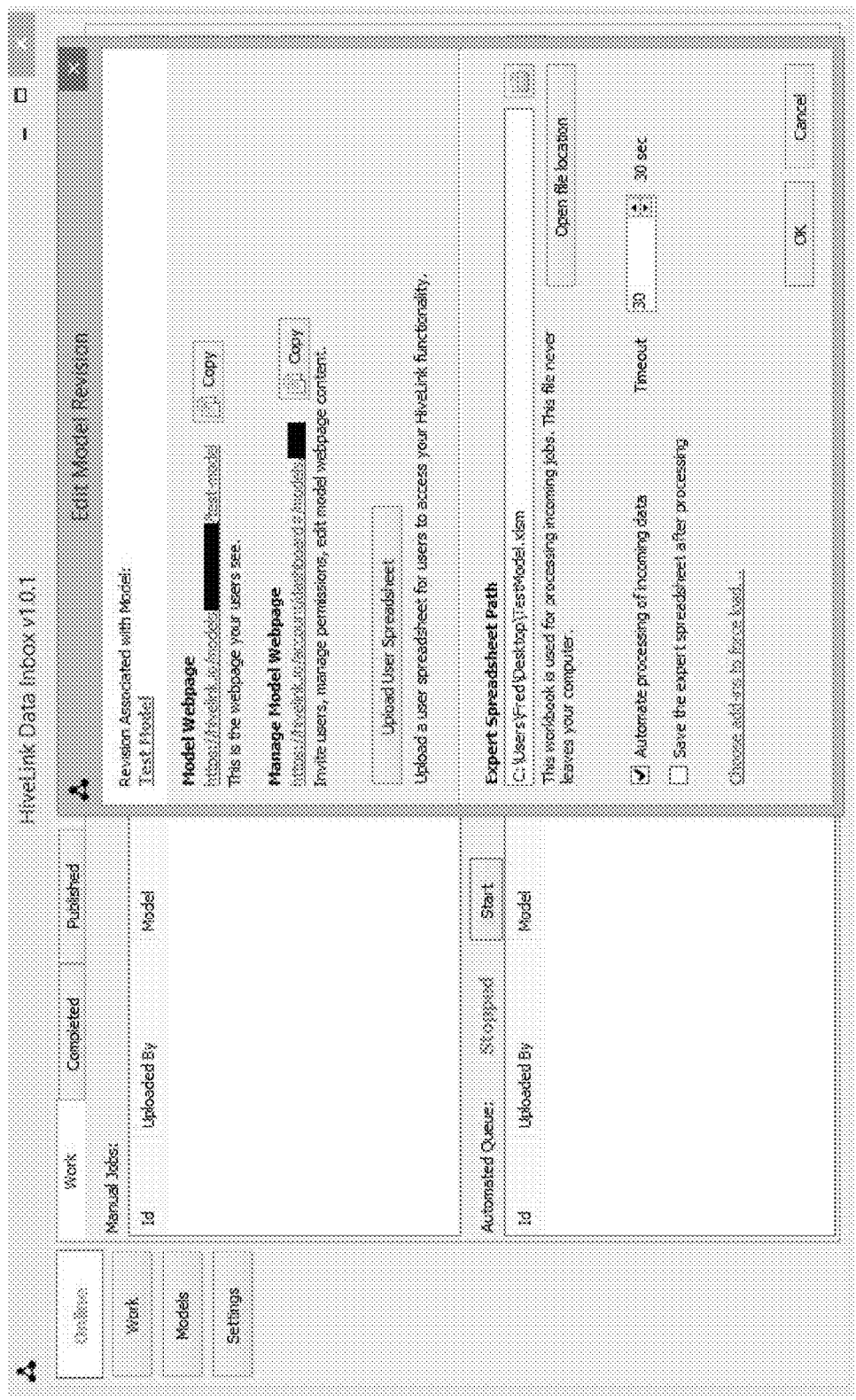
FIG. 25 is an exemplary screen shot illustrating a request to publish a finalized expert model configuration according to an embodiment.

Once an expert has specified the desired input cells/tables of a model, output cells/tables may be specified at act 920. Namely, at act 920, an expert specifies cells or other spreadsheet objects that the end user client will receive result data into. To facilitate such selection, an expert interface may include an "Add To Output Results" button, as illustrated in FIG. 25.

Once the selected objects are specified as inputs or outputs to the system, they may automatically be given a named range or other unique identifier in order to help assure that the intended data is accurately processed by a model. The specified input and output locations and their identifiers are then stored, for example as a list of data input and output locations in the metadata of the template file, and the memory of the plugin or other configuration application.

It is also contemplated that a program may specify information for navigational purposes to be stored in the template metadata, which can be understood/recognized by the plugin or other program making use of the configured file. Such navigational metadata might include the page or sheet to be displayed once results are received by the client template. After an expert user specifies the inputs and outputs for a particular function, the expert may thus specify a navigational results sheet at act 930. Process 900 then concludes at act 940 where expert and client templates are generated according to the parameters specified by the expert, wherein GUIDs are assigned for each of the expert model, expert template, and client template.

In a particular embodiment, the system automatically generates empty processing macros that the expert user can use to call their own processing functionality. The generation of these macros may occur when the user elects to configure their spreadsheet as a template for the system. Experts have the opportunity to add calls to their own processing macros that will be called on various events in the lifetime of a work item. Such events may be, but are not limited to, running code in the client spreadsheet after inputs have been submitted, running code in the client spreadsheet after output results have been received, running code in the client spreadsheet when a client elects to submit input data for processing which may return true or false to signify to the system whether to halt submission or continue running code in the expert spreadsheet after the client user's input data has been injected into the input locations to process the input data, or running code in the expert template after results have been extracted and returned to the end user. Some of those processing macros are to be left in the client template, and others are to remain only inside the expert template for the sake of keeping them confidential. A default configuration is contemplated, for instance, wherein the system automatically removes the expert macros from a client template when it is created. Alternatively, the configuration application may allow sensitive macros to be identified and removed from the expert model in a separate step before the client template is created and returned to the client. The system may also allow experts to identify their own custom macro modules to automatically remove, as well particular sheets the expert deems sensitive and does not wish to share with end users.

In another aspect of the disclosure, an application for configuring files for use in process 900 is contemplated, wherein the application enables experts to review the final configuration of a client template, including the input and output data. Such review feature may be built in to the configuration process, so that expert users can see their configuration at any point in time. For instance, such review feature may enable an expert to review all inputs and outputs specified in a particular model, as well as the URL of an intermediary server assigned to host the expert template (see e.g., FIG. 28).

Figure 10:
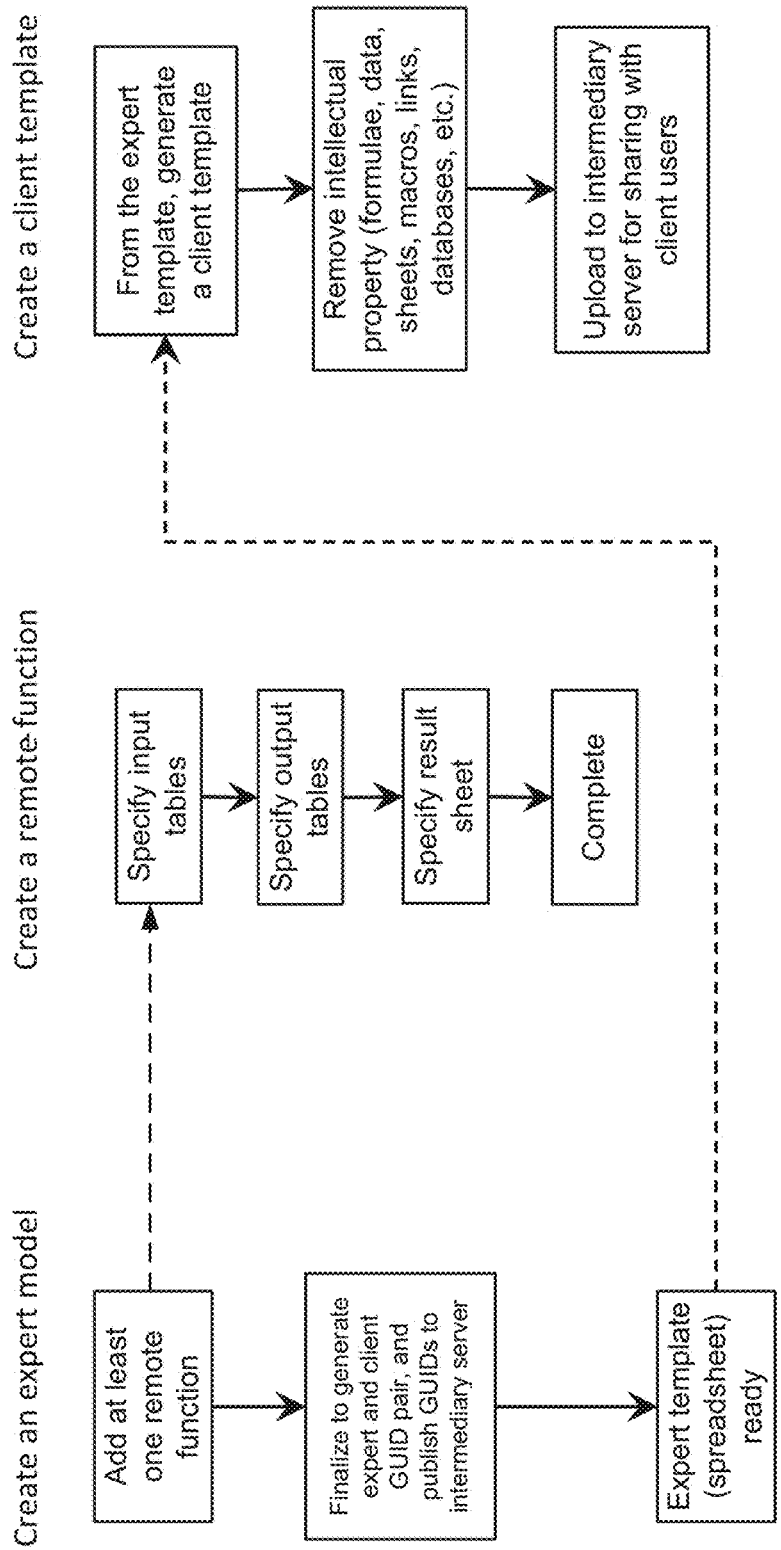
FIG. 10 is a block diagram illustrating an exemplary task flow that facilitates generating templates according to an embodiment.

In a particular embodiment, the finalization of an expert template simply comprises notifying the intermediary server that a new expert model has been created, wherein the expert can perform the actual generation of the client template at any time. Nevertheless, it is contemplated that the end result of the configuration process is the creation of a "lightweight" version of the original expert spreadsheet (i.e., a client template), and an expert template. Here, the expert template corresponds to the original model or spreadsheet created by the expert, with metadata identifying input cells to be received for processing, formulae to be used in processing results, and output cells to return to the end user client. The client template, on the other hand, includes metadata identifying input cells to receive data which is to be sent for processing, an intermediary server URL to send the input data to, and output cells into which results are to be received, but does not include sensitive intellectual property present in the original model. This configuration information enables the remote processing of an end-user's input data remotely by the original model's processing mechanism (using the expert template). In embodiments which make use of EXCEL® spreadsheets, this metadata can be stored in the spreadsheet by embedding it in the spreadsheet's "Custom XML Parts", which is a mechanism provided for storing additional metadata associated with a spreadsheet. A block diagram illustrating an exemplary task flow that facilitates generating templates according to an embodiment is provided in FIG. 10.

As stated previously, data broadcasting/subscription service models are also contemplated, wherein output-only client templates are utilized. Accordingly, the aforementioned configuration process may enable an expert to configure models in which an end user client does not need to submit an input request to receive a set of results, but rather the expert may simply create a client template that is configured to only receive data results. Within such embodiment, an expert user may still control user access to this subscription service model, but clients may not need a corresponding data batch ID to receive the data.

Models that utilize input-only templates are also contemplated, wherein such models may facilitate a survey solicitation service, for instance. Here, an expert may thus configure a client template to receive data from clients without needing to send them any results or data in response. Within such embodiment, end user data collected by the client template is forwarded to the expert template via the intermediary server, wherein a spreadsheet hosted by the expert template is populated with the end user data.

Exemplary Intermediary Server Embodiments

Various exemplary intermediary server embodiments are now disclosed. In a particular embodiment, the intermediary server is implemented using a global web server. Such servers may, for example, be configured with additional capability to deploy private and independent instances of these servers for embodiments in which users want to manage and maintain their own intermediary server data integrity and security. As previously mentioned, the disclosed intermediary server may be further configured to enable and facilitate data transfer between an expert user device and an end user client device, wherein input data from the end user is relayed to the expert user device from the intermediary server. Likewise, results corresponding to a processing of the input data on the expert user device are relayed to the end user client device via the intermediary server.

In order to ensure accurate data transfer, data exchanges between the expert and client computers via the intermediary server may comprise identifying the template version client GUID, which allows the data processing application running on the expert's computer to identify the associated location (file path) of the expert template files on the expert's local computer. Following the creation of the client and expert templates, when a client elects to process a task using a client template, the client interface application (such as a spreadsheet with a plugin to provide necessary functionality for the client's computer) preferably reads the client template's metadata to obtain the intermediary server URL. The application may connect to the intermediary server via the obtained URL, and subsequently send the client's input data along with authentication information to the server. If the expert user has granted the client access to use the model, then the intermediary server will store the input data in its database and return a receipt ID to the client corresponding to that data batch submission. If the expert template/model is connected to the intermediary server at that moment, then that data batch is preferably delivered to the expert to be processed. If a client goes offline, the expert can still process previously uploaded input data. Similarly, if an expert goes offline, a client may still upload data to the intermediary server to be processed but will have to wait for the expert's system to be back online to do the processing in this embodiment.

Figure 11:
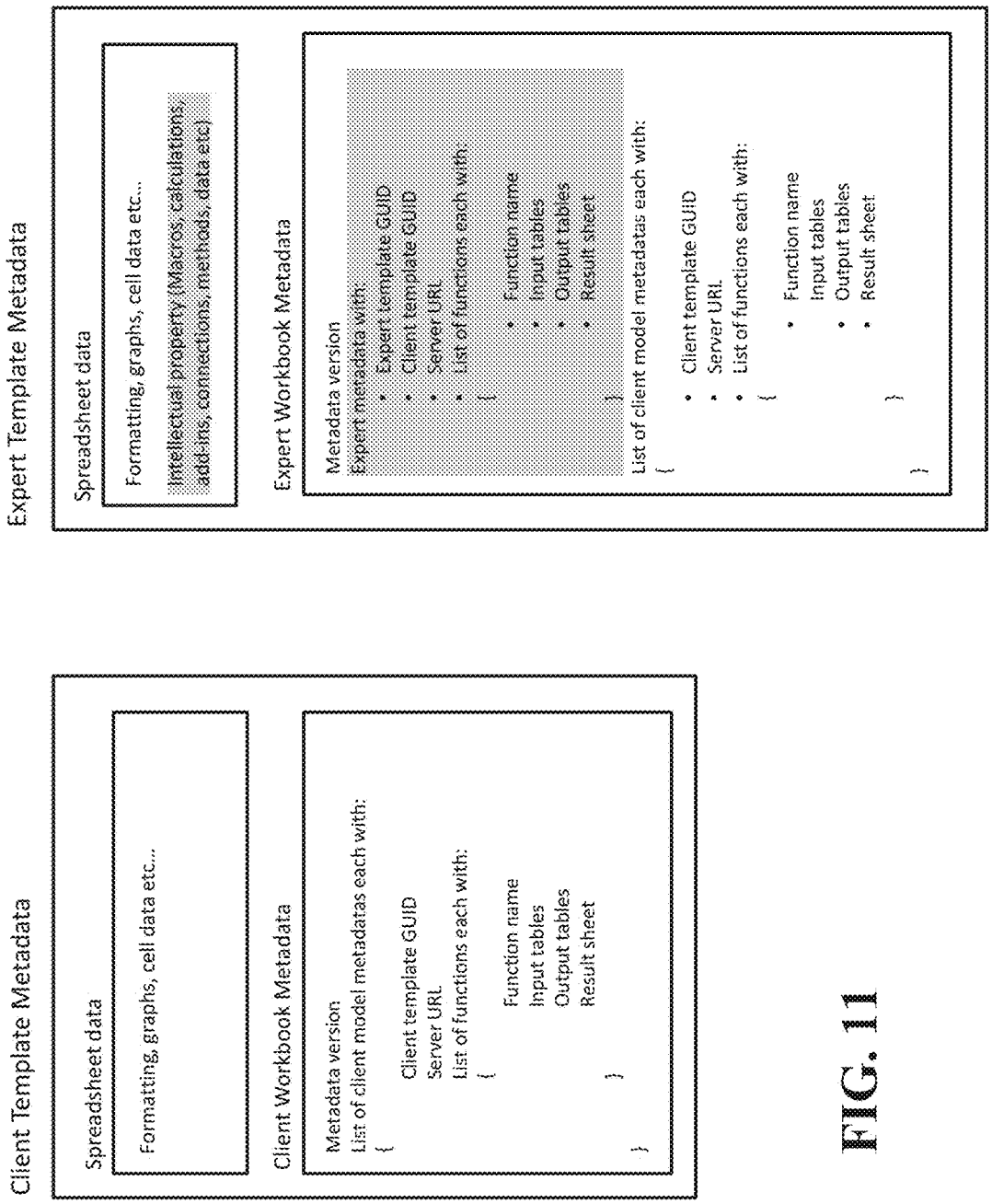
FIG. 11 is a chart illustrating an exemplary difference between client 'lightweight' template metadata and original template metadata.

Metadata in the client template preferably includes a GUID to identify its associated model, list of input fields, list of output fields, and the URL of the intermediary server to which input data can be delivered and from which output data can be received. Differences between the client template metadata and the expert template metadata in one embodiment are shown in FIG. 11. As illustrated, the expert template preferably has metadata similar to that of the client template, with additional information such as the intellectual property and macros that facilitate processing the input data. The expert template metadata also preferably includes the version GUID of the expert template itself. The Data Inbox application preferably stores metadata associated with each model GUID, including the location of the actual spreadsheet files to launch into a data processing application such as EXCEL®. Once launched, the Data Inbox signals for the plugin to read the template metadata and insert the input data from the item-batch into the original locations in the model specified by the metadata. Once the file is launched and the input data inserted, the Data Inbox application instructs the data processing application to process the input data, preferably by instructing a plugin to interact with the data processing application, and preferably running a specific macro associated with this processing event, in order to produce the output data. The expert user may have particular processing macros inside the specific processing event macro, allowing the expert to perform custom processing. The Data Inbox application then communicates with the plugin to extract the output data defined in the expert template metadata, which the plugin sends back to the Data Inbox application to send back to the intermediary server accordingly.

Figure 12:
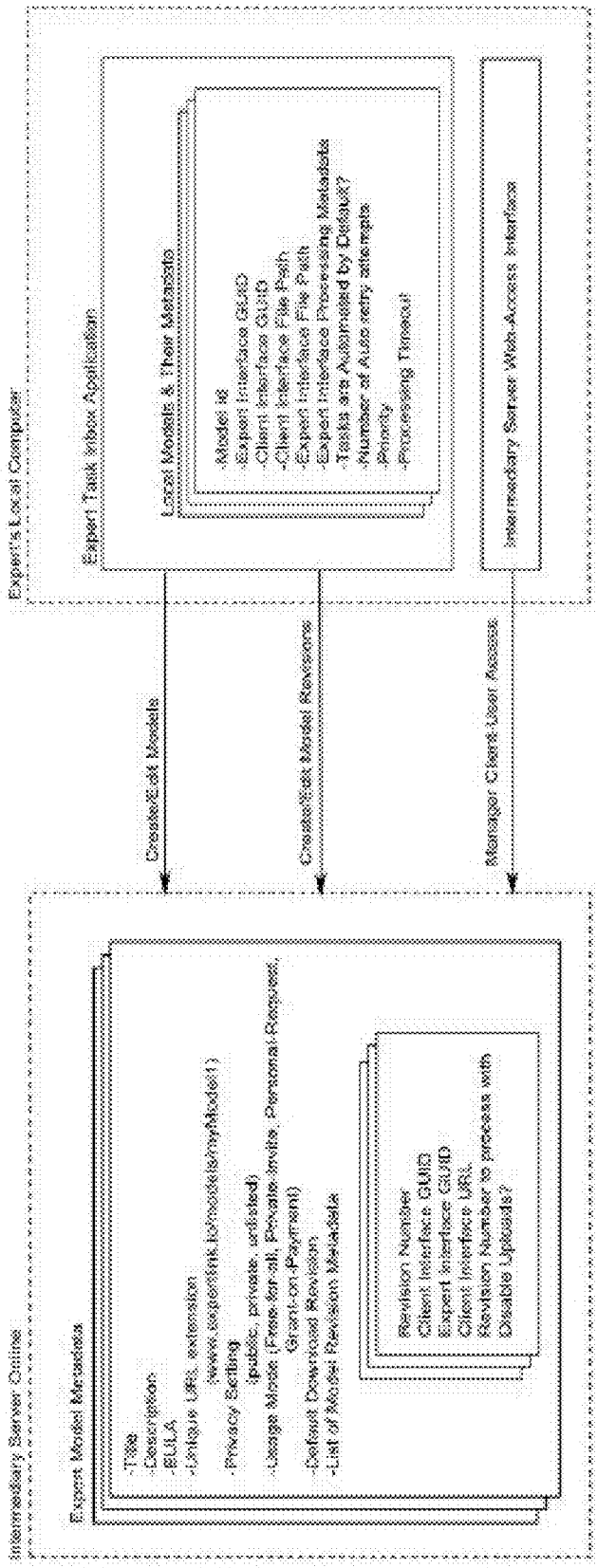
FIG. 12 is a chart illustrating an exemplary arrangement and division of metadata between a template on an expert user's computer and model metadata on an intermediary server.

Exemplary differences between expert template metadata and server file metadata can be seen in FIG. 12. As illustrated, the intermediary server receives information about the model that it displays on a web page publicizing the model, but not information about the functionality of the model itself. The information stored on the server can include, for example, the title of the model to display in a model search database, the model owner's name, a description, contact information, the URL extension containing the model information, the search privacy settings, and a usage mode. A list of the versions of the templates associated with that model and their associated GUIDS may also be stored, as well as a list of end users that the expert has enabled to access the model.

Data sent from the client template may be encrypted before being sent, or may be encrypted on the server once it is received. The intermediary server can store the encrypted input data, without needing to know any format, structure, or information about the encrypted data other than the version GUID associated with that data, which is preferably delivered to the server in a non-encrypted format. Such encrypted data is stored with a data batch item associated with the model specified by the version GUID, thus also identifying the expert user to whom the data should be sent for processing.

In this embodiment, no intellectual property is stored on the intermediary server, only metadata associated with the expert's model (the expert template) and the corresponding input and output data. A list of exemplary metadata stored by an intermediary server and obtained from an expert user in one embodiment of the present invention is shown in FIG. 12. As illustrated, metadata for an expert's model on this intermediary server may include a list of user permissions that the expert user may have granted to various end users for that model. It may also include all the necessary information associated with a model in order to be able to display a webpage where the expert offers the model for use by end user clients according to an embodiment of the disclosed system. In a particular aspect of the disclosure, it is contemplated that templates may preferably include a minimal list of metadata identifying the version GUID for each template associated with a model. Moreover, it is noted that a model may have multiple versions, wherein each version preferably has a different GUID for the template(s) associated with that model. If a client uploads input data from an older template version, the expert may configure older template client GUIDs to be processed with newer template versions. The intermediary server thus manages user data, allowing end-user clients to submit their data for processing, where it is stored on the intermediary server until it is delivered and accessed by the expert user for processing.

Several advantages of utilizing an intermediary server in the present system, as disclosed herein, relative to conventional web-based spreadsheet applications are noted. For instance, by utilizing an architecture that includes the disclosed intermediary server, spreadsheet models may be accessed remotely via a web browser, yet the core functionality can remain in the expert device and thus run in its native format and environment. Moreover, by including the disclosed intermediary server, end users may access any of a plurality of unique models, wherein those models are executed by expert devices rather than the intermediary server. Such architecture may thus be particularly desirable when there are many unique models, since the resources of a single server might be inadequate for running a large number of dependencies. Also, because experts are able to process their own models, security issues associated with running expert models on the intermediary server are avoided. Indeed, allowing experts to execute their models on an intermediary server would pose a significant security threat, since experts may intentionally or inadvertently harm the intermediary server with such execution. The aspects disclosed herein thus enable an expert to execute their models within their own trusted environment, without requiring them to maintain their own web server.

The intermediary server of the present system can also manage user authentication, when this is employed, to ensure the security of client data and an expert's intellectual property. The intermediary server thereby allows experts to securely receive inputs and provide processed data without having to create and host a separate website with specialized programming Preferences determined by the system or by the expert or client users can also be implemented by the server, such as privacy settings and licensing information. Preferably, the intermediary server provides a single authentication service for any other servers used in the present system, in order to allow for a distributed data hosting infrastructure across many intermediary servers and to facilitate authentication using a single common centralized authentication service. Such a centralized authentication service may be implemented using other authentication platforms such as Google Identity Platform®.

In another aspect of the disclosure, if an end user and/or expert is concerned about having their data stored on a third party's intermediary server, they can choose to deploy their own intermediary server and manage the hosting of that application. In this case, an expert can configure the expert template to connect to two or more different intermediary servers and host expert templates for each of them, using the same local computer and same intellectual property to service clients through each server, which allows end users to manage the storage of their input and output data themselves. In such scenarios, the client template metadata may, for example, include the new intermediary server URL where the expert has chosen to host their model service, wherein the input/output data is stored there and trusted by the expert.

It is also contemplated that the intermediary server may be configured to facilitate remote functionality, which allows remote applications to login (when desired), upload input data batches associated with a model, download input data batches for experts to process, upload output data (i.e., results or one-way push data), and/or download output data (results or one-way push data) batches for clients to receive results. The underlying protocol may be implemented using any of a number of software frameworks or formats, such as Microsoft ASP.NET, WebApi2, and/or the JSON protocol. The intermediary server also preferably allows for the creation of user accounts and provides credentials for account login, when desired and/or implemented for an end user and/or expert user. The server can also store client templates and allow them to be downloaded by end user client devices, when permitted by the corresponding expert user.

A further advantage of using an intermediary server as disclosed herein, is that web hosting issues can be outsourced to an entity managing the intermediary server rather than the expert user. Indeed, since many expert users may not want to host their own dedicated server, nor would many expert users want to develop, maintain, or host a web service, an externally managed server may be particularly desirable. In a particular embodiment, the present invention allows experts to simply run a desktop application to provide their model's functionality as a global web service, wherein the expert users are not required to have knowledge of web hosting technology. It also allows experts to turn off their computer, thus disconnecting their data processing application, while still allowing end-user clients to submit data for processing at a later date when the expert goes online again.

In yet another aspect of the disclosure, it is contemplated that the intermediary server can be configured as a marketing platform for expert models. Within such embodiment, an expert user's models can thus be marketed and distributed via an online retailer (e.g., as an Apple® or Android® application). Experts can also utilize the intermediary server to view and control end user access to their models. Moreover, the intermediary server may be utilized by users to register as end users and/or experts (i.e., consumers and/or providers of models), wherein the intermediary server stores all the metadata and data content associated with an expert user's customized store page.

Figure 13:
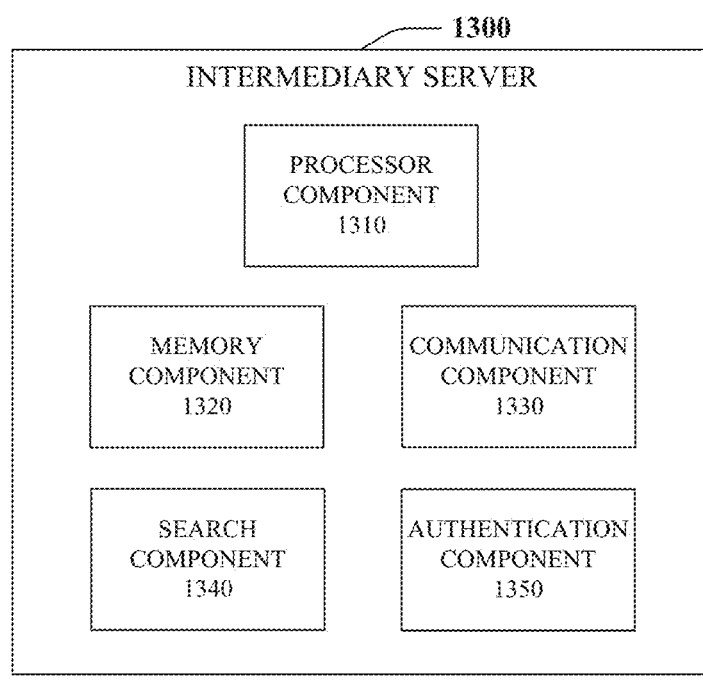
FIG. 13 illustrates a block diagram of an exemplary intermediary device that facilitates sharing spreadsheet processing models in accordance with an aspect of the present specification.

Referring next to FIG. 13, a block diagram is provided of an exemplary intermediary server 1300 that facilitates sharing spreadsheet processing models according to aspects disclosed herein. For instance, intermediary server 1300 may be configured to provide end users with a conduit to access expert models, as well as a platform for expert users to publish their expert models. As shown in FIG. 13, intermediary server 1300 may include a processor component 1310, a memory component 1320, a communication component 1330, a search component 1340, and an authentication component 1350.

In one aspect, processor component 1310 is configured to execute computer-readable instructions related to performing any of a plurality of functions. Processor component 1310 can be a single processor or a plurality of processors which analyze and/or generate information utilized by memory component 1320, communication component 1330, search component 1340, and/or authentication component 1350. Additionally or alternatively, processor component 1310 may be configured to control one or more components of intermediary server 1300.

In another aspect, memory component 1320 is coupled to processor component 1310 and configured to store computer-readable instructions executed by processor component 1310. Memory component 1320 may also be configured to store any of a plurality of other types of data including data generated by any of communication component 1330, search component 1340, and/or authentication component 1350. Memory component 1320 can be configured in a number of different configurations, including as random access memory, battery-backed memory, Solid State memory, hard disk, magnetic tape, etc. Various features can also be implemented upon memory component 1320, such as compression and automatic back up (e.g., use of a Redundant Array of Independent Drives configuration). In one aspect, the memory may be located on a network, such as a "cloud storage" solution.

As illustrated, intermediary server 1300 may also comprise communication component 1330 and search component 1340. When intermediary server 1300 is used to provide end users with access to expert models, communication component 1330 may be configured to receive an end user request associated with a spreadsheet model, whereas search component 1340 is configured to identify an expert spreadsheet template in accordance with the end user request, and a client spreadsheet template corresponding to the expert spreadsheet template. Communication component 1330 is then further configured to facilitate a communication between the client spreadsheet template and the expert spreadsheet template, wherein the communication initiates an execution of instructions embedded in the expert spreadsheet template in response to an end user input received via the client spreadsheet template.

With respect to identifying an expert spreadsheet template and corresponding client spreadsheet template, it should be appreciated that search component 1340 may be configured to facilitate such identifications in any of a plurality of ways. For instance, search component 1340 may be configured to identify client spreadsheet templates by matching an identifier (e.g., a GUID) associated with the expert spreadsheet template with a corresponding identifier associated with the client spreadsheet template. Search component 1340 may also be configured to parse end user requests for search terms associated with a desired spreadsheet model, wherein identifying the expert spreadsheet template comprises performing a search of an expert spreadsheet template database based on the search terms.

In another aspect of the disclosure, communication component 1330 may be configured to provide experts and/or end users with any of various types of user interfaces. For instance, as previously mentioned, a web-based interface is contemplated. Within such embodiment, communication component 1330 may thus be configured to provide end users with a web-based client interface configured to populate a client spreadsheet template with data input by the end user via the web-based client interface.

In a further aspect of the disclosure, particular types of communications between the client spreadsheet template and the expert spreadsheet template are contemplated. For instance, the client spreadsheet template may be an input-only spreadsheet having input-only functionality, wherein the communication is a one-way communication of data from the client spreadsheet template to the expert spreadsheet template. Similarly, the client spreadsheet template may be configured as an output-only spreadsheet having output-only functionality, wherein the communication is a one-way communication of data from the expert spreadsheet template to the client spreadsheet template.

As illustrated, intermediary server 1300 may further comprise authentication component 1350. Here, it is contemplated that authentication component 1350 may be configured to authenticate both expert users and end users attempting to access an expert model. For instance, authentication component 1350 may be configured to authenticate an expert user attempting to edit a previously stored expert model. Similarly, because an expert user may want to limit access to particular models, authentication component 1350 may be configured to authenticate end users so that only end users having permission to access a particular model are granted such access. For instance, search component 1340 may be configured to identify expert spreadsheet templates for a particular end user by performing a search of an expert spreadsheet template database based on an authentication status of the end user.

Figure 14:
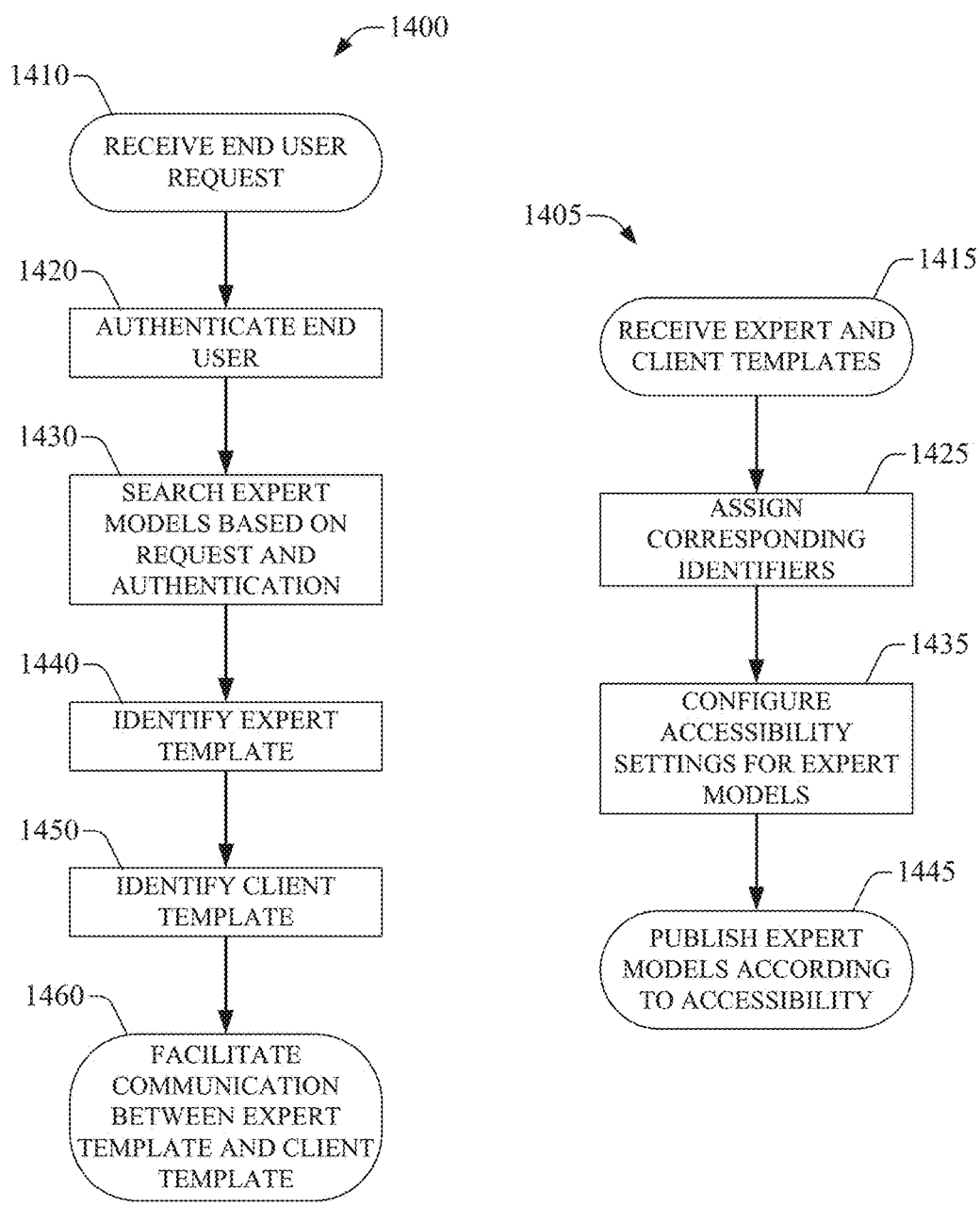
FIG. 14 is a flow diagram illustrating an exemplary methodology for utilizing an intermediary device to facilitate sharing spreadsheet processing models according to an embodiment.

Referring next to FIG. 14, a flow chart illustrating exemplary methodologies for utilizing an intermediary device to facilitate sharing spreadsheet processing models is provided. Here, it should be noted that process 1400 is directed towards utilizing an intermediary device to interface an end user with an expert model, whereas process 1405 is directed towards utilizing an intermediary device to facilitate publishing spreadsheet models developed by expert users. As illustrated, processes 1400 and 1405 include a series of acts that may be performed within a computing device (e.g., intermediary server 1300) according to aspects of the subject specification. For instance, processes 1400 and 1405 may be implemented by employing a processor to execute computer executable instructions stored on a computer readable storage medium to implement the series of acts. In another embodiment, a computer-readable storage medium comprising code for causing at least one computer to implement the acts of processes 1400 and 1405 is contemplated.

As illustrated, process 1400 begins at act 1410 with the intermediary server receiving an end user request to utilize an expert model. Such request may further include authentication credentials, which the intermediary server uses to authenticate the end user at act 1420. After authenticating the end user, a search of expert models is performed by the intermediary server at act 1430, wherein the search is based on items included in the end user request (e.g., search terms) and an authentication status of the end user. An expert spreadsheet template is then identified at act 1440, followed by the identification of a corresponding client spreadsheet template at act 1450, wherein such identifications may comprise matching GUIDs assigned to an expert model, expert spreadsheet template, and client spreadsheet template. Process 1400 then concludes at act 1460 where a communication between an expert spreadsheet template and a client spreadsheet template is facilitated.

Referring next to process 1405 in which an intermediary device is used to facilitate publishing spreadsheet models developed by expert users, it is noted that such process may begin with the intermediary server receiving expert spreadsheet templates and corresponding client spreadsheet templates from an expert user device at act 1415. After receiving these templates, process 1405 proceeds with the intermediary server assigning identifiers to each template and corresponding model at act 1415. Next, at act 1425, the intermediary server configures the accessibility settings for the expert model, wherein such settings determine which end users may access this particular model (e.g., invitation-only model, public model, etc.). Process 1405 then concludes at act 1435 where the intermediary server publishes the expert model according to the accessibility defined at act 1425.

Exemplary End User Device Embodiments

Various exemplary end user device embodiments are now disclosed. In a particular embodiment, a client template is retrieved by the end user device, which allows an end user to load a version of an expert's model without the expert's intellectual property. The application which runs the client template may be a plugin operating with a data processing application, as described herein. The plugin and/or application can facilitate client login and access authentication for the end user, as well as administering input data and processing requests. The plugin/application also preferably allows the end user to download historical data items, and to search a history of their previous processing batches. For example, the end user can submit data processing tasks with the application/plugin, receive results, and/or receive a receipt ID to retrieve results later. As an alternative to installing a plugin and/or application on a client's local computer, the client template can be hosted on a remote server, such as the intermediary server, which can be configured to display the client template using a browser or another application with an appropriate interface and to receive inputs of data from an end user client device. Client input data can be provided to the intermediary server using any of a variety of formats, such as JSON text format or XML.

After providing input data into a client template, an end user may elect to process the input data with the expert's model. In one embodiment, a client interface application (e.g., a plugin) reads the embedded template metadata to determine which input fields to extract data from and then post that data and metadata to a remote intermediary server to be processed later. If the intermediary server receiving the input data submission deems that the client has sufficient permissions to use the expert's model, for example as determined by the client GUID specified in the template metadata and submitted along with the input information, then the data can be stored on the intermediary server and the end user is given a unique receipt ID number to match their data submission. If the expert has chosen to configure this model for automatic processing then the client may wait for the data to be processed and may receive the result data shortly after submission, otherwise the end user may elect to download task results at a later date by providing the receipt ID for the data submission batch for which they want to receive results. If the results are not yet completed when an end user requests them from the intermediary server, then the end user may be notified and will then have to wait to receive them.

When results are received by the end user client device and/or by the intermediary server hosting the client template, they may be parsed according to the metadata structure of the expected results in the configuration metadata embedded in the client template, as seen in FIG. 11. Using an application such as the MICROSOFT EXCEL® client spreadsheet plugin, the result data can be inserted into the client template output locations defined in the client template metadata, preferably in the corresponding mirrored locations as reflected in the originating expert template. Received results may be in the form of text strings, for example, which may then be parsed into a spreadsheet or other application as specified by the input/output configuration metadata. Received results may also be in the form of a downloadable file, or in a custom data format that may be parsed by the interface system (e.g., a serialized JSON or XML format).

In a preferred embodiment, the plugin/application operating on an end user client device or an intermediary server hosting a network-accessible application and interface for the end user enables the end user to search a history of previously processed data batches, which are advantageously stored on the intermediary server. The end user is also preferably able to download and/or view related results.

Figure 15:
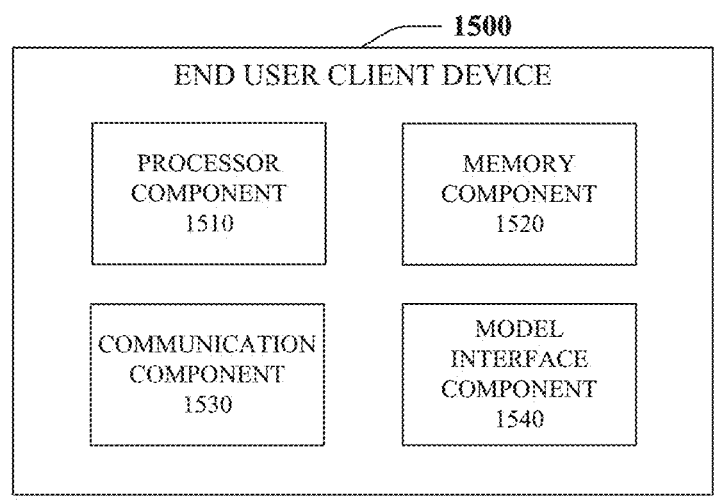
FIG. 15 illustrates a block diagram of an exemplary end user client device that facilitates sharing spreadsheet processing models in accordance with an aspect of the present specification.

Referring next to FIG. 15, a block diagram is provided of an exemplary end user client device 1500 that facilitates sharing spreadsheet processing models in accordance with a disclosed aspect. As illustrated, end user client device 1500 may include a processor component 1510, a memory component 1520, a communication component 1530, and a model interface component 1540.

Similar to processor component 1310 in intermediary server 1300, processor component 1510 is configured to execute computer-readable instructions related to performing any of a plurality of functions. Processor component 1510 can be a single processor or a plurality of processors which analyze and/or generate information utilized by memory component 1520, communication component 1530, and/or model interface component 1540. Additionally or alternatively, processor component 1510 may be configured to control one or more components of end user client device 1500.

In another aspect, memory component 1520 is coupled to processor component 1510 and configured to store computer-readable instructions executed by processor component 1510. Memory component 1520 may also be configured to store any of a plurality of other types of data including data generated by communication component 1530 and/or model interface component 1540. Here, it should be noted that memory component 1520 is analogous to memory component 1320 in intermediary server 1300. Accordingly, it should be appreciated that any of the aforementioned features/configurations of memory component 1420 are also applicable to memory component 1520.

As illustrated, end user client device 1500 may also include communication component 1530 and model interface component 1540. Here, communication component 1530 is configured to transmit an end user request corresponding to a spreadsheet model, whereas model interface component 1540 is configured to interface end user client device 1500 with a client spreadsheet template associated with the at least one expert spreadsheet template corresponding to the spreadsheet model. Within such embodiment, communication component 1530 is further configured to initiate an execution of instructions embedded in the at least one expert spreadsheet template, wherein the execution is initiated in response to an end user input received via the client spreadsheet template.

In a particular aspect of the disclosure, it is contemplated that end users may access an expert model via a web-based interface. Moreover, it is contemplated that model interface component 1540 may be configured to interface end users with a client spreadsheet template via a web-based client interface. Within such embodiment, model interface component 1540 may be configured to populate a client spreadsheet template with data input by an end user via the web-based client interface. Alternatively, model interface component 1540 may be configured to simply provide end users with a web-based interface to input their data, wherein such data is subsequently forwarded to the intermediary server and populated into the client spreadsheet template by the intermediary server.

In another aspect of the disclosure, it is contemplated that model interface component 1540 may be configured to receive an output resulting from a remote processing of the end user input on an expert spreadsheet template. To this end, it should be noted that such output may be received in any of a plurality of forms (e.g., a spreadsheet, a downloadable file, blob data, etc.), wherein model interface component 1540 may then be further configured to properly display such output to the end user. It should also be noted that, rather than receiving an actual output, model interface component 1540 may be configured to receive an identifier (e.g., GUID) corresponding to an output, wherein the identifier facilitates a subsequent retrieval of the output from the intermediary server.

In yet another aspect of the disclosure, it is contemplated that model interface component 1540 may be configured to provide end users with "model chaining" functionality. For instance, model interface component 1540 may be configured to combine a plurality of expert spreadsheet templates to form a new spreadsheet model, wherein the client spreadsheet template is configured to initiate a remote processing of an end user input on each of the plurality of expert spreadsheet templates. Model interface component 1540 may also be configured to create a model in which an expert spreadsheet template is a client spreadsheet template to at least one other expert spreadsheet template. (See e.g., FIG. 4).

Figure 16:
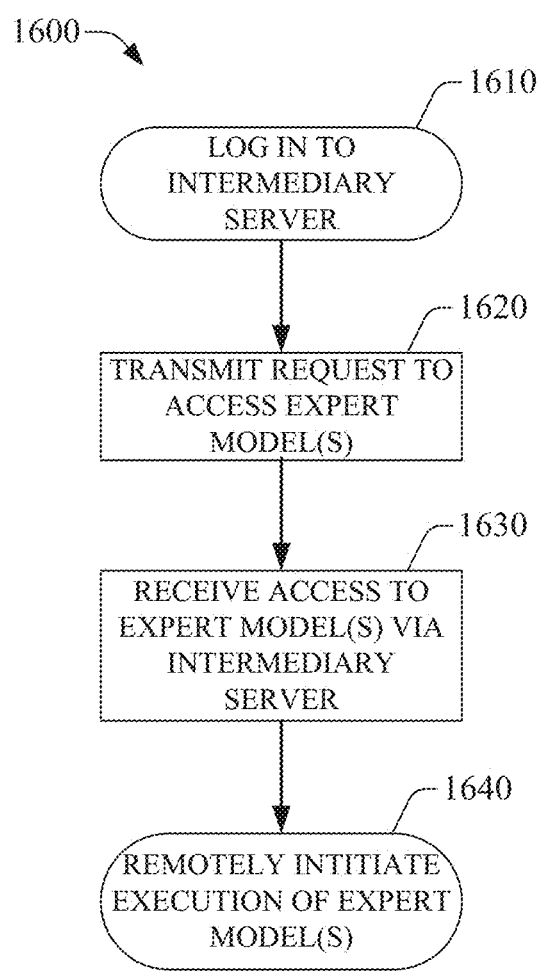
FIG. 16 is a flow diagram illustrating an exemplary methodology for utilizing an end user client device to facilitate sharing spreadsheet processing models according to an embodiment.

Referring next to FIG. 16, a flow chart is provided illustrating an exemplary methodology for utilizing an end user client device to facilitate sharing spreadsheet processing models according to an embodiment. As illustrated, process 1600 includes a series of acts that may be performed within a computing device (e.g., end user client device 1500) according to an aspect of the subject specification. For instance, process 1600 may be implemented by employing a processor to execute computer executable instructions stored on a computer readable storage medium to implement the series of acts. In another embodiment, a computer-readable storage medium comprising code for causing at least one computer to implement the acts of process 1600 is contemplated.

In an aspect, process 1600 begins at act 1610 with the end user client device logging into an intermediary server. Here, it is noted that such log in procedure may require having the end user client device send authentication credentials to the intermediary server. Once the end user has been authenticated, a request to access an expert model may then be transmitted by the end user client device to the intermediary server. It should be appreciated that requests sent by the end user client device may be provided in any of various forms. For instance, such request may include an identifier corresponding to a particular expert model and/or expert spreadsheet template. An identifier corresponding to an earlier execution of an expert model may also be included in the request, wherein the identifier facilitates a retrieval of the output corresponding to the earlier execution. Also, rather than providing an identifier, an end user may perform a search of expert models by transmitting a request embedded with search terms associated with a desired model.

After transmitting a request to access an expert model, the end user client device then receives access to the requested models at act 1630. Here, it should be appreciated that such access may depend on any of a plurality of factors including, for example, the accessibility permissions associated with the requested models. Once access is granted to an expert model, process 1600 then concludes at act 1640 where the end user client device remotely initiates an execution of the expert model. For instance, initiating such execution may comprise providing an end user input to the intermediary server, wherein an output remotely generated by an expert user device is then returned to the end user client device via the intermediary server. If the model is a "broadcast" type model, initiating such execution may simply comprise clicking a button on the client interface, wherein an output remotely generated by an expert user device, without an input from the end user, is returned to the end user client device via the intermediary server. Alternatively, if the model is a "survey" type model, initiating a remote execution may comprise submitting end user input data to the intermediary server, wherein the end user input data is remotely stored/processed by an expert user device, and wherein no output is returned to the end user.

Exemplary Expert User Device Embodiments

Various exemplary expert user device embodiments are now disclosed. In a particular embodiment, the processing of input data from a client template can be performed either on an expert user device, or on another computer selected by the expert. The selected computer operates a data processing application (e.g., a Data Inbox application), which is additionally configured (either natively or through the use of a plugin) to receive the client input data batches and to run the appropriate model. The Data Inbox application preferably stores metadata associated with a given model, which may be identified by the model templates' version GUIDs, allowing it to know the file locations of the appropriate spreadsheets or processing mechanisms. The expert Data Inbox application is run on a local computer or an alternative computer or server, and preferably maintains a connection to an intermediary server in order to immediately receive any new data submission tasks from clients using the expert's model.

In one embodiment, a data processing application for use in the present system may be implemented using a programming language such as Python or MATLAB, and the Data Inbox can be configured to launch the custom application and have a pre-contracted interface that behaves in a similar way as a plugin, allowing for the injection of information into a template (e.g., where such injection is dictated/coordinated by the Data Inbox), the processing of information, and the extraction of results. Such a custom program may read and parse the associated template metadata and coordinate what to do with the input data once the Data Inbox has instructed it to inject the data. The custom program can also be instructed to extract the data to return it back to the Data Inbox for publishing.

When the expert Data Inbox application receives the input data from a client (a batch or data task) using a client template, it will look for a local configuration object, which tells the application how to process such a work item. Such configuration information can be seen for example in FIG. 11. If the configuration for the model associated with the batch exists, and if the expert application is configured to run automatically, then the application will attempt to process the item using the specified configuration.

When plugins are used with a data processing application in the present system, such plugins are preferably operable to be initialized; given the input data from a client's data batch/task; signaled to run various processing methods on startup or for data processing or other events; and extract result data from the data processing application. For example, a plugin operable with the EXCEL® spreadsheet program can be configured to launch the program and open the expert template file based on information from the client data processing request. The input data is then processed by the data processing application using the expert template configuration, driven by the Data Inbox that received the input batch in communication with the plugin running inside the data processing application. The application reads the expert template metadata configuration information and injects the batch's input data accordingly.

The input/output metadata from the client template should preferably be the same as the expert template, so the data received from the batch fits into the same location it came from, but in the expert version of the template. One way to help assure appropriate pairing of the client and expert templates is to assign a unique GUID to each template. When the client and expert templates are created, they are both given a unique GUID. That GUID pair is stored in the expert template metadata, and on the intermediary server. The expert's Data Inbox application may make sure that an incoming data batch's client GUID matches, or is compatible with, the GUID associated with the expert template it is going to be processed with. The expert GUID preferably is not included in the client template metadata. The expert Data Inbox application may store the file locations of the client and expert templates as part of the local configuration information, to track which file to launch to process items for a given model. Since end-user clients may still potentially tamper with the input/output fields, a plugin for use in the present system may preferably have a mechanism to ensure that the template metadata matches the actual spreadsheet structure and that all necessary components are complete and available.

In a particular aspect of the disclosure, a Data Inbox application is provided to expert users, wherein the Data Inbox application receives work item batches and launches them into a spreadsheet program (e.g., EXCEL®) for either automatic or manual processing, depending on the settings chosen by the expert user. A queue of work items may also be displayed to expert users, wherein such work items have been uploaded by end user clients to an intermediary server and received for processing, and wherein the work items may also be separated into input batches awaiting manual processing or processed automatically. This application preferably stays connected to the intermediary server, receiving data in real time, and storing a repository of template configurations and a queue of work to be processed. The application is also responsible for launching new work items/batches/tasks into the data processing application (spreadsheet).

When the Data Inbox application receives an input data batch from an end user, it may store the input batch as an item in a queue of work to be processed. The Data Inbox application may be configured by the expert to run multiple items in parallel for a given model or for various given models. The expert user may also choose to configure various exclusivity groups and resources that various models may require so that the Data Inbox may understand how best to run multiple items in parallel that require access to the same shared resources.

Once the input data is processed by the expert template with or without a processing macro, the results can be published to the intermediary server, after which they will be available for the end user to access, or can be automatically downloaded to the client's computer if the client's computer is connected with the intermediary server over a network and is configured in this manner. The client plugin/application is preferably configured to display results data in the cells which, in the expert template/model, may include formulas. Result data can be published to the intermediary server using a variety of formats, such as JSON text format or XML.

Figure 17:
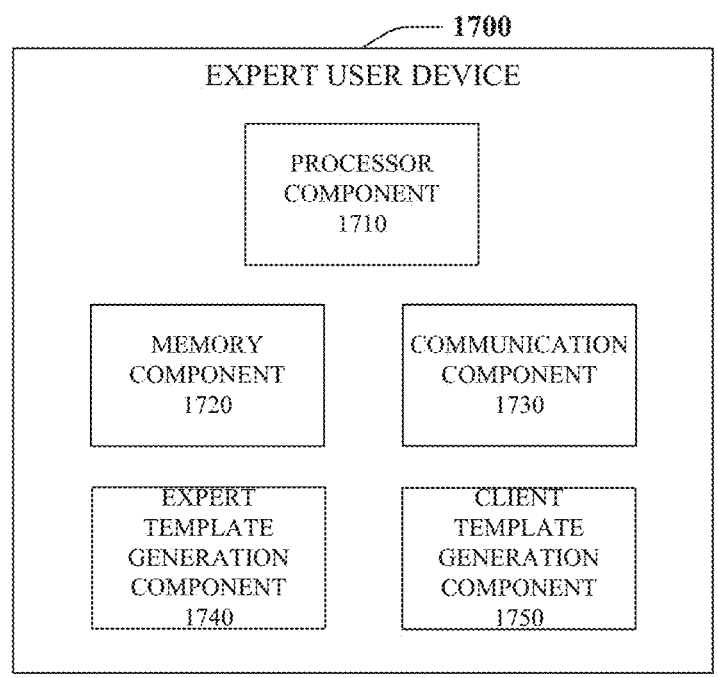
FIG. 17 illustrates a block diagram of an exemplary expert user device that facilitates sharing spreadsheet processing models in accordance with an aspect of the present specification.

Referring next to FIG. 17, a block diagram is provided of an exemplary expert user device 1700 that facilitates sharing spreadsheet processing models in accordance with an aspect of the present specification. As illustrated, expert user device 1700 may include a processor component 1710, a memory component 1720, a communication component 1730, an expert template generation component 1740, and a client template generation component 1750.

Similar to processor component 1310 and processor component 1510 in intermediary server 1300 and end user client device 1500, respectively, processor component 1710 is configured to execute computer-readable instructions related to performing any of a plurality of functions. Processor component 1710 can be a single processor or a plurality of processors which analyze and/or generate information utilized by memory component 1720, communication component 1730, expert template generation component 1740, and/or client template generation component 1750. Additionally or alternatively, processor component 1710 may be configured to control one or more components of expert user device 1700.

In another aspect, memory component 1720 is coupled to processor component 1710 and configured to store computer-readable instructions executed by processor component 1710. Memory component 1720 may also be configured to store any of a plurality of other types of data including data generated by any of communication component 1730, expert template generation component 1740, and/or client template generation component 1750. Here, it should be noted that memory component 1720 is analogous to memory component 1320 and memory component 1520 in intermediary server 1300 and end user client device 1500, respectively. Accordingly, it should be appreciated that any of the aforementioned features/configurations of memory component 1320 and memory component 1520 are also applicable to memory component 1720.

As illustrated, expert user device 1700 may further include communication component 1730, expert template generation component 1740, and client template generation component 1750. In a particular aspect of the disclosure, communication component 1730 is configured to receive parameters of a spreadsheet model, whereas expert template generation component 1740 is configured to generate an expert spreadsheet template that includes embedded instructions on how to execute the spreadsheet model in accordance with the received parameters. For this embodiment, client template generation component 1750 is configured to determine a restricted level of access to the spreadsheet model, wherein the restricted level of access identifies aspects of the spreadsheet model to make inaccessible to an end user. Client template generation component 1750 is then further configured to generate a client spreadsheet template, wherein the client spreadsheet template enables the end user to interface with the spreadsheet model in accordance with the restricted level of access, and wherein the client spreadsheet template is further configured to facilitate an execution of the embedded instructions in the expert spreadsheet template.

In an aspect of the disclosure, it is contemplated that client template generation component 1750 may be configured to generate client spreadsheet templates in any of a plurality of ways. For instance, client template generation component 1750 may be configured to begin with a copy of the expert spreadsheet template, wherein the instructions for how to execute the spreadsheet model embedded within the expert spreadsheet template copy are extracted. To this end, it should be appreciated that the embedded instructions may include any of various types of items an expert user may wish to withhold from end users. For instance, such instructions may include a formula, a macro, and/or a call to an external program such as MATLAB or Python.

In another aspect of the disclosure, it is contemplated that client template generation component 1750 may be configured to embed client spreadsheet templates with code to facilitate the remote execution of the expert models. For instance, client template generation component 1750 may be configured to inject Visual Basic for Applications (VBA) code into the client spreadsheet template, wherein the VBA code is configured to remotely execute the embedded instructions on the expert spreadsheet template.

In a further aspect of the disclosure, it is contemplated that client template generation component 1750 may be configured to generate client spreadsheet templates with particular functionalities for the end user. For instance, if the parameters of the spreadsheet model received from the expert user define the client spreadsheet template as an input-only spreadsheet (e.g., to facilitate a "survey" type model), client template generation component 1750 may be configured to generate a client spreadsheet template that includes input-only functionality. Similarly, if the parameters of the spreadsheet model received from the expert user define the client spreadsheet template as an output-only spreadsheet (e.g., to facilitate a "broadcast" type model), client template generation component 1750 may be configured to generate a client spreadsheet template that includes output-only functionality.

Expert users may also configure client spreadsheet templates that include navigational points for an end user. Indeed, the parameters received from the expert user may include parameters that identify at least one navigational point within the spreadsheet model, wherein client template generation component 1750 may be configured to generate a client spreadsheet template configured to facilitate an execution of a limited portion of the embedded instructions on the expert spreadsheet template. Within such embodiment, the limited portion of the embedded instructions may begin at instructions corresponding to the desired navigational point, wherein the navigational point may correspond to a sheet in a spreadsheet program or a page on a website, for example.

Figure 18:
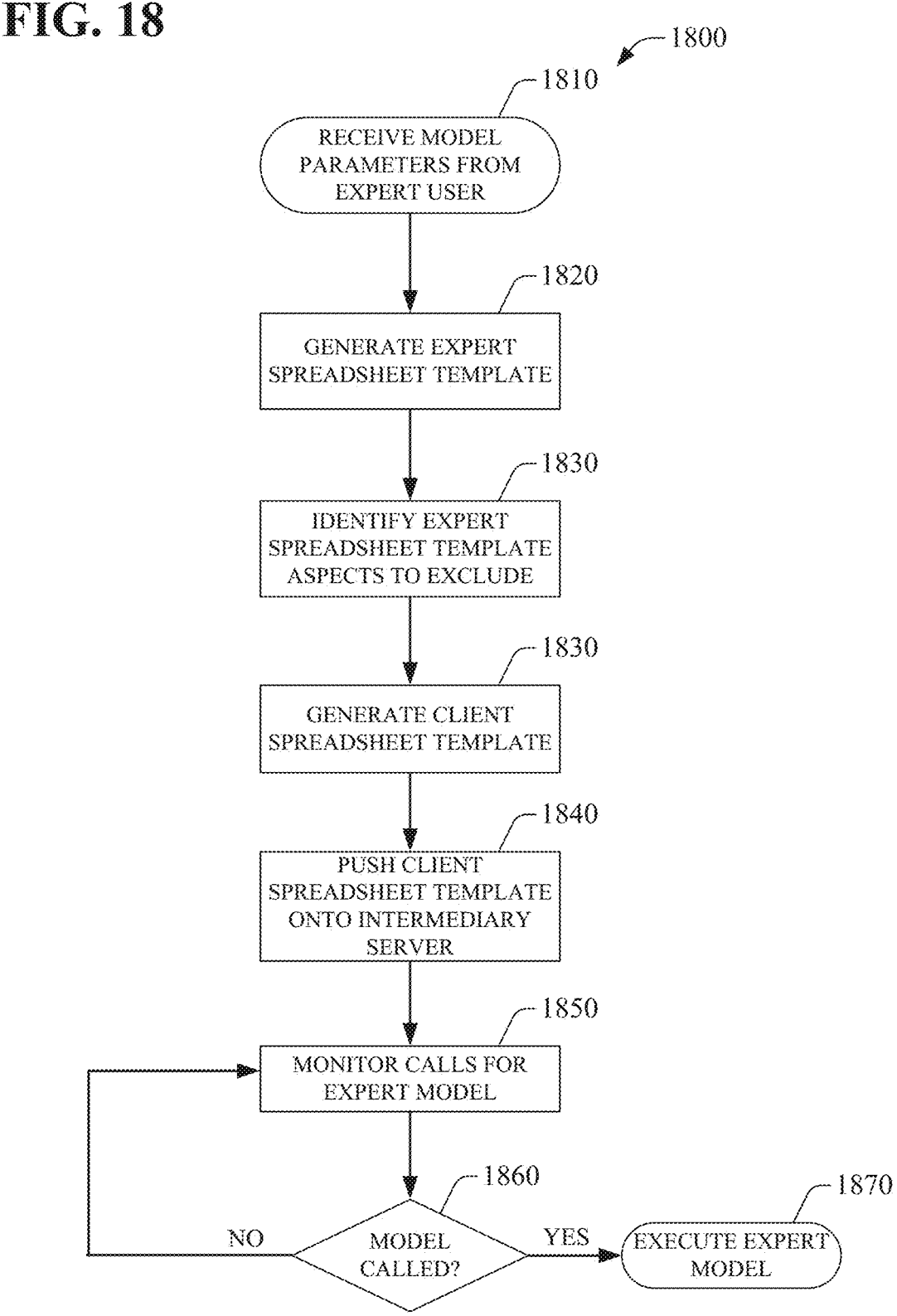
FIG. 18 is a flow diagram illustrating an exemplary methodology for utilizing an expert user device to facilitate sharing spreadsheet processing models according to an embodiment.

Referring next to FIG. 18, a flow chart is provided illustrating an exemplary methodology for utilizing an expert user device to facilitate sharing spreadsheet processing models according to an embodiment. As illustrated, process 1800 includes a series of acts that may be performed within a computing device (e.g., expert user device 1700) according to an aspect of the subject specification. For instance, process 1800 may be implemented by employing a processor to execute computer executable instructions stored on a computer readable storage medium to implement the series of acts. In another embodiment, a computer-readable storage medium comprising code for causing at least one computer to implement the acts of process 1800 is contemplated.

In an aspect, process 1800 begins at act 1810 with the expert user device receiving model parameters from an expert user. Such parameters may include any of various types of parameters including, but not limited to, permission-related parameters (i.e., parameters defining what end users may access the model), format-related parameters (e.g., parameters defining how aspects of the client spreadsheet template are displayed), function-related parameters (e.g., formulas, macros, etc.), authentication-related parameters (e.g., authentication credentials), and/or input/output-related parameters (e.g., parameters determining whether a model is input-only, output-only, etc.). At act 1820, the expert user device then generates an expert spreadsheet template for the expert model based on the received parameters.

Since the expert spreadsheet template may include sensitive/proprietary information, aspects of the expert spreadsheet template the expert user wishes to exclude from end users are then identified at act 1830. A client spreadsheet template is then generated at act 1830, wherein the sensitive/proprietary aspects identified in act 1820 are excluded from the client spreadsheet template.

After the client spreadsheet template is generated, the expert user device pushes the client spreadsheet template onto the intermediary server at act 1840, and subsequently waits for the expert model to be called at act 1860. If the expert model is not called, process 1800 loops back to act 1860 where the expert user device continues to wait for the expert model to be called. Otherwise, if the expert model is indeed called (e.g., via an end user request relayed by the intermediary server), then process 1800 concludes at act 1870 where the expert model is executed by the expert user device. If executed it should be appreciated that such execution may be in accordance with an input-only model (e.g., a "survey" type model), an output-type model (e.g., a "broadcast" type model), or an input/output model (e.g., a model that processes an end user input and provides the end user with a corresponding output).

Exemplary Screen Shots

Figure 19:
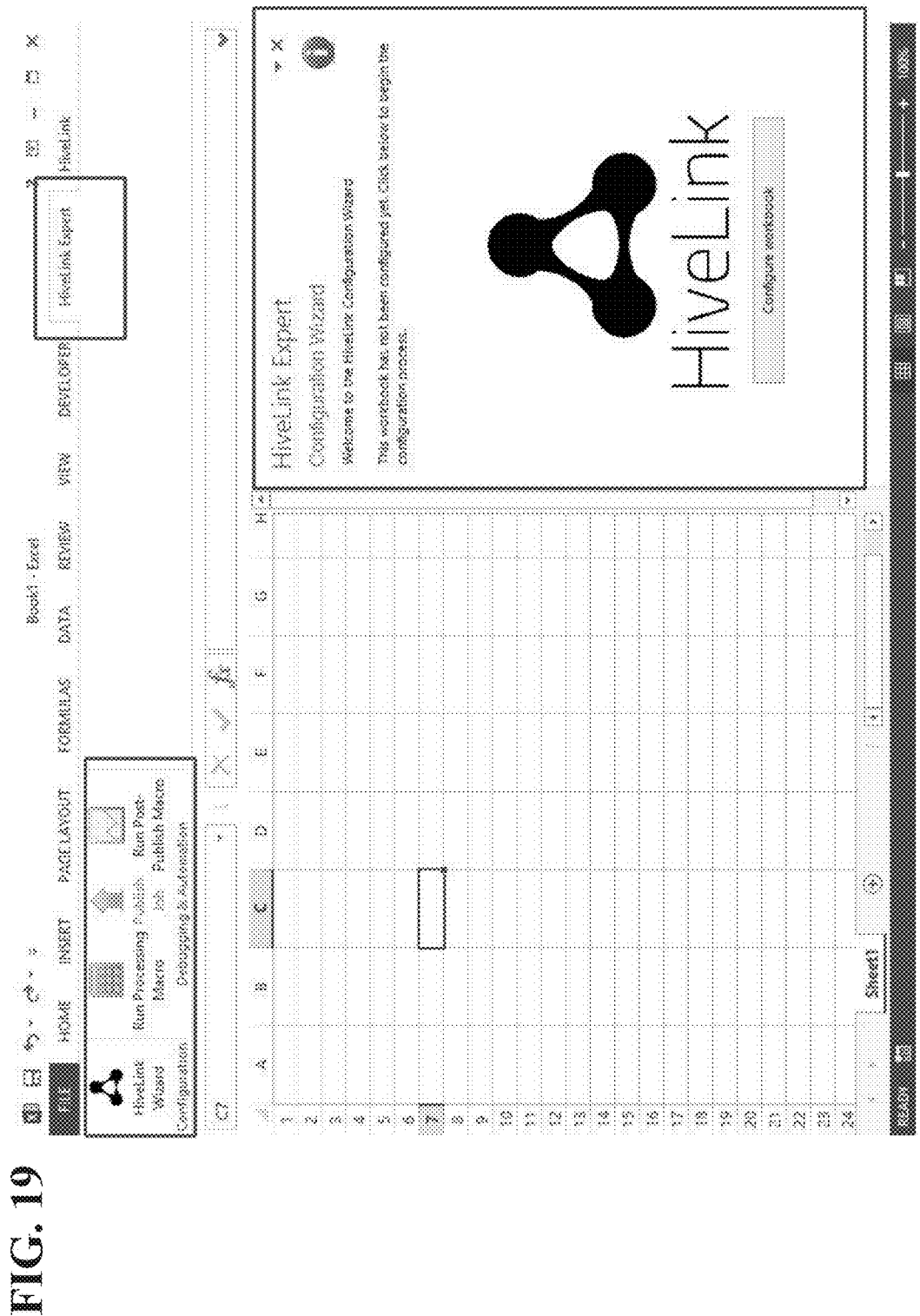
FIG. 19 is an exemplary screen shot illustrating the commencement of an expert model configuration process according to an embodiment.
Figure 20:
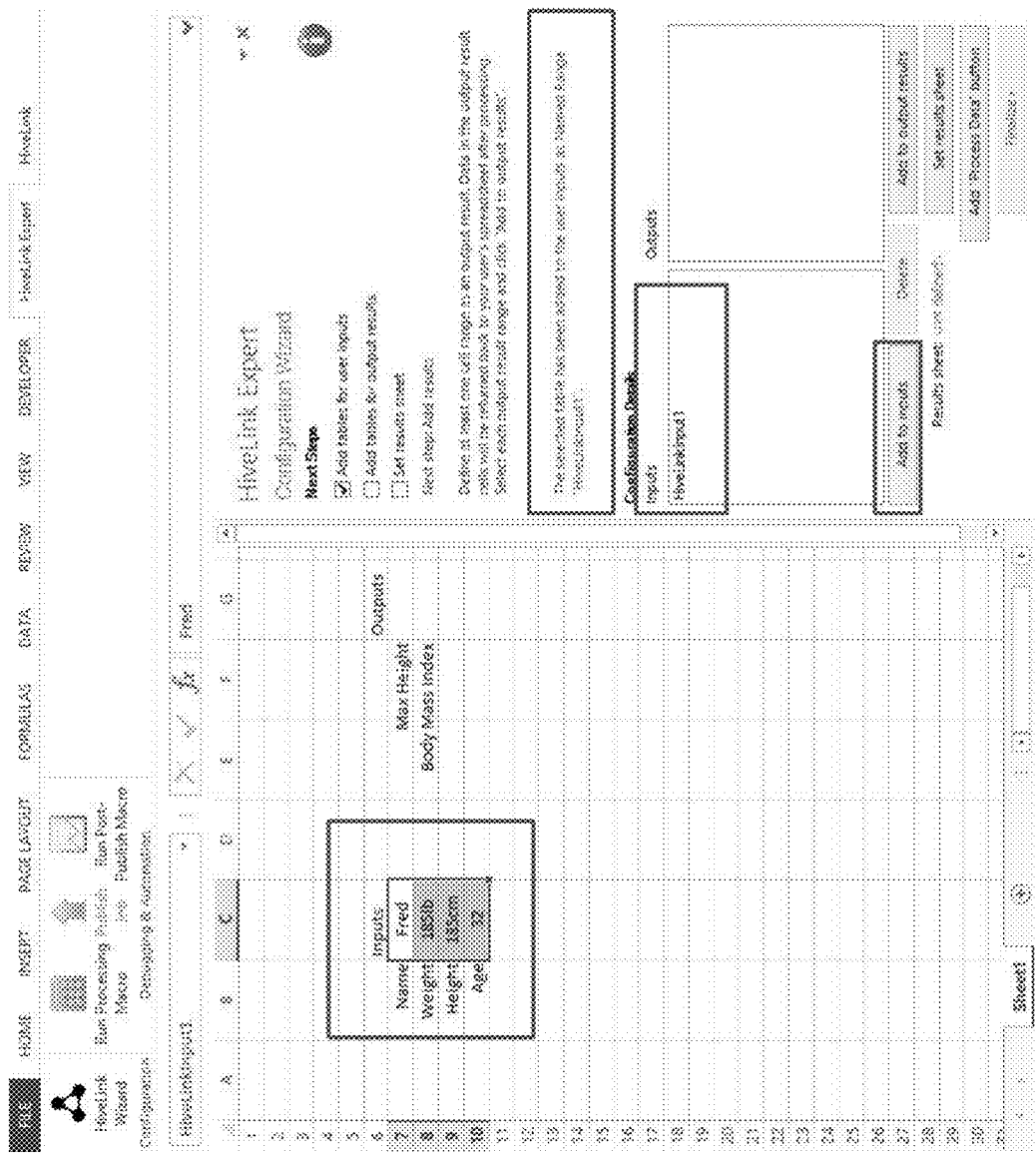
FIG. 20 is an exemplary screen shot illustrating a selection of a table of inputs during an expert model configuration process according to an embodiment.
Figure 21:
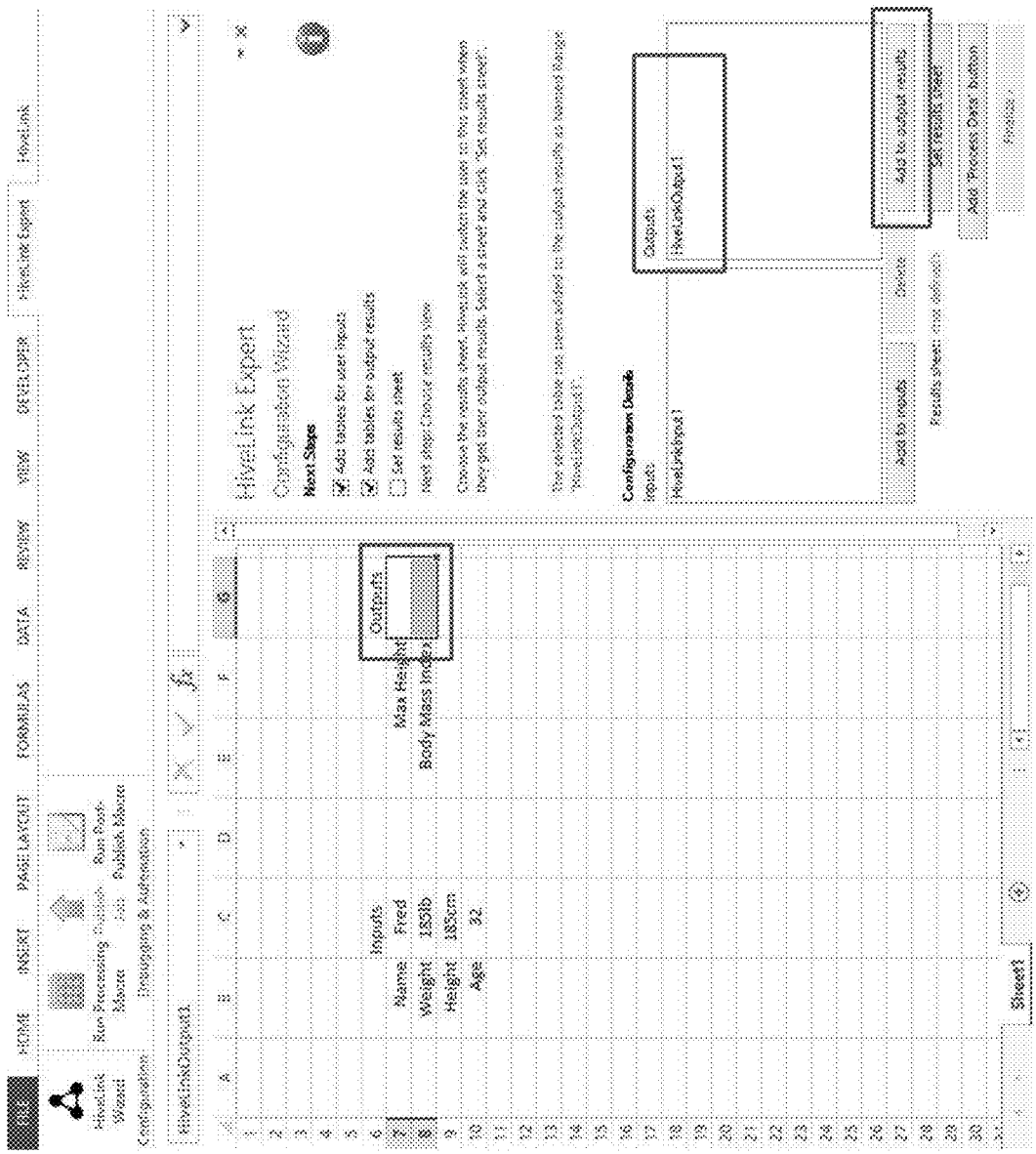
FIG. 21 is an exemplary screen shot illustrating a selection of a table of outputs during an expert model configuration process according to an embodiment.

Referring next to FIGS. 19-36, exemplary screen shots illustrating various implementations of features disclosed herein are provided. For instance, FIGS. 19-26 respectively illustrate various screen shots of an exemplary expert model configuration process in accordance with an embodiment. As illustrated in FIG. 19, such an expert model configuration process may commence with the display of a configuration wizard on an expert device which guides experts through the configuration process. For this particular embodiment, the configuration wizard is implemented via an expert device plugin, wherein a custom task pane is also contemplated. As illustrated in FIG. 20, the configuration wizard may begin the configuration process by prompting the expert to select a table of inputs via an "Add to Inputs" button. The configuration process may then continue with the selection of a table of outputs. For instance, as illustrated in FIG. 21, an expert user may select a table of outputs via an "Add to output results" button, wherein the configuration wizard may display the selected table in a list of defined output tables.

Figure 22:
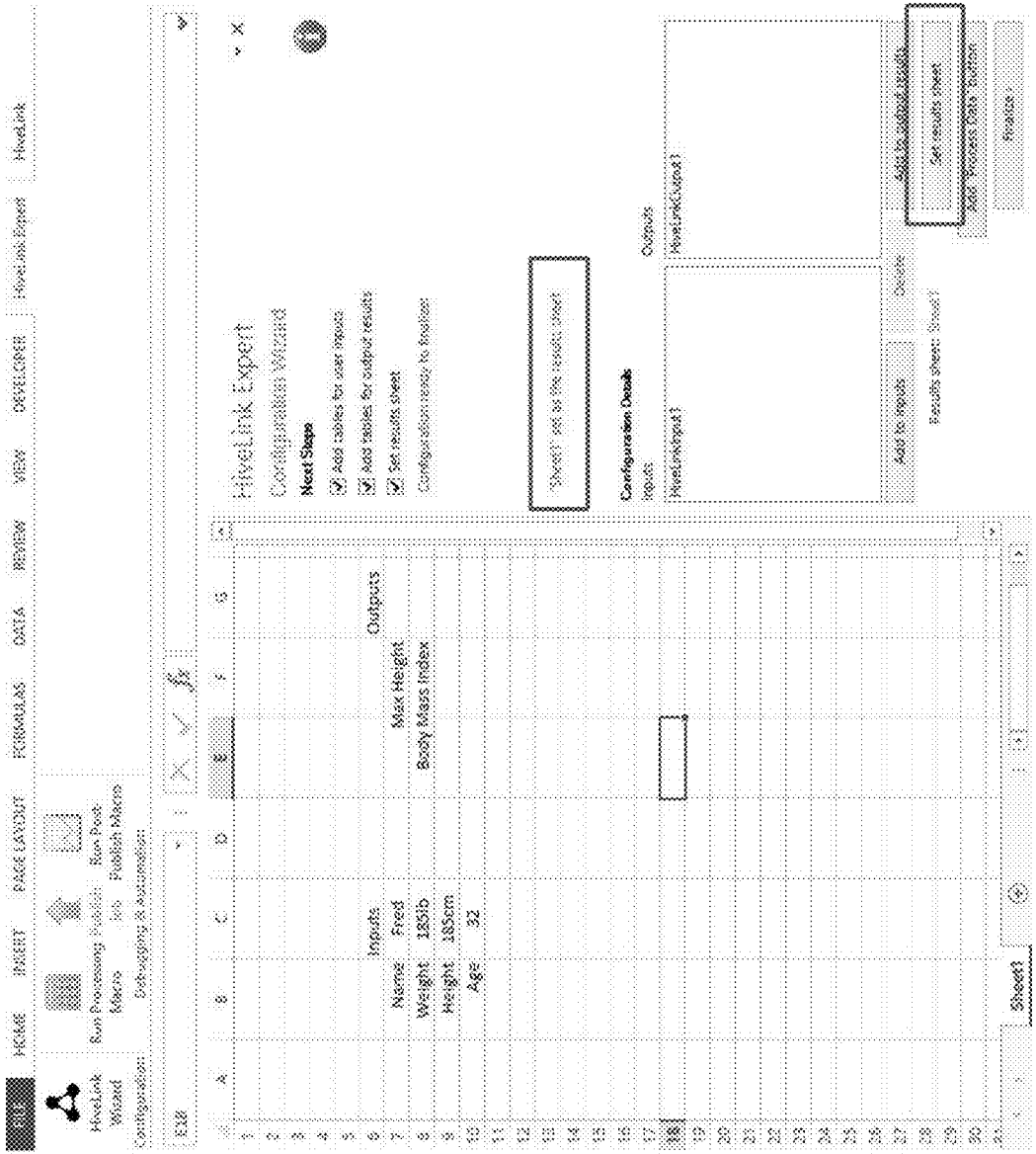
FIG. 22 is an exemplary screen shot illustrating a setting of a results sheet during an expert model configuration process according to an embodiment.

Various tools for enabling an expert to configure aspects on an end user client device are also contemplated. In FIG. 22, for instance, an exemplary screen shot is provided illustrating how the configuration wizard may guide an expert user to customize a results sheet displayed on an end user client device. For this particular embodiment, an expert user can configure the results sheet as a navigational sheet that is displayed once the end user downloads their results.

Figure 23:
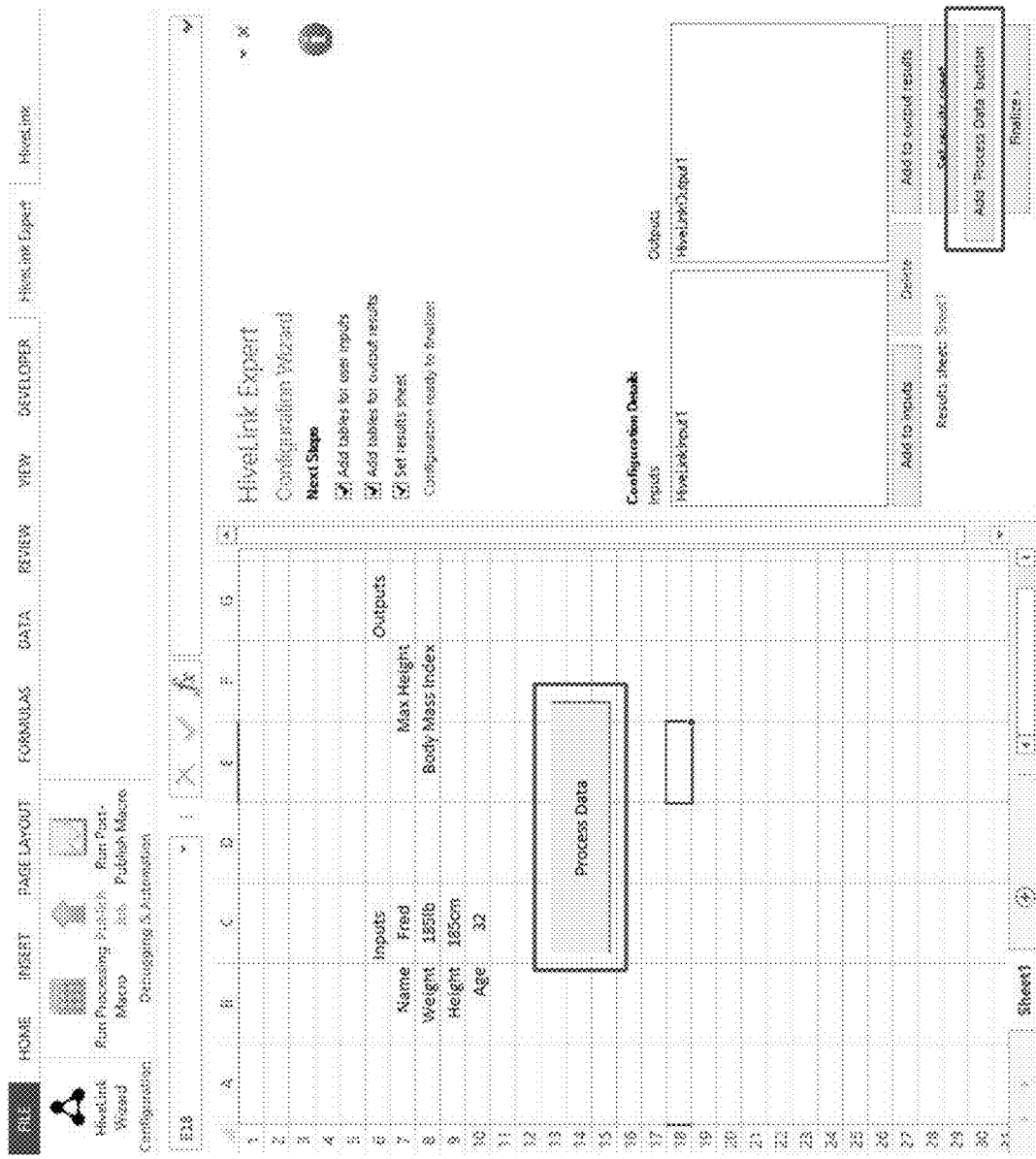
FIG. 23 is an exemplary screen shot illustrating an insertion of a "Process Data" button during an expert model configuration process according to an embodiment.

It is further contemplated that the configuration wizard may be used to create any of various buttons on an end user client device. In FIG. 23, for instance, an exemplary screen shot illustrating an insertion of a "Process Data" button is provided. Namely, it is contemplated that an expert user can insert a "Process Data" button into a sheet displayed on the end user client device, wherein end user inputs are sent to the expert device for processing when the end user clicks on the "Process Data" button.

Figure 24:
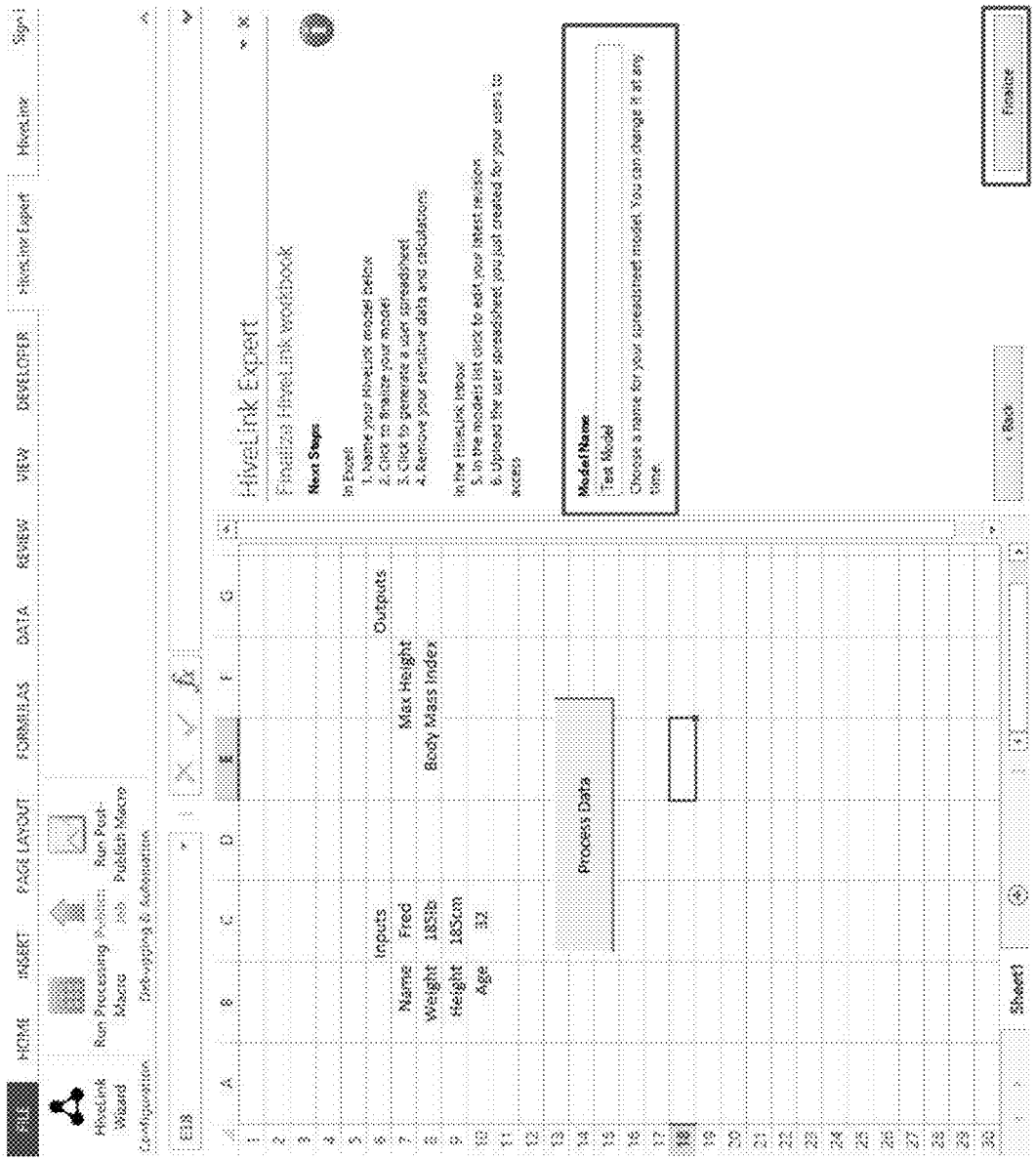
FIG. 24 is an exemplary screen shot illustrating a finalization of an expert model configuration process according to an embodiment.

Referring next to FIG. 24, an exemplary screen shot illustrating a finalization of an expert model configuration process is provided. As illustrated, such finalization may include naming the model, wherein the expert device may be configured to automatically assign GUIDs to the expert/client templates upon clicking the finalize button. These GUIDs may then be sent to the intermediary server so that end user client devices may access the newly created model via the client template having the appropriate GUID. Namely, upon finalization of the expert model, the system communicates with the data inbox desktop application to publish the model onto the intermediary server (e.g., by generating web pages, client interfaces, etc.).

Before a model is actually finalized, however, configuration details for the model may be displayed to the expert user, as shown in FIG. 25. Here, expert users may further automate the processing of jobs for a model. For instance, expert users may set timeouts, and links to their webpage may be displayed to manage user permissions, marketing, etc. Expert users can also upload client templates (e.g., via an "Upload user spreadsheet" button) so that end user clients can download the lightweight client template from a marketing webpage.

Figure 26:
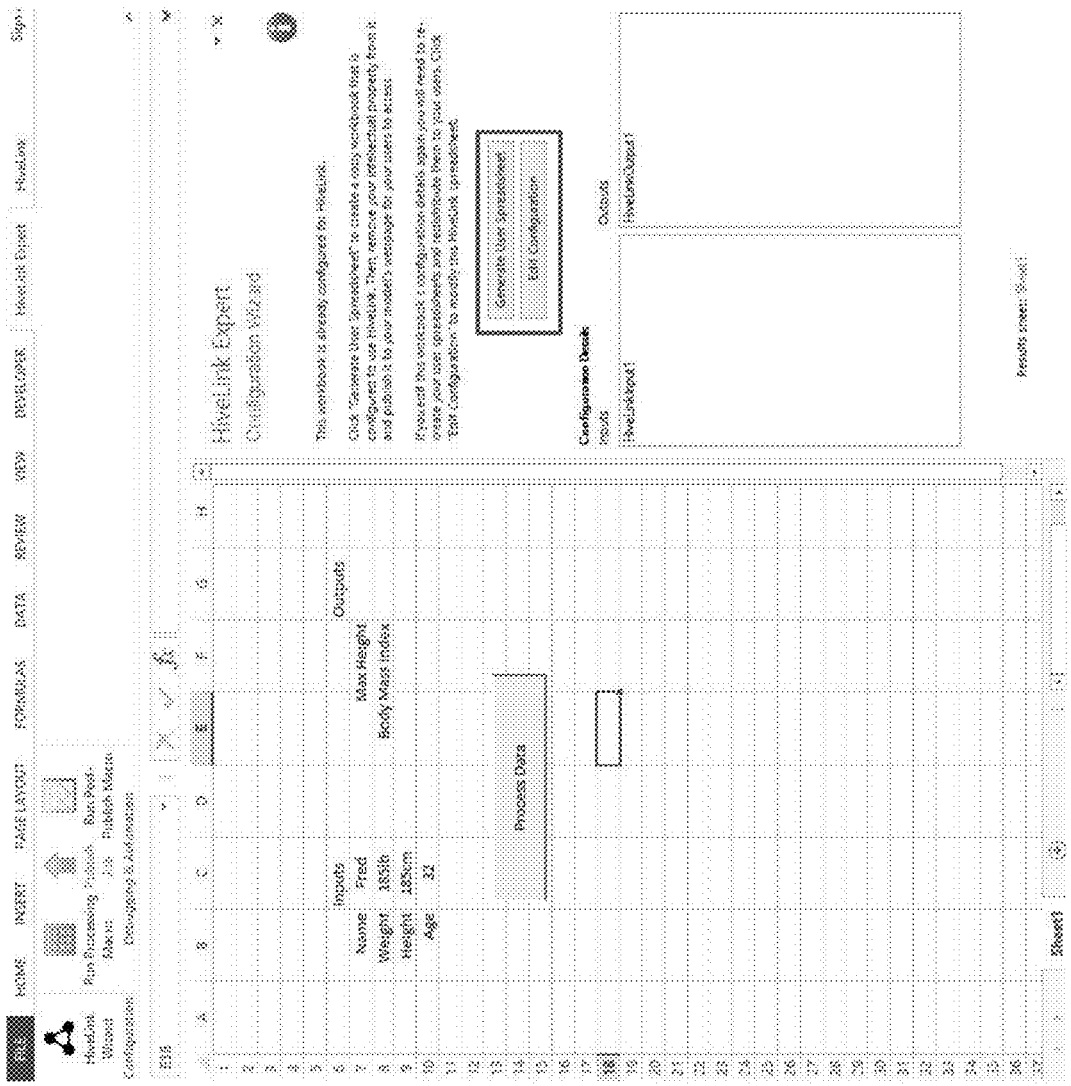
FIG. 26 is an exemplary screen shot illustrating a finalized expert model configuration according to an embodiment.

Referring next to FIG. 26, an exemplary screen shot illustrating a finalized expert model configuration is provided. From here, an expert user may generate a client template, which generates a clone of the expert spreadsheet template, wherein some of the expert metadata is removed in addition to any sensitive expert macros and formulas.

Figure 27:
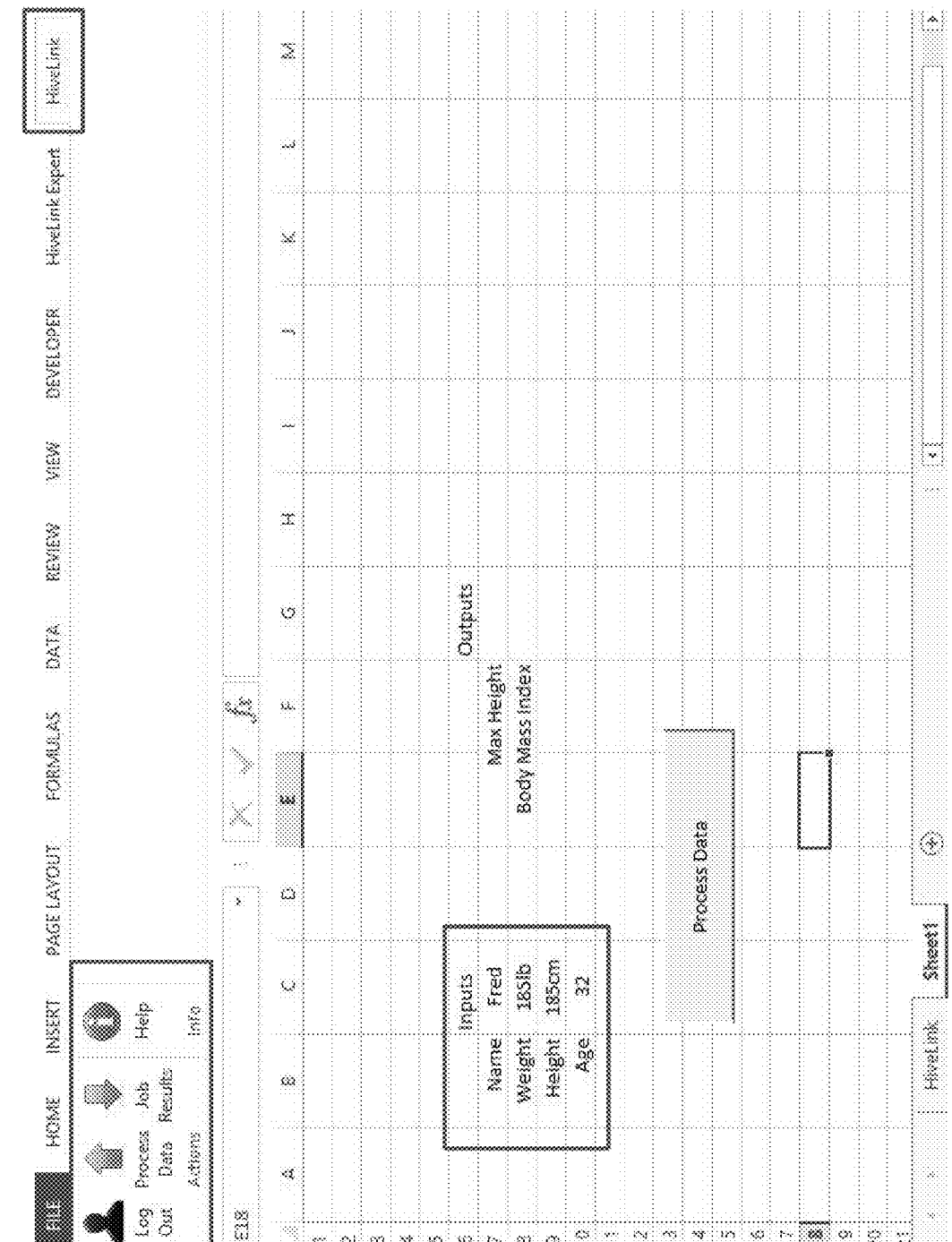
FIG. 27 is an exemplary screen shot illustrating a client template generated from an expert model configuration process according to an embodiment.
Figure 28:
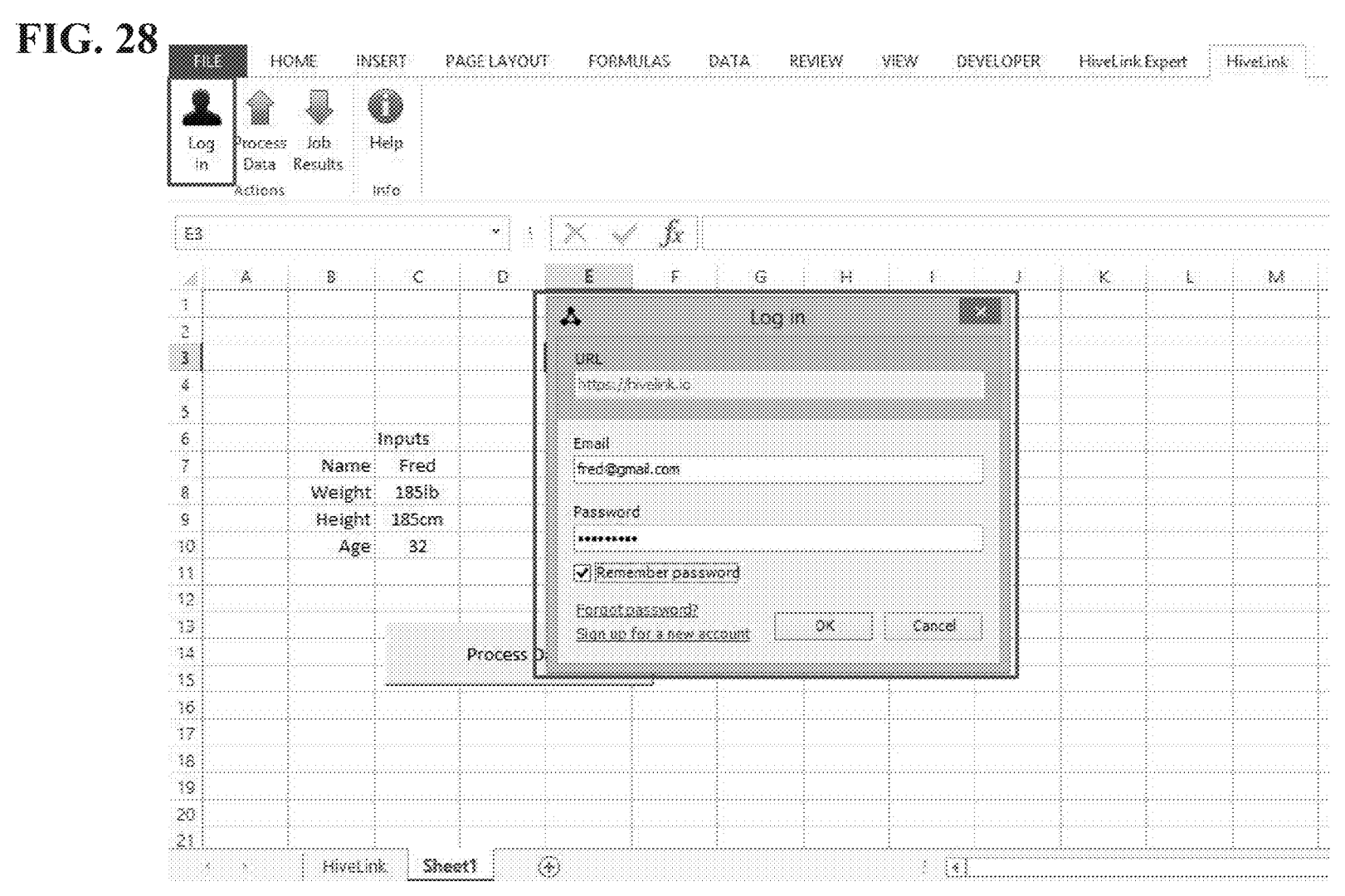

Various exemplary screen shots of a client template generated from an expert model configuration process are also provided. FIG. 27, for instance, illustrates a client template (end user spreadsheet) generated after finalizing the expert sheet illustrated in FIG. 26. From this client template, an end user may open a client plugin and enter their inputs. For some embodiments, however, it may be desirable to authenticate the end user before access to the expert model is provided. To facilitate such authentication, the client plugin may be configured to provide a log in window. As illustrated in FIG. 28, a log in window for entering access credentials may be displayed upon clicking a "Log In" button.

Figure 29:
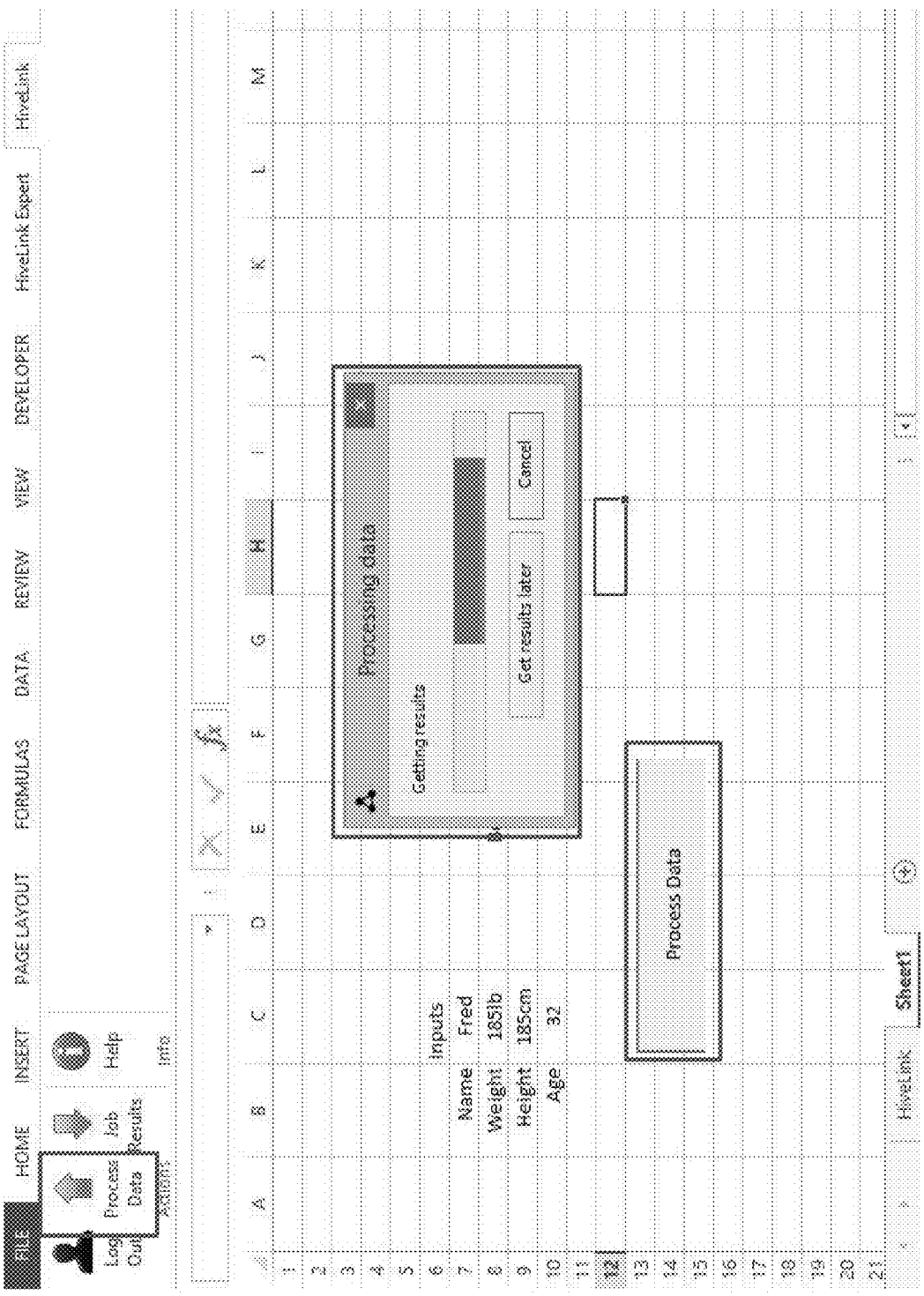
FIG. 29 is an exemplary screen shot illustrating a data processing notification on a client template generated from an expert model configuration process according to an embodiment.
Figure 30:
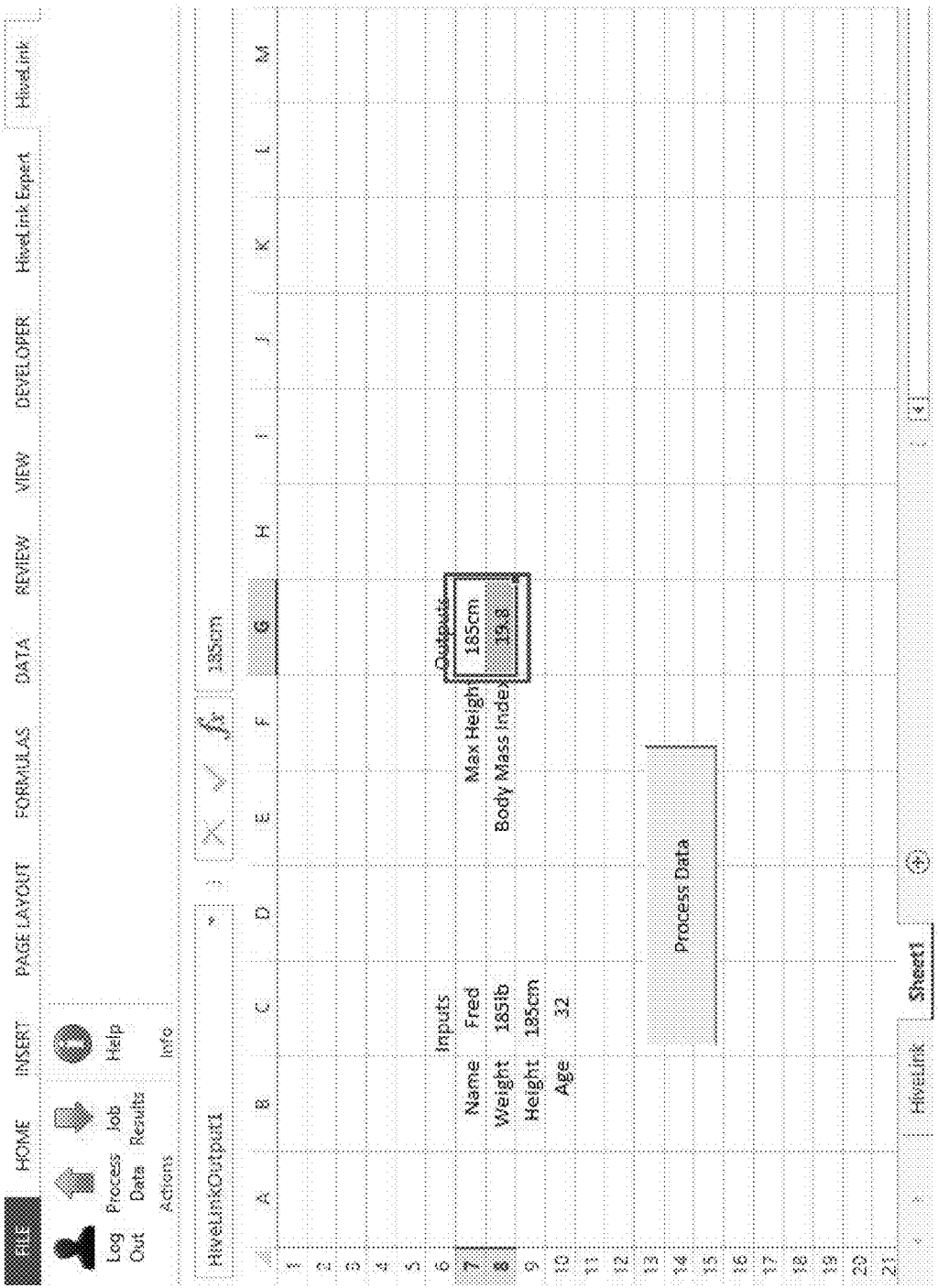
FIG. 30 is an exemplary screen shot illustrating output results displayed on a client template generated from an expert model configuration process according to an embodiment.

After access to an expert model has been granted, an end user may begin to remotely process data on an expert sheet from the client template. As illustrated in FIG. 29, an end user can click a "Process Data" button either from the sheet or from the plugin to calculate results immediately, wherein the end user can opt to get the results later or receive the results immediately. An exemplary screen shot illustrating output results displayed on a client template is provided in FIG. 30. Here, the end user has automatically received the results of the processing, without any formulas residing in the end user spreadsheet since all calculations were performed by the expert template.

Figure 31:
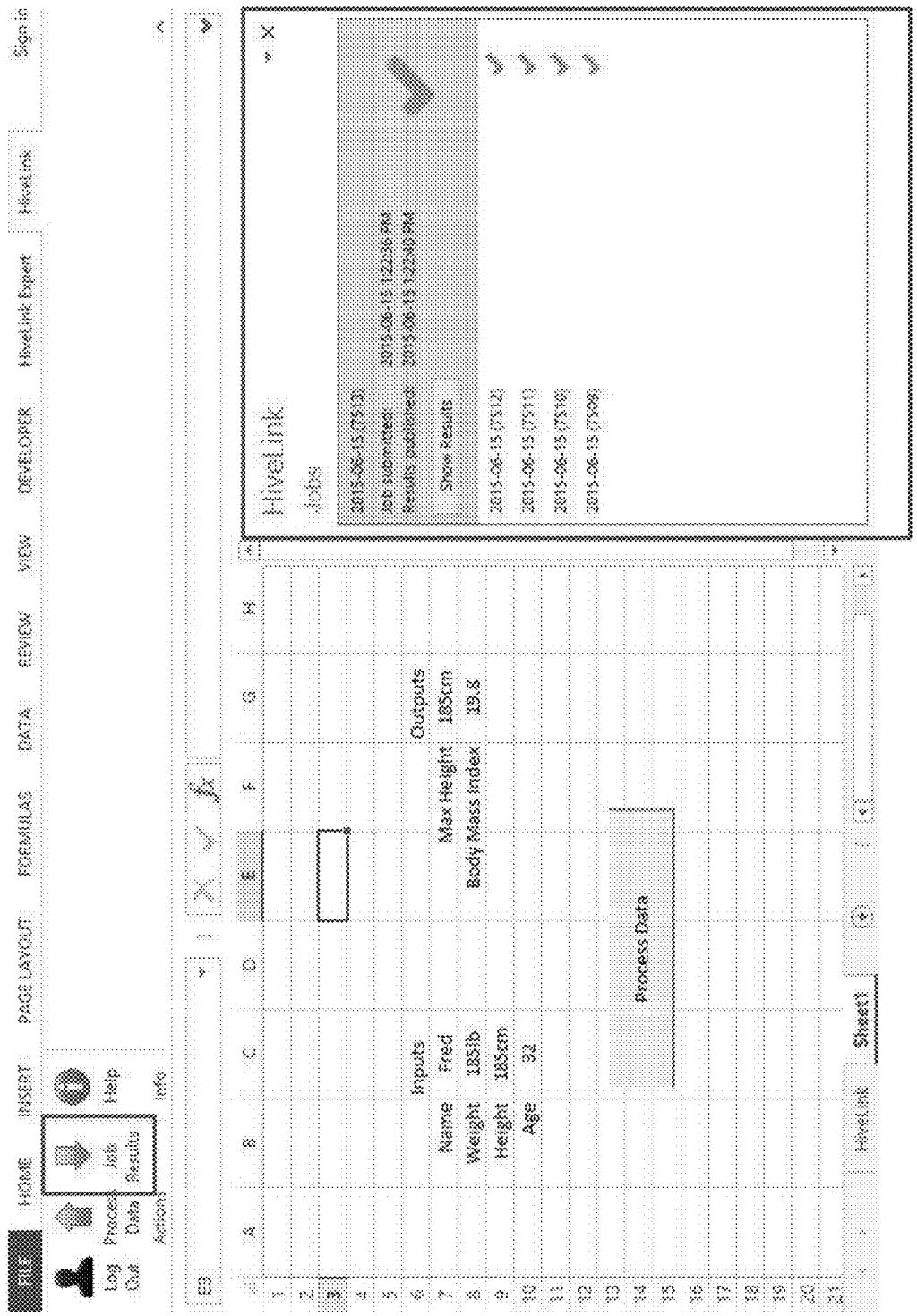
FIG. 31 is an exemplary screen shot illustrating a list of historical output results displayed on a client template generated from an expert model configuration process according to an embodiment.
Figure 32:
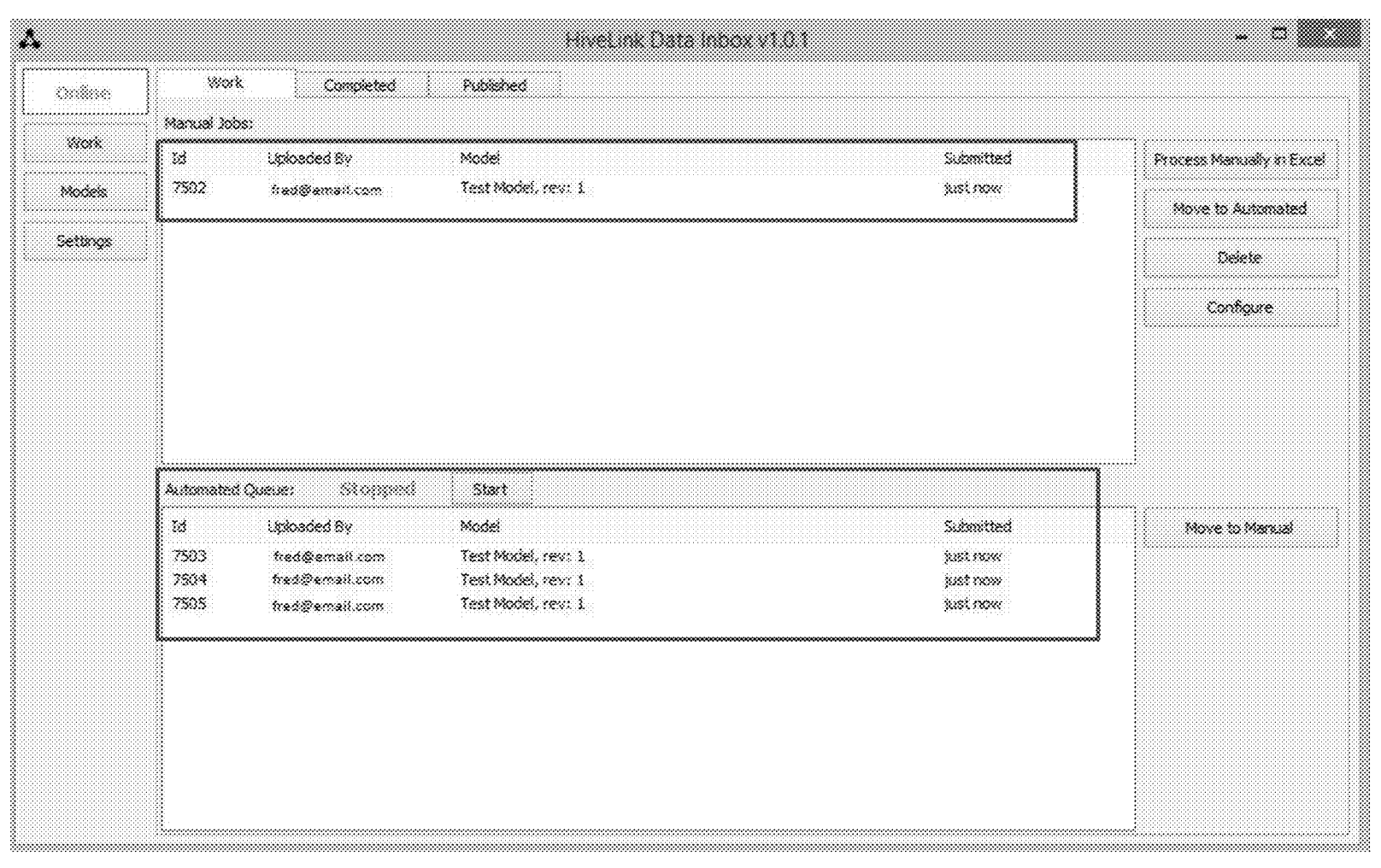

Various display options for the end user spreadsheet are also contemplated. In FIG. 31, for instance, an exemplary screen shot of a client template illustrating a list of historical output results is provided. As illustrated, the client end user may be provided with a list of their historical results for previous batches, or "jobs". A queue of jobs may also be displayed on the client template, as shown in FIG. 32. Here, the end user can see the Data Inbox receiving jobs into a queue, wherein each item can be selected and launched into a spreadsheet program (e.g., EXCEL®) manually, or left to be processed automatically.

Figure 33:
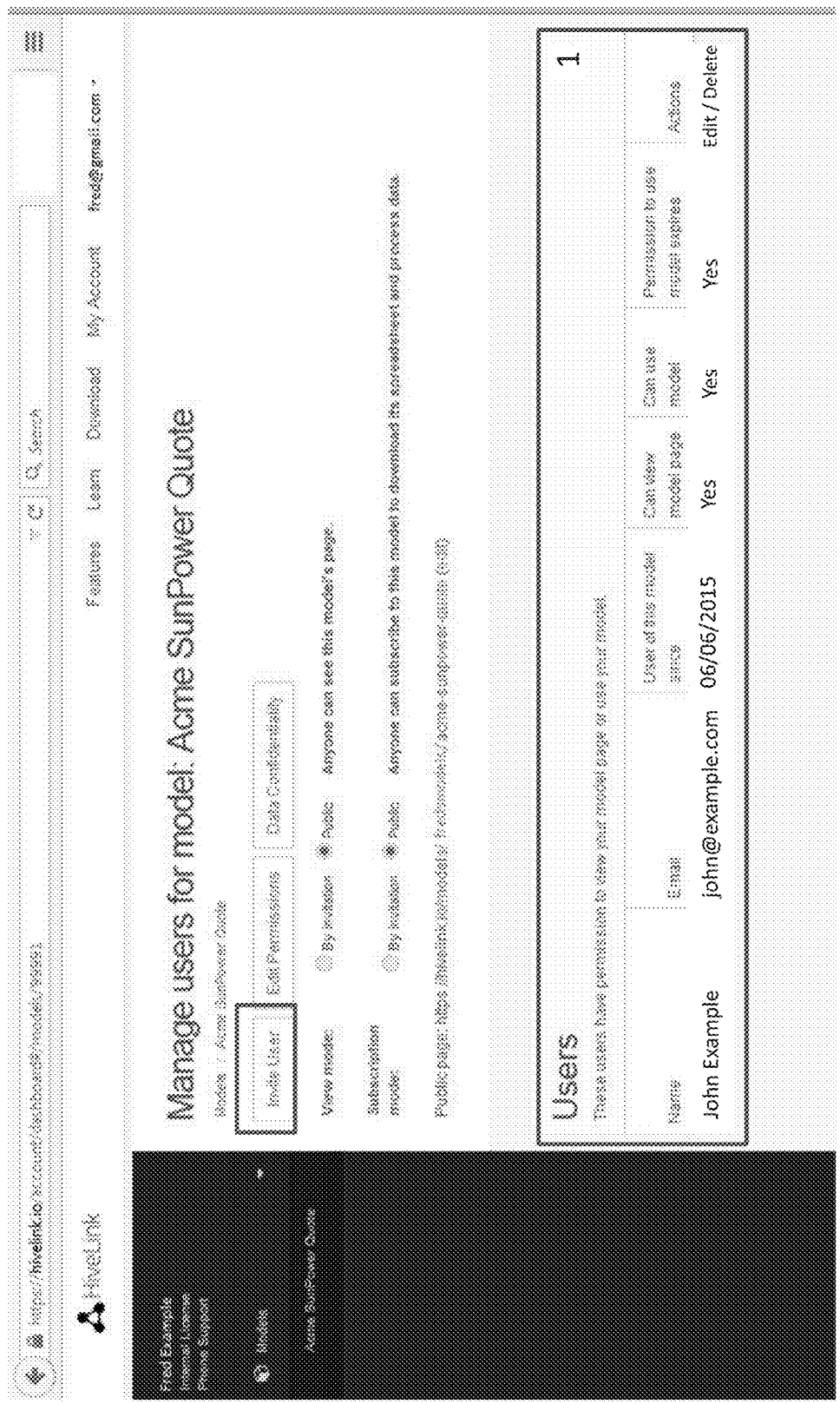
FIG. 33 is an exemplary screen shot illustrating a user management tool associated with an expert model according to an embodiment.
Figure 34:
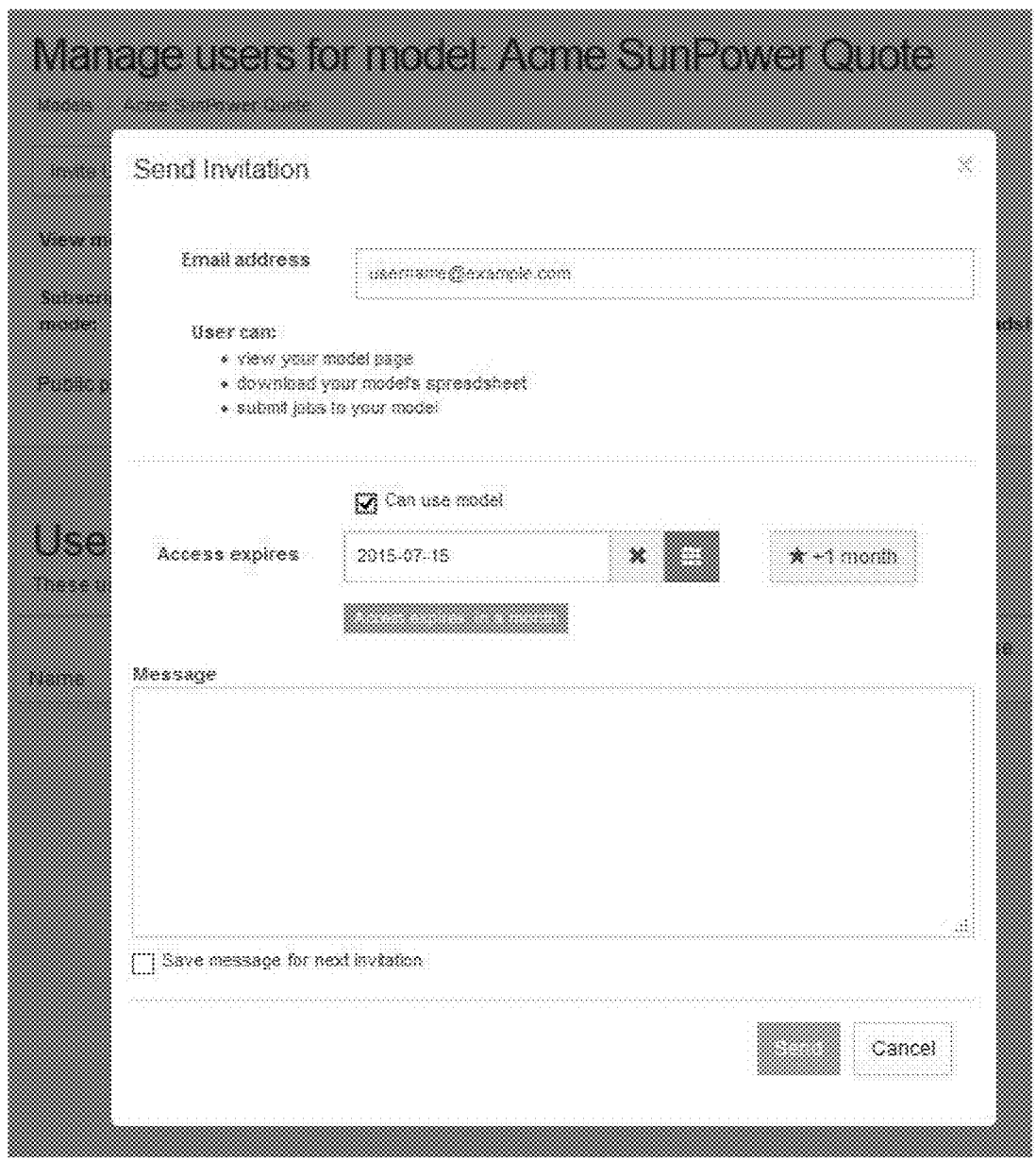
FIG. 34 is an exemplary screen shot illustrating a client user invitation prompt associated with an expert model according to an embodiment.

Referring next to FIG. 33, an exemplary screen shot illustrating a user management tool associated with an expert model is provided. As illustrated, such a tool enables an expert user to manage permissions for a given model. An expert user may provide access to a model according to any of various schemes including, for example, by invite-only, subscription, or make the model publicly available. In FIG. 34, for instance, an exemplary screen shot illustrating a client user invitation prompt associated with an expert model is provided. As illustrated, such prompt may be used by an expert to send an invitation to a particular email address, provide a personal message, and set and expiration date for their usage permission.

Figure 35:
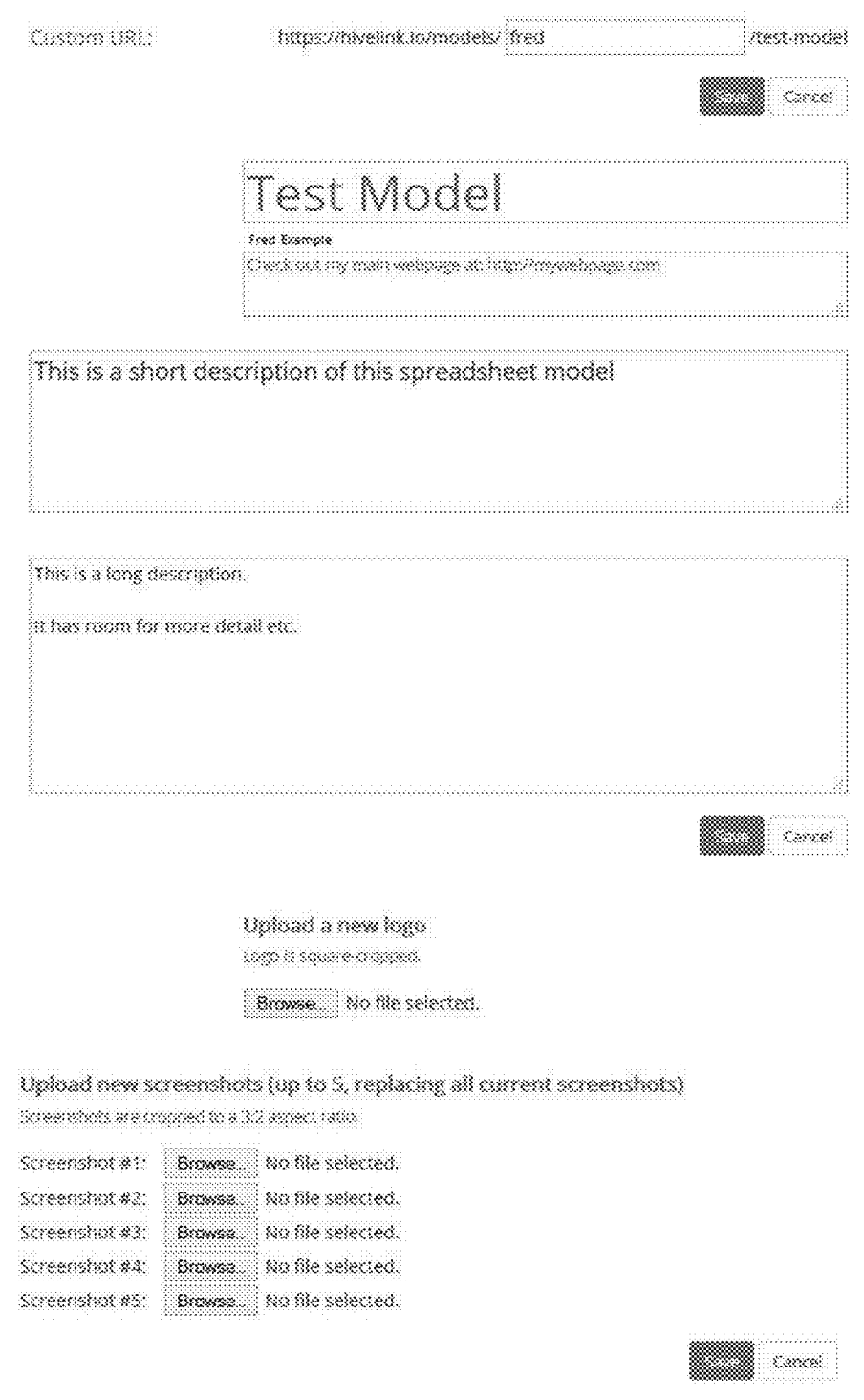
Figure 36:
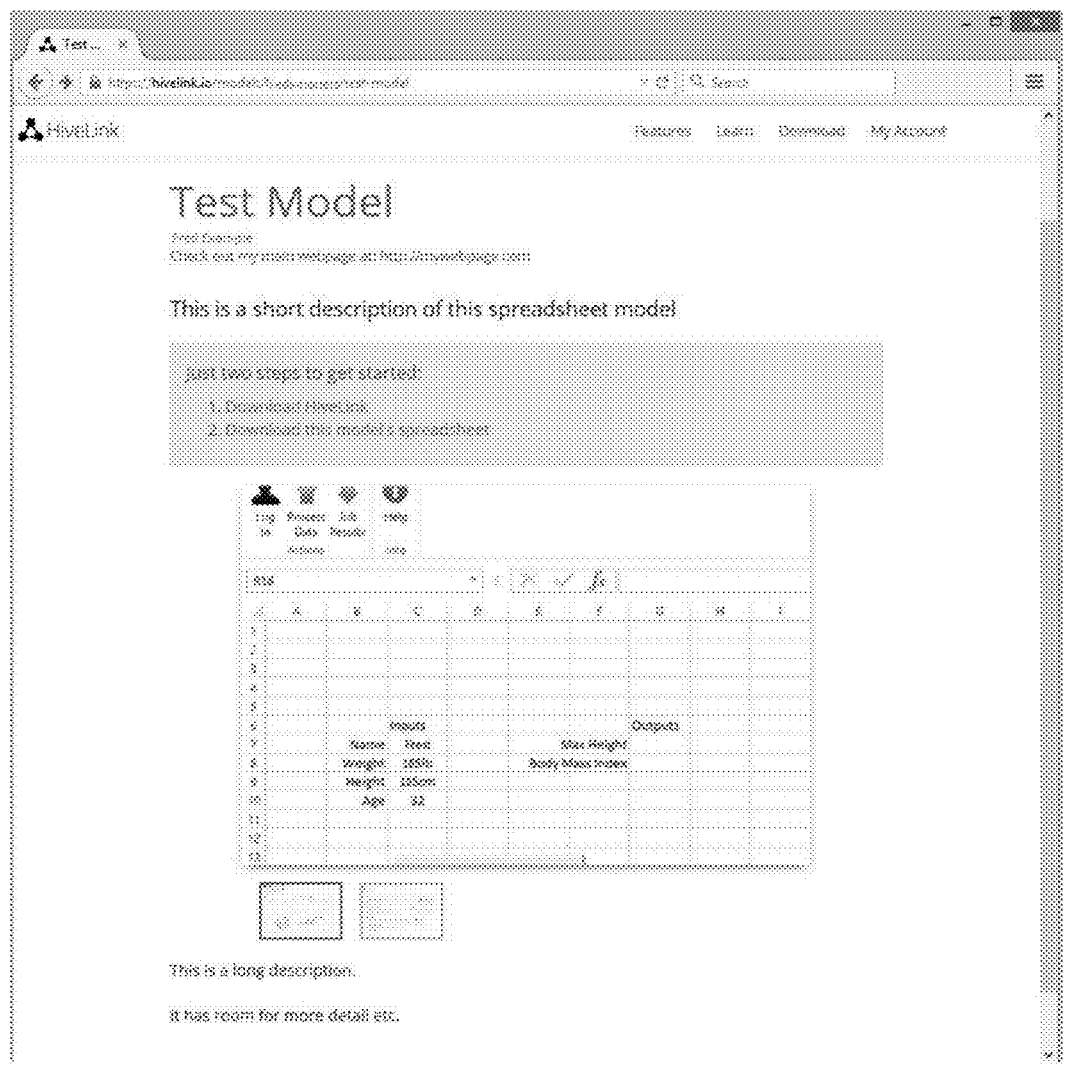
FIG. 36 is an exemplary screen shot illustrating a marketing webpage associated with an expert model according to an embodiment.

Various webpage interfaces are also contemplated. In FIG. 35, for instance, an exemplary screen shot illustrating a webpage interface that facilitates editing an expert model is provided. A marketing webpage associated with an expert model is also contemplated, as illustrated in FIG. 36. In a particular embodiment, the marketing webpage is created by an expert user, wherein end users invited by the expert user are given access to the webpage where they can download a lightweight client template file as well as any other resources selected by the expert user.

Exemplary Advantages of the Disclosed System

The present system eliminates the possibility of reverse-engineering sensitive algorithms or other intellectual property created by an expert user and included in spreadsheet models by removing certain processing functions and data from the template used by a client user and maintaining them only on the expert's own computer, while still allowing the client user remote access. The present system further allows the expert user to make use of spreadsheet programs, such as MICROSOFT EXCEL®, in their native configurations, without needing to employ cumbersome functions for hiding sensitive algorithms or data. The present system also avoids any need to convert spreadsheet models into other formats, so that no existing functionality is lost. The aspects disclosed herein also allow for a generic spreadsheet to be used to create a web application. If an expert user thus converts a "lightweight" spreadsheet as described herein into a web interface, the need for such a user to host a dedicated website can be eliminated.

The present system also resolves the problem of automating the input/output processing of a spreadsheet model by allowing experts to seamlessly manage processing for a large number of users with automation, so that they can be available to efficiently provide their expertise for manual error handling only when necessary. Experts can also remove and consolidate any third-party dependencies/add-ins required for processing a spreadsheet or other model, which simplifies the process of using a model for clients who lack experience with using models and/or the software which operates them. Moreover, the need for a client spreadsheet to have connections to databases or other such connections is removed.

The disclosed intermediary server, which can host or interface with a website, also provides a platform for marketing and distributing expert models. It can allow experts to list their models on the hosted website with customized descriptions, documentation, and details concerning the models. Preferably, the website can manage payments by customers for access to and use of the experts' models, thereby providing a marketing and sales platform in addition to a technical solution.

When an expert user creates a model on an intermediary server they may also elect to have a web page created for that model, which may be hosted automatically on the intermediary server. The intermediary server may provide the expert with a content management system to edit the webpage, allowing them to add images, information, frequently asked questions (FAQs), contact information etc. The site may be configured to act as a central hub for the expert's model, allowing the expert user to, for example, market his/her services, distribute any client template interface files, and/or manage sales transactions for clients to gain access to the model. Any of the aforementioned advantages of utilizing the disclosed system will also be readily appreciated by those skilled in the art including, for example, allowing end users to chain expert models together, enabling companies to broadcast catalogs, and aggregating data from multiple expert models.

Expert users may also desirably utilize the disclosed architecture to manage end user access to their models via a centralized website, wherein the configuration of such website may be edited, as desired, to control the privacy of the model page. For instance, an expert may set the privacy setting to 'public' so that any end user may access the model's marketing page in a search database hosted on the intermediary server. Similarly any person hosting an intermediary server may choose to keep the server public or private. End users with access to the intermediary server webpage may search for models based on their descriptive category (e.g. whether they are related to mining engineering, finance, electronics, etc.). If a model appears in the search results then a client may view the model's marketing page. Experts may elect to allow anyone to access their model, in which case end users may be able to download the model's client template directly from the model's marketing page. Experts may also choose to make their model's marketing page private or simply unlisted in the search database (e.g. to be viewed by invitation only or with prior knowledge of the page's URL). Experts may choose to send email invitations to their respective end user clients, inviting them to create a client account on the intermediary server or a central authentication service (e.g., via Google Identity Platform®) and gain access to view or use their model.

An expert may also choose to host a webpage system as the client model template interface, instead of using an EXCEL® workbook as the model's client template interface. The intermediary server may act to host such website for the expert user, and provide the expert with tools to convert an EXCEL® workbook template interface to a website input/output interface.

Another contemplated advantage is that the disclosed system allows for a "distributed" group of computers to process spreadsheets, rather than requiring a pre-configured/known set of centralized servers to perform such processing. Moreover, the disclosed system desirably allows for remote processing to be performed by non-server computers, which do not require as much configuration (e.g., opening of router ports, open listening to the internet, backup storage, etc.).

Exemplary System Components

Figure 37:
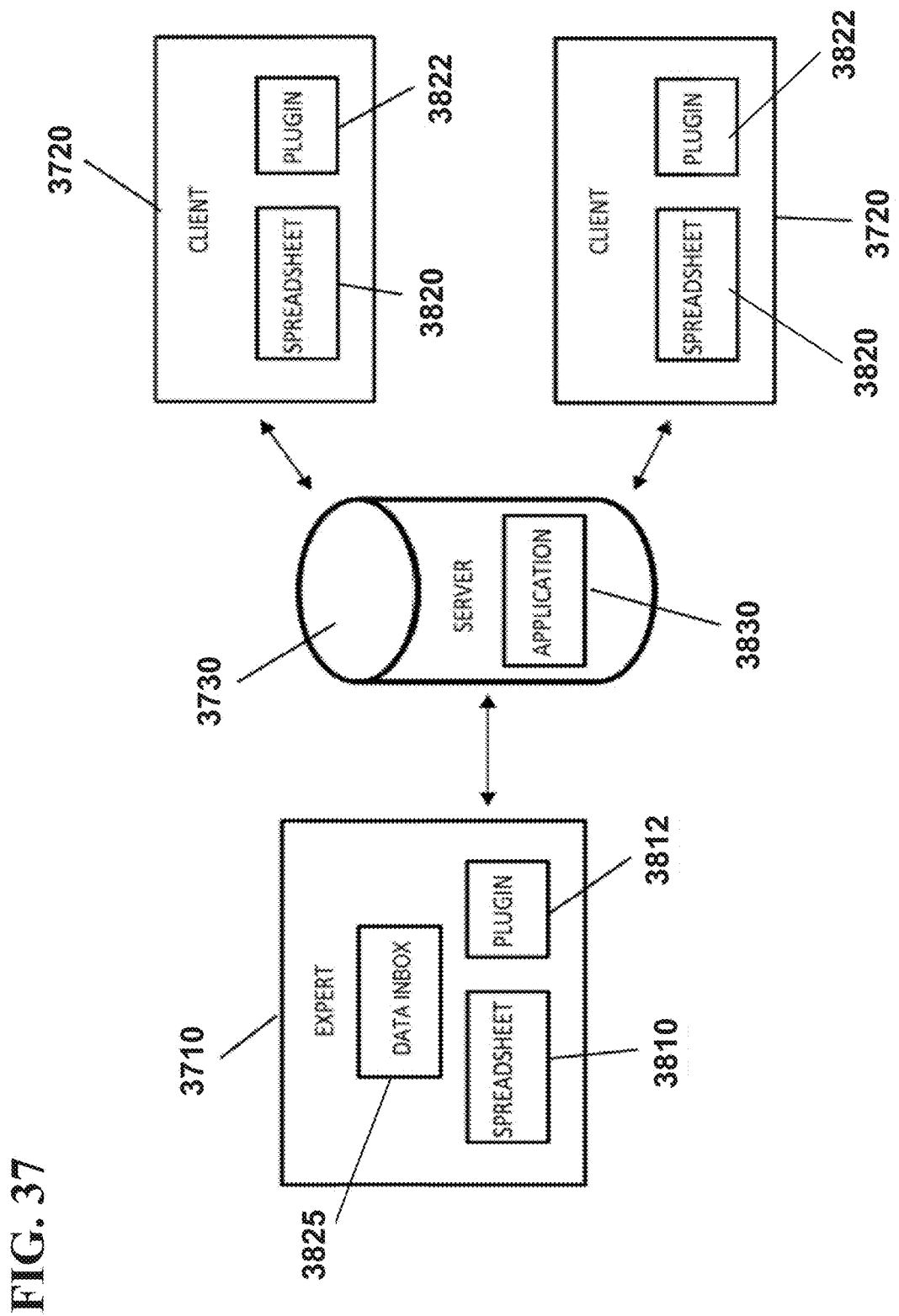
FIG. 37 is a diagram illustrating exemplary components used in a first embodiment.

FIG. 37 illustrates exemplary components used in one embodiment of the present system when experts create and/or process templates using a local computer 3710. In this case, the local computer hosts a data processing program such as a spreadsheet 3810 which is configured to perform the processes required in the present system by the expert user, such as through the use of an expert plugin 3812. The expert computer 3710 is in communication with an intermediary server 3730, preferably over a network, and can publish templates and results to the server 3730. Alternatively, in place of the plugin the expert's computer can run a Data Inbox application that preferably remains connected to the intermediary server so as to receive data as soon as it submitted by the client user and to then launch that batch of data to be processed from a queue according to predetermined settings.

The server 3730 hosts an application 3830 for receiving and storing templates from the expert user, and for providing client templates to client computers 3720. The server application 3830 is also preferably configured to receive processing requests from client computers 3720 and forward those requests to the expert computer 3710 for processing. Following such processing, the server application 3830 receives the results from the expert computer 3710 and forwards them to the appropriate client computer 3720. The client computer(s) 3720 likewise each operate a data processing program such as a spreadsheet program 3820 configured to perform the processes required in the present system for the client user, such as through the use of a client plugin 3822.

Figure 38:
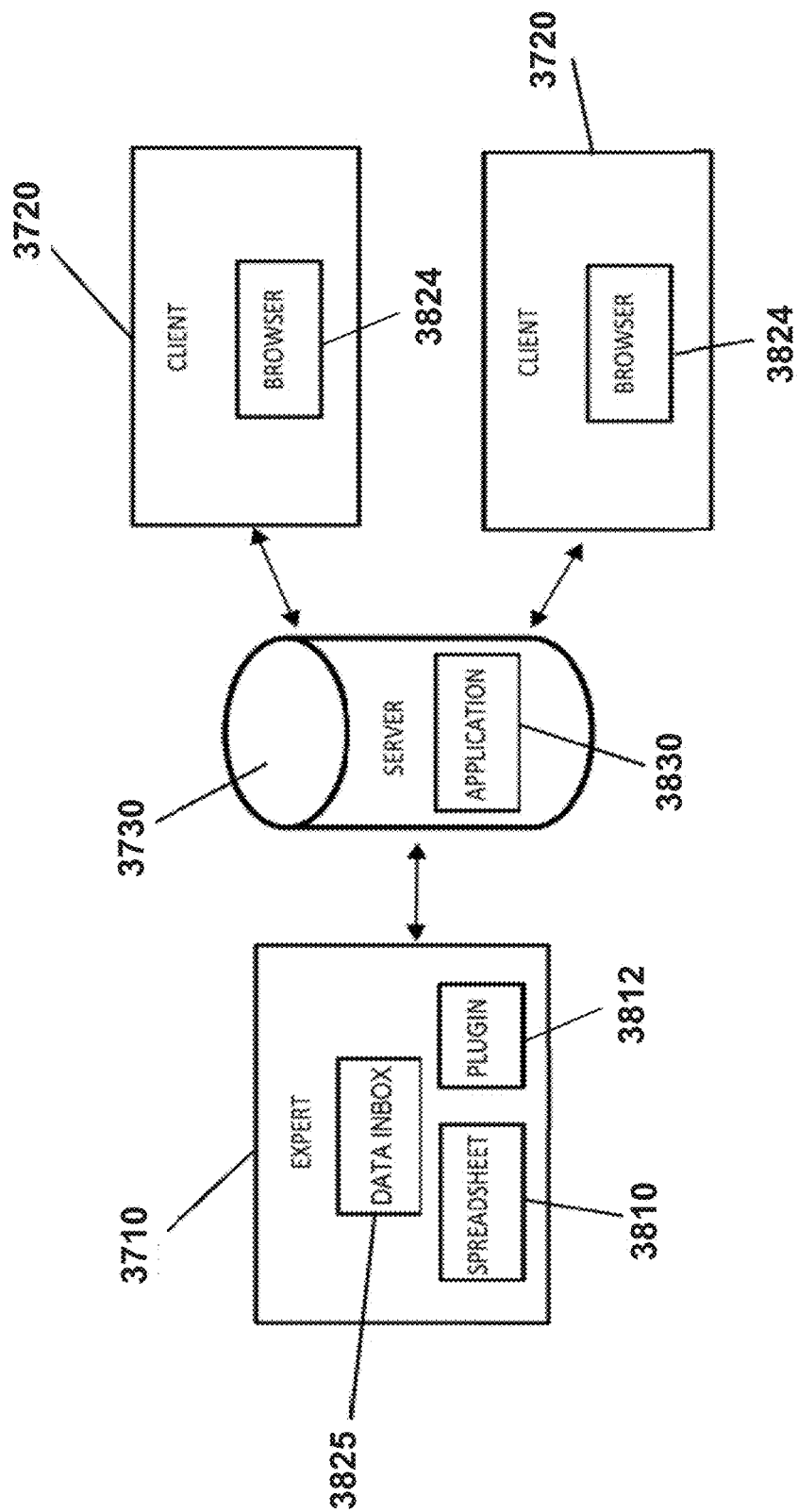
FIG. 38 is a diagram illustrating exemplary components used in a second embodiment.

In an alternative embodiment, illustrated in FIG. 38, the server application 3830 is configured to also host client templates. In this case, the expert computer 3710 can operate a Data Inbox 3825 or other program for interfacing with the intermediary server 3730 over a network, and the client computer(s) 3720 can interface with the intermediary server using a browser 3824. The expert user can create a model and save a client template onto the server application. The client template is then made available to the client user, which accesses it using a browser 3824 on the client computer 3720. The client user then inputs data directly to the client template on the server 3730, and the server application 3830 forwards that data for processing by the expert. Once the results are posted to the client template on the intermediary server 3730 by the expert, the client user can access these results.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 39:
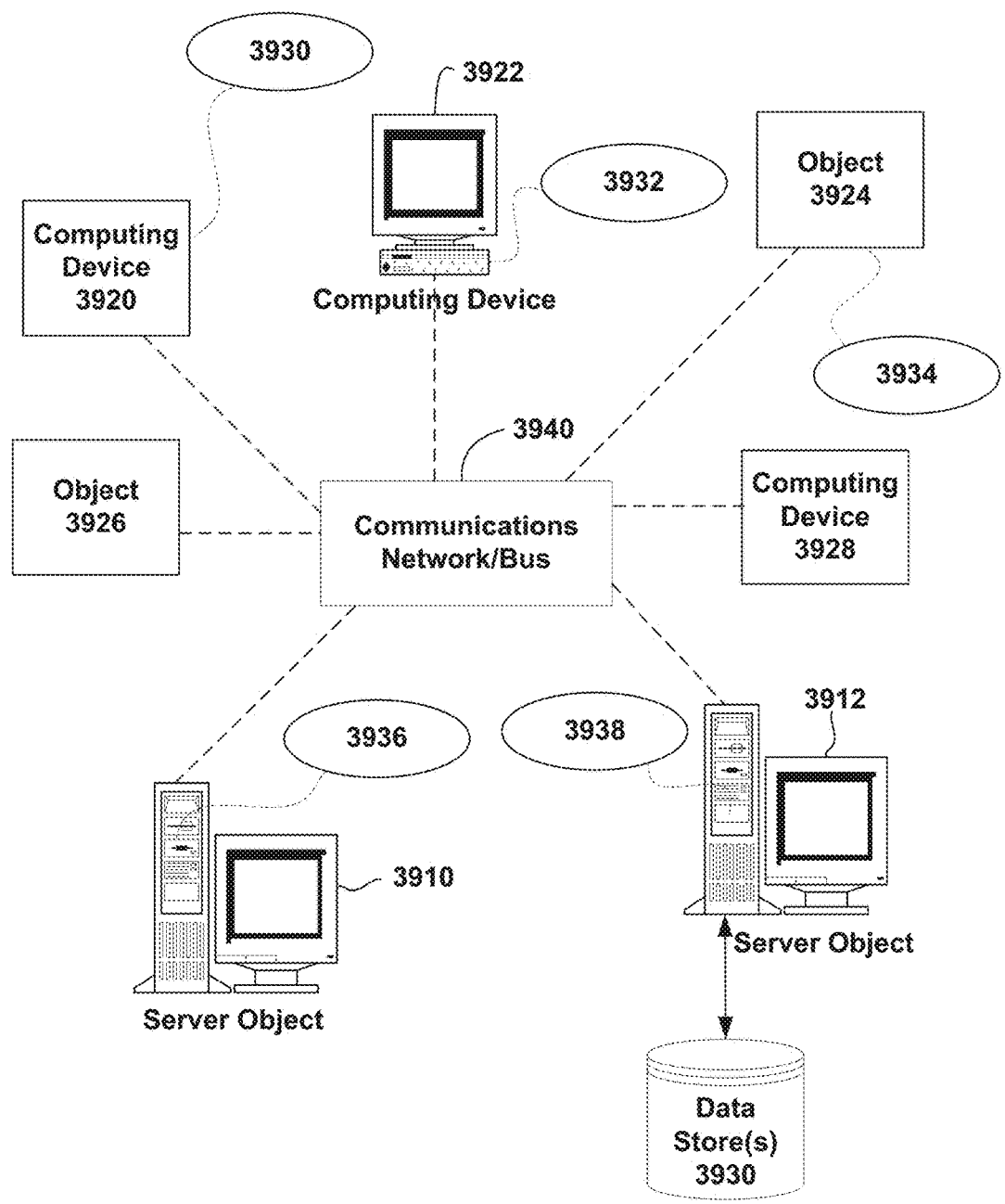
FIG. 39 is a block diagram representing exemplary non-limiting networked environments in which various embodiments described herein can be implemented.

FIG. 39 provides a non-limiting schematic diagram of an exemplary networked or distributed computing environment. The distributed computing environment comprises computing objects or devices 3910, 3912, etc. and computing objects or devices 3920, 3922, 3924, 3926, 3928, etc., which may include programs, methods, data stores, programmable logic, etc., as represented by applications 3930, 3932, 3934, 3936, 3938. It can be appreciated that computing objects or devices 3910, 3912, etc. and computing objects or devices 3920, 3922, 3924, 3926, 3928, etc. may comprise different devices, such as PDAs (personal digital assistants), audio/video devices, mobile phones, MP3 players, laptops, etc.

Each computing object or device 3910, 3912, etc. and computing objects or devices 3920, 3922, 3924, 3926, 3928, etc. can communicate with one or more other computing objects or devices 3910, 3912, etc. and computing objects or devices 3920, 3922, 3924, 3926, 3928, etc. by way of the communications network 3940, either directly or indirectly. Even though illustrated as a single element in FIG. 39, network 3940 may comprise other computing objects and computing devices that provide services to the system of FIG. 39, and/or may represent multiple interconnected networks, which are not shown. Each computing object or device 3910, 3912, etc. or 3920, 3922, 3924, 3926, 3928, etc. can also contain an application, such as applications 3930, 3932, 3934, 3936, 3938, that might make use of an API (application programming interface), or other object, software, firmware and/or hardware, suitable for communication with or implementation of various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 39, as a non-limiting example, computing objects or devices 3920, 3922, 3924, 3926, 3928, etc. can be thought of as clients and computing objects or devices 3910, 3912, etc. can be thought of as servers where computing objects or devices 3910, 3912, etc. provide data services, such as receiving data from computing objects or devices 3920, 3922, 3924, 3926, 3928, etc., storing of data, processing of data, transmitting data to computing objects or devices 3920, 3922, 3924, 3926, 3928, etc., although any computer can be considered a client, a server, or both, depending on the circumstances. Any of these computing devices may be processing data, or requesting services or tasks that may implicate various embodiments and related techniques as described herein.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 3940 is the Internet, for example, the computing objects or devices 3910, 3912, etc. can be Web servers with which the computing objects or devices 3920, 3922, 3924, 3926, 3928, etc. communicate via any of a number of known protocols, such as HTTP. As mentioned, computing objects or devices 3910, 3912, etc. may also serve as computing objects or devices 3920, 3922, 3924, 3926, 3928, etc., or vice versa, as may be characteristic of a distributed computing environment.

Exemplary Computing Device

As mentioned, several of the aforementioned embodiments apply to any device wherein it may be desirable to utilize a computing device according to the aspects disclosed herein. It is understood, therefore, that handheld, portable and other computing devices and computing objects of all kinds are contemplated for use in connection with the various embodiments described herein. Accordingly, the below general purpose remote computer described below in FIG. 40 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 40:
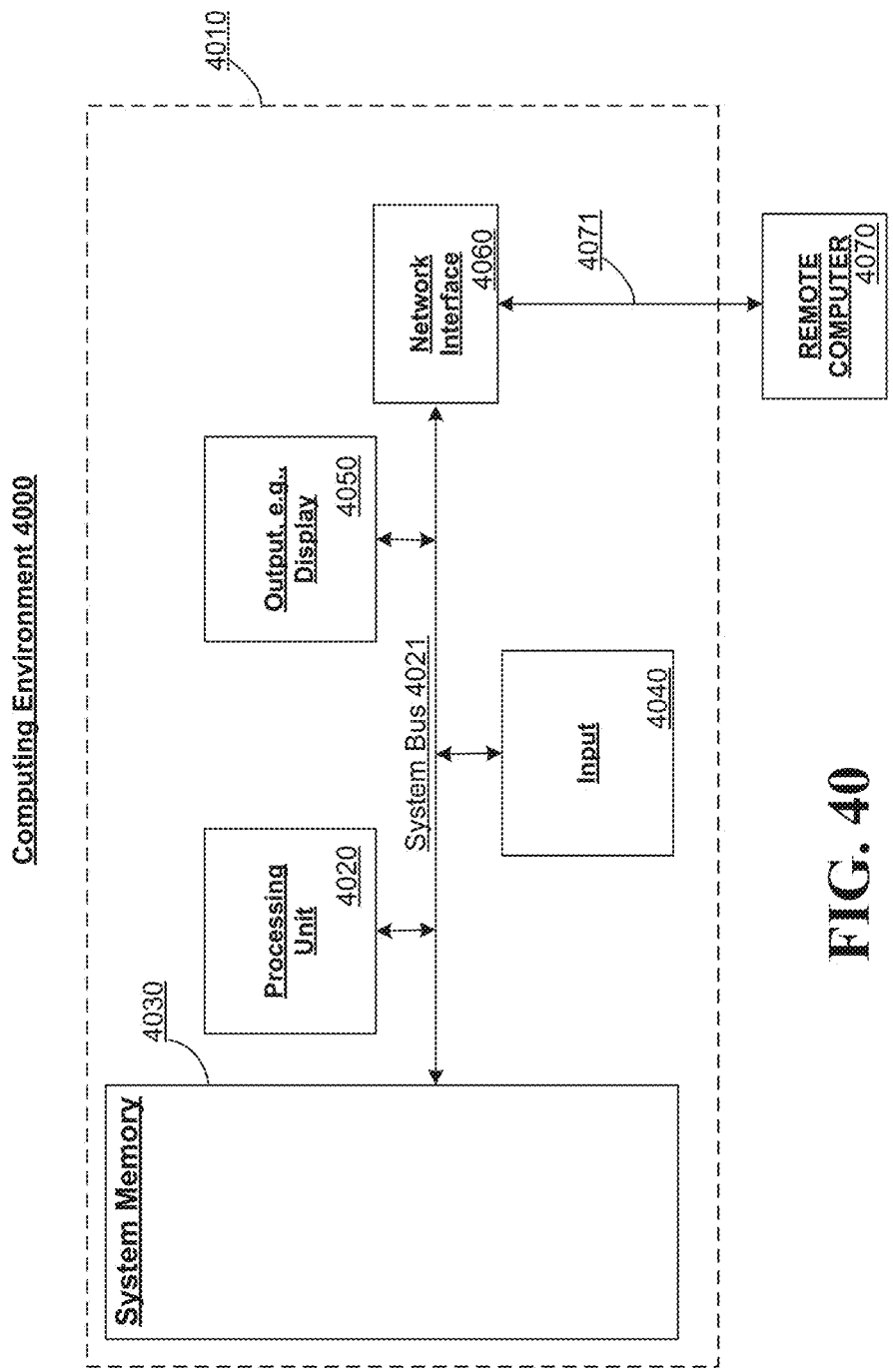
FIG. 40 is a block diagram representing an exemplary non-limiting computing system or operating environment in which one or more aspects of various embodiments described herein can be implemented.

FIG. 40 thus illustrates an example of a suitable computing system environment 4000 in which one or more of the embodiments may be implemented, although as made clear above, the computing system environment 4000 is only one example of a suitable computing environment and is not intended to suggest any limitation as to the scope of use or functionality of any of the embodiments. The computing environment 4000 is not to be interpreted as having any dependency or requirement relating to any one or combination of components illustrated in the exemplary operating environment 4000.

With reference to FIG. 40, an exemplary remote device for implementing one or more embodiments herein can include a general purpose computing device in the form of a handheld computer 4010. Components of handheld computer 4010 may include, but are not limited to, a processing unit 4020, a system memory 4030, and a system bus 4021 that couples various system components including the system memory to the processing unit 4020.

Computer 4010 typically includes a variety of computer readable media and can be any available media that can be accessed by computer 4010. The system memory 4030 may include computer storage media in the form of volatile and/or nonvolatile memory such as read only memory (ROM) and/or random access memory (RAM). By way of example, and not limitation, memory 4030 may also include an operating system, application programs, other program modules, and program data.

A user may enter commands and information into the computer 4010 through input devices 4040 A monitor or other type of display device is also connected to the system bus 4021 via an interface, such as output interface 4050. In addition to a monitor, computers may also include other peripheral output devices such as speakers and a printer, which may be connected through output interface 4050.

The computer 4010 may operate in a networked or distributed environment using logical connections to one or more other remote computers, such as remote computer 4070. The remote computer 4070 may be a personal computer, a server, a router, a network PC, a peer device or other common network node, or any other remote media consumption or transmission device, and may include any or all of the elements described above relative to the computer 4010. The logical connections depicted in FIG. 40 include a network 4071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and networks, the underlying concepts may be applied to any network system and any computing device or system in which it is desirable to publish, build applications for or consume data in connection with the aspects described herein.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the various figures. While for purposes of simplicity of explanation, some of the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective may be inferred, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A non-transitory computer-readable storage medium, comprising:
    a memory component configured to store computer-readable instructions, the computer-readable instructions including instructions for performing the following acts:
        receiving parameters of a spreadsheet model, wherein the spreadsheet model facilitates a processing of data;
        generating a first expert spreadsheet template, wherein the first expert spreadsheet template includes embedded instructions on how to execute a first portion of the spreadsheet model in accordance with the parameters;
        generating a second expert spreadsheet template, wherein the second expert spreadsheet template includes embedded instructions on how to execute a second portion of the spreadsheet model in accordance with the parameters;
        determining a restricted level of access to the spreadsheet model, wherein the restricted level of access identifies aspects of the first expert spreadsheet template and the second expert spreadsheet template to make inaccessible to an end user; and
        generating a client spreadsheet template, wherein the client spreadsheet template is configured to interface the end user with the spreadsheet model in accordance with the restricted level of access, and wherein the client spreadsheet template is further configured to facilitate an execution of the first portion of the spreadsheet model on the first expert spreadsheet template and an execution of the second portion of the spreadsheet model on the second expert spreadsheet template.

2. The non-transitory computer-readable storage medium of claim 1, wherein the generating of the client spreadsheet template comprises extracting embedded instructions from a copy of at least one of the first expert spreadsheet template or the second expert spreadsheet template.

3. The non-transitory computer-readable storage medium of claim 1, wherein at least one of the embedded instructions on how to execute the first portion of the spreadsheet model or the embedded instructions on how to execute the second portion of the spreadsheet model comprise at least one of a formula, a macro, or a call to an external program.

4. The non-transitory computer-readable storage medium of claim 1, wherein the parameters of the spreadsheet model define the client spreadsheet template as an input-only spreadsheet, and wherein the generating of the client spreadsheet template comprises configuring the client spreadsheet template to include input-only functionality.

5. The non-transitory computer-readable storage medium of claim 1, wherein the parameters of the spreadsheet model define the client spreadsheet template as an output-only spreadsheet, and wherein the generating of the client spreadsheet template comprises configuring the client spreadsheet template to include output-only functionality.

6. The non-transitory computer-readable storage medium of claim 1, wherein the parameters of the spreadsheet model identify at least one navigational point within the spreadsheet model, and wherein the generating of the client spreadsheet template comprises configuring the client spreadsheet template to facilitate an execution of a limited portion of at least one of the embedded instructions on how to execute the first portion of the spreadsheet model or the embedded instruction on how to execute the second portion of the spreadsheet model, the limited portion beginning at instructions corresponding to the at least one navigational point.

7. The non-transitory computer-readable storage medium of claim 6, wherein the at least one navigational point identifies at least one of a sheet in a spreadsheet program or a page on a website.

8. The non-transitory computer-readable storage medium of claim 1, wherein the generating of the client spreadsheet template comprises injecting Visual Basic for Applications (VBA) code into the client spreadsheet template, and wherein the VBA code is configured to execute at least one of the embedded instructions on how to execute the first portion of the spreadsheet model or the embedded instruction on how to execute the second portion of the spreadsheet model.

9. The non-transitory computer-readable storage medium of claim 1, further comprising generating a second a client spreadsheet template, wherein the second client spreadsheet template is configured to interface a second end user with the spreadsheet model in accordance with a second restricted level of access, and wherein the second client spreadsheet template is configured to facilitate an execution of a third portion of the spreadsheet model.

10. A method, comprising:
employing a processor to execute computer executable instructions stored on a computer readable storage medium to implement the following acts:
receiving an end user request associated with a spreadsheet model, wherein the spreadsheet model facilitates a processing of data;
identifying a first expert spreadsheet template in accordance with the end user request, wherein the first expert spreadsheet template includes embedded instructions on how to execute a first portion of the spreadsheet model;
identifying a second expert spreadsheet template in accordance with the end user request, wherein the second expert spreadsheet template includes embedded instructions on how to execute a second portion of the spreadsheet model;
identifying a client spreadsheet template corresponding to the first expert spreadsheet template and the second expert spreadsheet template, wherein the client spreadsheet template is configured to interface the end user with the spreadsheet model in accordance with a restricted level of access, and wherein the restricted level of access makes aspects of the first expert spreadsheet template and the second expert spreadsheet template inaccessible to the end user; and
facilitating a communication between the client spreadsheet template and each of the first expert spreadsheet template and the second expert spreadsheet template, wherein the communication initiates an execution of the first portion of the spreadsheet model on the first expert spreadsheet template and an execution of the second portion of the spreadsheet model on the second expert spreadsheet template in response to an end user input received via the client spreadsheet template.

11. The method of claim 10, wherein the client spreadsheet template is an input-only spreadsheet having input-only functionality, and wherein the communication is a one-way communication of data from the client spreadsheet template to at least one of the first expert spreadsheet template or the second expert spreadsheet template.

12. The method of claim 10, wherein the client spreadsheet template is an output-only spreadsheet having output-only functionality, and wherein the communication is a one-way communication of data from at least one of the first expert spreadsheet template or the second expert spreadsheet template to the client spreadsheet template.

13. The method of claim 10, wherein identifying the client spreadsheet template comprises matching an identifier associated with at least one of the first expert spreadsheet template or the second expert spreadsheet template with a corresponding identifier associated with the client spreadsheet template.

14. The method of claim 10, further comprising identifying a second a client spreadsheet template, wherein the second client spreadsheet template is configured to interface a second end user with the spreadsheet model in accordance with a second restricted level of access, and wherein the second client spreadsheet template is configured to facilitate an execution of a third portion of the spreadsheet model.

15. A non-transitory computer-readable storage medium, comprising:
a memory component configured to store computer-readable instructions, the computer-readable instructions including instructions for performing the following acts:
transmitting an end user request corresponding to a spreadsheet model associated with each of a first expert spreadsheet template and a second expert spreadsheet template, wherein the first expert spreadsheet template includes embedded instructions on how to execute a first portion of the spreadsheet model, and wherein the second expert spreadsheet template includes embedded instructions on how to execute a second portion of the spreadsheet model;
interfacing with a client spreadsheet template associated with each of the first expert spreadsheet template and the second expert spreadsheet template, wherein the client spreadsheet template is configured to provide the end user with a restricted level of access to the spreadsheet model, and wherein the restricted level of access makes aspects of the first expert spreadsheet template and the second expert spreadsheet template inaccessible to the end user; and initiating a first execution of the first portion of the spreadsheet model on the first expert spreadsheet template and a second execution of the second portion of the spreadsheet model on the second expert spreadsheet template, wherein the first execution and the second execution are initiated in response to an end user input received via the client spreadsheet template.

16. The non-transitory computer-readable storage medium of claim 15, further comprising receiving an output resulting from a remote processing of the end user input on at least one of the first expert spreadsheet template or the second expert spreadsheet template.

17. The non-transitory computer-readable storage medium of claim 16, wherein the output is at least one of a spreadsheet, a downloadable file, or blob data.

18. The non-transitory computer-readable storage medium of claim 16, further comprising receiving an identifier corresponding to the output, wherein the identifier facilitates a retrieval of the output.

19. The non-transitory computer-readable storage medium of claim 15, wherein the interfacing with the client spreadsheet template comprises interfacing via a client interface, and wherein the client interface is configured to populate the client spreadsheet template with data input by the end user via the client interface.

20. The non-transitory computer-readable storage medium of claim 15, further comprising interfacing with a second a client spreadsheet template, wherein the second client spreadsheet template is configured to interface a second end user with the spreadsheet model in accordance with a second restricted level of access, and wherein the second client spreadsheet template is configured to facilitate an execution of a third portion of the spreadsheet model.

* * * * *